US012610971B2

(12) United States Patent
Sikka et al.

(10) Patent No.: US 12,610,971 B2
(45) Date of Patent: Apr. 28, 2026

(54) PONGAMIA COMPOSITIONS, METHODS OF PREPARING AND ANALYZING THEREOF, AND USES THEREOF

(71) Applicant: Terviva, Inc., Oakland, CA (US)

(72) Inventors: Naveen Sikka, Oakland, CA (US); William Newell Kusch, Oakland, CA (US); Vamsi Krishna Rani, Oakland, CA (US)

(73) Assignee: TERVIVA BIOENERGY, INC., Oakland, CA (US)

( * ) Notice: Subject to any disclaimer, the term of this patent is extended or adjusted under 35 U.S.C. 154(b) by 767 days.

(21) Appl. No.: 17/282,722

(22) PCT Filed: Oct. 3, 2019

(86) PCT No.: PCT/US2019/054579
§ 371 (c)(1),
(2) Date: Apr. 2, 2021

(87) PCT Pub. No.: WO2020/072827
PCT Pub. Date: Apr. 9, 2020

(65) Prior Publication Data

US 2022/0000146 A1 Jan. 6, 2022

Related U.S. Application Data

(60) Provisional application No. 62/741,351, filed on Oct. 4, 2018.

(51) Int. Cl.
*A23K 10/30* (2016.01)
*A23K 50/10* (2016.01)
(Continued)

(52) U.S. Cl.
CPC .............. *A23K 10/30* (2016.05); *A23K 50/10* (2016.05); *B01D 11/0288* (2013.01); *B01J 19/126* (2013.01)

(58) Field of Classification Search
None
See application file for complete search history.

(56) References Cited

U.S. PATENT DOCUMENTS

| | | | |
|---|---|---|---|
| 1,504,588 | A | 8/1924 | Tunison |
| 2,200,391 | A | 5/1940 | Freeman |

(Continued)

FOREIGN PATENT DOCUMENTS

| | | | |
|---|---|---|---|
| CN | 1589644 | A | 3/2005 |
| CN | 1635136 | A | 7/2005 |

(Continued)

OTHER PUBLICATIONS

Altemimi et al., (2017). "Phytochemicals: Extraction, Isolation, and Identification of Bioactive Compounds from Plant Extracts," Plants, 6(42), 23 pages.

(Continued)

*Primary Examiner* — Lien T Tran
(74) *Attorney, Agent, or Firm* — Morrison & Foerster LLP

(57) ABSTRACT

The present disclosure relates to pongamia compositions having low concentrations of karanjin and other active chemical components intrinsic to pongamia oilseeds, methods of preparing and using said pongamia compositions. The present disclosure also relates to methods of analyzing pongamia compositions, as well as uses of the pongamia compositions.

6 Claims, 16 Drawing Sheets

(51) Int. Cl.
*B01D 11/02* (2006.01)
*B01J 19/12* (2006.01)

(56) References Cited

U.S. PATENT DOCUMENTS

| | | | |
|---|---|---|---|
| 2,548,434 | A | 4/1951 | Leaders |
| 4,101,673 | A | 7/1978 | Chang |
| RE30,386 | E | 8/1980 | Brandt et al. |
| 4,219,469 | A | 8/1980 | Kadan et al. |
| 4,221,731 | A | 9/1980 | Short et al. |
| 4,543,264 | A | 9/1985 | Stahel |
| 4,646,631 | A | 3/1987 | Ward |
| 4,785,726 | A | 11/1988 | Wear et al. |
| 5,437,885 | A | 8/1995 | Lusas et al. |
| 6,080,430 | A | 6/2000 | Ogawa et al. |
| 8,481,768 | B2 | 7/2013 | Sarangan et al. |
| 8,690,967 | B2 | 4/2014 | Anitescu et al. |
| 9,328,312 | B2 | 5/2016 | Kumar et al. |
| 9,725,664 | B2 | 8/2017 | Anitescu et al. |
| 9,914,897 | B2 | 3/2018 | Kumar et al. |
| 10,577,558 | B2 | 3/2020 | Boerner et al. |
| 12,052,994 | B2 | 8/2024 | Sikka et al. |
| 2004/0047972 | A1 | 3/2004 | Wasche et al. |
| 2004/0121058 | A1 | 6/2004 | Jayalekshmy et al. |
| 2004/0156920 | A1 | 8/2004 | Kane |
| 2007/0099278 | A1 | 5/2007 | Aare |
| 2007/0154579 | A1 | 7/2007 | Palu et al. |
| 2007/0166417 | A1 | 7/2007 | Palu et al. |
| 2008/0233202 | A1 | 9/2008 | Wurms et al. |
| 2011/0281017 | A1 | 11/2011 | Brooker |
| 2013/0296374 | A1 | 11/2013 | Owen et al. |
| 2014/0196359 | A1 | 7/2014 | Anitescu et al. |
| 2016/0031950 | A1 | 2/2016 | Jaramillo Freydell et al. |
| 2016/0122687 | A1 | 5/2016 | Carbone et al. |
| 2017/0280756 | A1 | 10/2017 | Jaramillo Freydell et al. |
| 2017/0283340 | A1 | 10/2017 | Patil et al. |
| 2018/0042266 | A1 | 2/2018 | Hetherington et al. |
| 2018/0207070 | A1 | 7/2018 | Bernoud et al. |
| 2019/0144778 | A1 | 5/2019 | Heymann et al. |
| 2019/0269594 | A1 | 9/2019 | Gadgil et al. |
| 2022/0125059 | A1 | 4/2022 | Sikka |
| 2022/0369662 | A1 | 11/2022 | Sikka et al. |
| 2023/0148625 | A1 | 5/2023 | Astwood et al. |
| 2023/0148638 | A1 | 5/2023 | Astwood et al. |
| 2023/0217944 | A1 | 7/2023 | Dragull et al. |

FOREIGN PATENT DOCUMENTS

| | | | |
|---|---|---|---|
| CN | 1762406 | A | 4/2006 |
| CN | 101011454 | A | 8/2007 |
| CN | 102241686 | A | 11/2011 |
| CN | 102372720 | A | 3/2012 |
| CN | 103194497 | A | 7/2013 |
| CN | 104892620 | A | 9/2015 |
| CN | 108024950 | A | 5/2018 |
| EA | 201991248 | A1 | 11/2019 |
| EP | 4125370 | A1 | 2/2023 |
| IN | 1826/DEL/2006 | A1 | 4/2008 |
| IN | 1074/KOL/2008 | A | 8/2008 |
| IN | 2010//DEL/2009 | A | 4/2011 |
| IN | 0420/MUM/2012 | A | 11/2013 |
| IN | 1084/CHE/2009 | A | 1/2014 |
| IN | 3616/DEL/2012 | A | 8/2014 |
| IN | 0287/DEL/2014 | A | 7/2016 |
| IN | 2381//DEL/2015 | A | 2/2017 |
| IN | 201721016763 | A | 11/2018 |
| JP | S46-006915 | A | 12/1971 |
| JP | S60-083541 | A | 5/1985 |
| JP | 2002256281 | A | 9/2002 |
| JP | 2016013076 | A | 1/2016 |
| JP | 2018521079 | A | 8/2018 |
| JP | 7470699 | B2 | 4/2024 |
| RU | 2529898 | C2 | 10/2014 |
| RU | 2700094 | C1 | 9/2019 |
| WO | WO-2001076715 | A2 | 10/2001 |
| WO | WO-2002054884 | A1 | 7/2002 |
| WO | WO-2004057976 | A1 | 7/2004 |
| WO | WO-2008120223 | A2 | 10/2008 |
| WO | WO-2011027362 | A2 | 3/2011 |
| WO | WO-2013096993 | A1 | 7/2013 |
| WO | WO-2016042001 | A1 | 3/2016 |
| WO | WO-2017013264 | A1 | 1/2017 |
| WO | WO-2017041776 | A1 | 3/2017 |
| WO | WO-2017057600 | A1 | 4/2017 |
| WO | WO-2019195947 | A1 | 10/2019 |
| WO | WO-2020072827 | A1 | 4/2020 |
| WO | WO-2021067698 | A1 | 4/2021 |
| WO | WO-2021202994 | A1 | 10/2021 |
| WO | WO-2021202996 | A1 | 10/2021 |
| WO | WO-2021202998 | A1 | 10/2021 |

OTHER PUBLICATIONS

Avula et al., (2009). "Quantitative Determination of Flavanoids by Column High-Performance Liquid Chromatography with Mass Spectrometry and Ultraviolet Absorption Detection in Artemisia afra and Comparative Studies with Various Species of Artemisia Plants," Journal of AOAC International, 92(2):633-643.

De et al., (1998). "Nutritional quality of detoxified karanja (*Pongamia glabra*) oil," Fett/Lipid, 100:48-51.

De et al., (2009). "Optimization of solvent requirement for refining of karanja (*Pongamia glabra*) oil by liquid-liquid extraction," Journal of Scientific & Industrial Research, 68:319-324.

Gandhi et al., (2000). "Red cell haemolysis test as an in vitro approach for the assessment of toxicity of karanja oil," Toxicology in vitro, 14:513-516.

Gore et al., (2008). "Determination of Pngamol and Karanjin in Karanja Oil by Reverse Phase Hplc," Analytical Letters, 33(2):337-346.

Gupta et al., (1981). "Biological evaluation of karanj (Pongamia glabra) cake," Indian J. Anim. Health, 20:70-75.

Kadirvel et al., (1989). "The Effect of Kernels of Karanja (*Pongamia glabra* Vent) on Growth and Feed Efficiency in Broiler Chicks to 4 Weeks of Age," Animal Feed Science and Technology, 25:201-206.

Kesari et al., (2011). "Coordinated changes in storage proteins during development and germination of elite seeds of *Pongamia pinnata*, a versatile biodiesel legume," AoB Plants, plr026, 16 pages.

Khan et al., (2015). "Optimization of Process Conditions for Isolation of Leaf Protein Concentrate from Pongamia pinnata and its Proximate Nutritional Composition," IOSR journal of applied chemistry, 8:24-33.

Kumar et al., (2018). "Microwave assisted extraction of oil from pongamia pinnata seeds," Materials Today: Proceedings, 5:2960-2964.

Mandal et al., (1974). "Studies on the utilization of karanja (*Pongamia glabra*) oil cake in poultry rations," Indian J. Poult. Sci., 9:141-147.

Mandal et al., (1984). "Chemical and Nutritional Evaluation of Pongamia glabra Oil and Acacia auriculaeformis Oil," JAOCS, 61(9):14471449.

Mandal et al., (1985). "Effect of Refined Hydrogenated Karanja Oil on Lipid Metabolism in Adult Male Albino Rats," Acta Alimentaria, 12(1):3-13.

Mandal et al., (1985). "Protease Inhibitors and in vitro Protein Digestibility of Defatted Seed Cakes of Akashmoni and Karanja," JAOCS, 62(7):1124-1126.

Natanam et al., (1989). "Chemical Composition of Karanja (*Pongamia glabra* Vent) Kernel and Cake AS Animal Feed," Indian J. Anim. Nutr., 6(3):270-273.

Panda et al., (2006). "Quantification of Karanjin, Tannin and Trypsin Inhibitors in Raw and Detoxified Expeller and Solvent Extracted Karanj (*Pongamia glabra*) Cake," Asian-Aust. J. Anim. Sci., 19(12):1776-1783.

Panpraneecharoen et al., (2014). "Variability of Oil Content, Fatty Acid Composition and Karanjin Content in Pongamia pinnata and Its Relationship with Biodiesel Quality," Annual Research & Review in Biology, 4(14):2283-2294.

(56) References Cited

OTHER PUBLICATIONS

Paswan, (2012). "Thesis: Studies on Detoxification and Nutritive Potential of Karanj (*Pongamia glabra*) Cake," Deemed University Indian Veterinary Research Institute, 203 pages.
Patel et al., (2015). "Simple, Efficient and Economic Method for Isolation and Analysis of Karanjin and Pongamol from Karanja Seed Oil and Screening of Antimicrobial Potential," International Journal of Pharmacy and Pharmaceutical Sciences, 7(7):248-252.
Pavithra et al., (2010). "Seed Protein Profiling of *Pongamia pinnata* (L.) Pierre for Investigating Inter and Intra-specific Population Genetic Diversity," International Journal of Science and Nature, 1(2):246-252.
Pavithra et al., (2012). "Oil, Fatty Acid Profile and Karanjin Content in Developing *Pongamia pinnata* (L.) Pierre Seeds," J Am Oil Chem Soc., 89:2237-2244.
Prabhu et al., (2002). "Quantification of Karanjin Using High Performance Liquid Chromatography in Raw and Detoxified Karanj (*Pongamia glabra* vent) Seed Cake," Asian-Aust. J. Anim. Sci., 15(3):416-420.
Ravi et al., (2000). "Performance of lambs fed expeller pressed and solvent extracted karanj (*Pongamia pinnata*) oil cake," Animal Feed Science and Technology, 88:121-128.
Sangwan et al., (2010). "A Review on *Pongamia pinnata* (L.) Pierre:A Great Versatile Leguminous Plant," Nature and Science, 8(11):130-139.
Sasmal et al., (1997). "Preliminary study on the effect of purified Pongamia oil on liver and kidney functions in rats," FITOTERAPIA, 68(1):35-38.
Srivastava et al., (1990). "Utilisation of deoiled karanj (*Pongamia glabra*) cake in kid grower rations," Indian J. Anim. Nutr., 7:15-20.
Susarla et al., (2012). "A method for isolation of karanjin from the expelled cake of Pongamia glabra," European Journal of Lipid Science and Technology, 114:1097-1101.
Vinay et al., (2008). "Effect of detoxification on the functional and nutritional quality of proteins of karanja seed meal," Food Chemistry, 106:77-84.
Vismaya et al., (2010). "Extraction and recovery of karanjin: A value addition to karanja (*Pongamia pinnata*) seed oil," Industrial Crops and Products, 32:118-122.
Xu et al., (2012). Ionic Liquid-Based Microwave-assisted Extraction of Flavonoids from Bauhinia championii (Benth.) Benth., Molecules, 17:14323-14335.
Zhang et al., (2005). "Quantitative and qualitative analysis of flavonoids in leaves of Adinandra nitida by high performance liquid chromatography with UV and electrospray ionization tandem mass spectrometry detection," Analytica Chimica Acta, 532:97-104.
Dutta et al., (2012). "Use of Pongamia glabra (karanj) and Azadirachta indica (neem) seed cakes for feeding livestock," Biofuel coproducts as livestock feed—opportunities and challenges, pp. 379-402.
International Search Report and Written Opinion for International Patent Application No. PCT/US2019/54579, mailed on Dec. 10, 2019, 13 pages.
International Search Report and Written Opinion for International Patent Application No. PCT/US2020/053945, mailed on Dec. 30, 2020, 7 pages.
International Search Report and Written Opinion for International Patent Application No. PCT/US2021/25572, mailed on Aug. 4, 2021, 11 pages.
Szalay, (2015). "What are Flavonoids?" Available online at <https://www.livescience.com/52524-flavonoids.html>, 5 pages.
Usharani et al., (2019). "*Pongamia pinnata* (L.): Composition and advantages in agriculture: A review," Journal of Pharmacognosy and Phytochemistry, 8:2181-2187.
Database Biosis, (1990). "Database accession No. PREV199090106184; Natanam et al, "The Feeding Value of Karanja India Pongamia-Glabra Vent Oil for White Leghorn Pullets,"" Indian Veterinary Journal, 67(4):335-338, 2 pages.
Database Biosis, (1997). "Database accession No. PREV199800011011; Dhara et al., "Deoiled Karanja (Pongamia glabra Vent.) cake in the ration of Japanese quail,"" Indian Journal of Poultry Science, 32(2):132-136, 1 page.
Extended European Search Report and Opinion received for European Patent Application No. 19869239.4 mailed on May 10, 2022, 12 pages.
Extended European Search Report and Opinion received for European Patent Application No. 20870766.1 mailed on Oct. 10, 2023, 15 pages.
Extended European Search Report and Opinion received for European Patent Application No. 21779137.5 mailed on Nov. 28, 2023, 16 pages.
Ghosh et al., (2018). "Role of nitric oxide scavenging activity of Karanjin and Pongapin in the treatment of Psoriasis," 3 Biotech, 8(8):338, 4 pages.
Natanam et al., (1989). "The Effect of Karanja (*Pongamia glabra* Vent) cake on the performance of White Leghorn pullets," Animal Feed Science and Technology, 27:89-93.
Vismaya et al., (2011). "Gastroprotective Properties of Karanjin from Karanja (*Pongamia pinnata*) Seeds; Role as Antioxidant and $H_+$, $K_+$-ATPase Inhibitor," Evidence-Based Complementary and Alternative Medicine, 2011:747246, 10 pages.
Directive 2009/32/EC of the European Parliament and of the Council (Apr. 23, 2009) on the approximation of the laws of the Member States on extraction solvents used in the production of foodstuffs and food ingredients, 12 pages.
Dundford, (2016). "Edible Oil Quality," Available online at <https://extension.okstate.edu/fact-sheets/edible-oil-quality.html>, 4 pages.
Dutton, (1954). "Chapter 7: Countercurrent fractionation of lipids," Progress in the Chemistry of Fats and other Lipids, 2:292-300.
International Search Report and Written Opinion for International Patent Application No. PCT/US2021/025576, mailed on Aug. 6, 2021, 13 pages.
International Search Report and Written Opinion for International Patent Application No. PCT/US2021/025578, mailed on Aug. 6, 2021, 12 pages.
Interstate Standard GOST 1129-2013. (2019). "Sunflower Oil, Specifications," M.: Standartinform, 21 pages. English translation of area of use.
Interstate Standard GOST ISO 9832-2015. (2019). "Animal and Vegetable Fats and Oils, Determination of residual technical hexane content (ISO 9832:2002, UT)," M.: Standartinform, 17 pages. English translation of area of use.
Kumar et al., (2017). "Green solvents and technologies for oil extraction from oilseeds," Chemistry Central Journal, 11:9, 7 pages.
Natural Sourcing, (2018). "Karanja Oil," Available online at <https://www.praannaturals.com/downloads/specsheets/SPEC_Organic_Karanja_OILORGOILKARANJACPIN1056.pdf>, 1 page.
Akram et al., (2021). "Pongamia pinnata: an updated review on its phytochemistry and pharmacological uses," Pharm. Pharmacol. Int. J., 9(5):194-199.
Aneela et al., (2011). "Acute oral toxicity studies of Pongamia pinnata and Annona Squamosa on albino Wistar rats," Int. J. Res. Pharm. Chem., 1(4):820-824.
Ansari et al., (2019). "Statistical approach towards optimization of extraction process of karanjin from Pongamia pinnata seeds," Pharmacognosy Magazine, 419-425. Abstract Only.
Araujo et al., (2010). "High-fat diet increases thyrotropin and oxygen consumption without altering circulating 3,5,3'-triiodothyronine (T3) and thyroxine in rats: the role of iodothyronine deiodinases, reverse T3 production, and whole-body fat oxidation," Endocrinol, 151:3460-3469.
Baki et al., (2007). "Sub-Acute toxicological studies of pongamol isolated from Pongamia pinnata," Res. J. Med. Med. Sci., 2(2):53-57.
Bartlett, (1937). "Properties of sufficiency and statistical tests," Proceedings of the Royal Society of London, 160(901):268-282.
Da Silva, (2021). "Feeding the world sustainably," available online at <https://www.un.org/en/chronicle/article/feeding-world-sustainably>, 2 pages.

(56) References Cited

OTHER PUBLICATIONS

Di Dalmazi et al., (2021). "Plant constituents and thyroid: a revision of the main phytochemicals that interfere with thyroid function," Food Chem. Toxicol., 152:112158, 13 pages.
Dunn, (1964). "Multiple contrasts using rank sums," Technometrics, 6:241-252.
Dunnett, (1964). "New tables for multiple comparisons with a control," Biometrics, 20(3):482-491.
Dunnett, (1980). "Pairwise multiple comparisons in the unequal variance case," J. Am. Stat. Assoc., 75:796-800. Abstract Only.
El-Sayed et al., (2020). "Effect of high-fat diet-induced obesity on thyroid gland structure in female rats and the possible ameliorating effect of metformin therapy," Folia Morphol., 79(3):476-488.
EPA, (2002). "Health effects test guidelines OPPTS 870.1100, Acute Oral Toxicity," rev. EPA 712-C-02-190, Dec. 2002, 37 pages.
Extended European Search Report and Written Opinion received for European Patent Application No. 21779138.3 mailed on Dec. 7, 2023, 15 pages.
Extended European Search Report and Written Opinion received for European Patent Application No. 21781819.4 mailed on Dec. 22, 2023, 14 pages.
Food and Agriculture Organization of the United Nations (FAO) et al., (2020). "The State of Food Security and Nutrition in the World 2020. Transforming Food Systems for Affordable Healthy Diets," available online at <https://www.unicef.org/reports/state-of-food-security-and-nutrition-2020>, 320 pages.
Fu et al., (2021). "Fuel properties of Pongamia (*Milletia pinnata*) seeds and pods grown in Hawaii," ACS Omega, 6:9222-9233, 12 pages.
Gaitan, (1990). "Goitrogens in food and wat er," Annu. Rev. Nutr., 10:21-39. Abstract Only.
Han et al., (2012). "Excess iodine and high fat diet combination modulates lipid profile, thyroid hormone, and hepatic LDLr expression values in mice," Biol. Trace Elem. Res., 147:233-239. Abstract Only.
Harbone, (1973). "Phytochemical Methods: A Guide to Modern Techniques of Plant Analysis," 3rd edition, 317 pages.
Housman et al., (2020). "Expeller-pressed and solvent-extracted Pongamia seedcake as a protein supplement for cattle consuming a basal diet of forage," Animal Feed Science and Technology, 266:114521, 12 pages.
Husna et al., (2017). "Performance of broiler fed on diet containing Koroch (*Pongamia pinnata*) seed cake," Bangladesh J. Anim. Sci., 46(2):88-94.
International Search Report and Written Opinion for International Patent Application No. PCT/US2020/016385, mailed on Apr. 16, 2020, 12 pages.
Kruskal et al., (1952). "Use of ranks in one-criterion variance analysis," J. Am. Stat. Assoc., 47:583-621.
Liu et al., (2017). "The History, Current Status and Prospects of Plant Extracts as Commercial Botanical Insecticides and "Farming Products" for Insect Control," World Pesticides, 39(1):9-13. English translation.
Mahli et al., (1989). "Pharmacological effects of karanjin and pongamol (from seed oil of Pongamia pinnata)," Indian J. Anim. Sci., 59(6):657-660.
Mann et al., (1947). "On a test whether one of two random variables is stochastically larger than the other," Ann. Math. Stat., 18:50-60.
Marone et al., (2022). "Safety and toxicologic evaluation of Edible Pongamia Oil: A novel food ingredient," Food and Chemical Toxicology, 166:113213, 11 pages.
Misra et al., (2007). "Integrated management approach against sigatoka leaf spot of banana," Journal of Mycology and Plant Pathology, 45(1):104-106. Abstract only.
Moudgal et al., (1958). "Studies on goitrogenic agents in food. III. Goitrogenic action of some glycosides isolated from edible nuts," J. Nutri., 66:291-303.
Natanam et al., (1989). "The toxic effects of Karanj (*Pongamia glabra* vent) oil and cake on growth and feed efficiency in broiler chicks," Anim. Feed Sci. Technol., 27:95-100. Abstract Only.
National Research Council, (1995). "Chapter 2: Nutrient Requirements of the Laboratory Rat," Nutrient Requirements of Laboratory Animals: Fourth Revised Edition, pp. 11-79.
Nirmal et al., (2007). "Anthelmintic activity of Pongamia glabra," Songklanakarin Journal of Science and Technology, 29(3):755-757.
OECD, (1997). OECD Guidelines for Testing of Chemicals, Test No. 471: Bacterial Reverse Mutation Test, available online at <https://www.oecd-ilibrary.org/environment/test-no-471-bacterial-reverse-mutation-test_9789264071247-en>, 11 pages.
OECD, (1998). "OECD Series on Principles of Good Laboratory Practice and Compliance Monitoring—No. 1," ENV/MC/CHEM(98)17, 41 Pages.
OECD, (2000). "Guidance Document on the Recognition, Assessment and Use of Clinical Signs as Humane Endpoints for Experimental Animals Used in Safety Evaluation," ENV/JM/MONO(2000)7, 39 pages.
OECD, (2002)."OECD Series on Principles of Good Laboratory Practice and Compliance Monitoring, No. 13," ENV/JM/MONO(2002)9, 17 pages.
OECD, (2008). "OECD Guidelines for the Testing of Chemicals, Test No. 407: Repeated Dose 28-day Oral Toxicity Study in Rodents", available online at <https://www.oecd-ilibrary.org/environment/test-no-407-repeated-dose-28-day-oral-toxicity-study-in-rodents_9789264070684-en>, 13 pages.
OECD, (2016). "OECD Guidelines for Testing of Chemicals, Test No. 475: Mammalian Bone Marrow Chromosome Aberration Test," available online at <https://www.oecd.org/env/ehs/testing/test-no-475-mammalian-bone-marrow-chromosomal-aberration-test-9789264264786-en.htm>, 18 pages.
OECD, (2018). "OECD Guidelines for the Testing of Chemicals, Test No. 408: Repeated Dose 90-day Oral Toxicity Study in Rodents," available online at <https://www.oecd-ilibrary.org/environment/test-no-408-repeated-dose-90-day-oral-toxicity-study-in-rodents_9789264070707-en>, 16 pages.
Official Journal of the European Union, (2010). "Directive 2010/63/EU of the European Parliament of the Council of Sep. 22, 2010 on the Protection of Animals Used for Scientific Purposes," L276:33-79.
Official Journal of the European Union, (2017). "Commission Regulation (EU) No. 2017/735, Annex B, 'Mammalian Bone Marrow Chromosomal Aberration Test,'" L 112:39-51.
Osman et al., (2009). "Pongamia seed cake as a valuable source of plant nutrients for sustainable agriculture," Ind. J. Fert., 5(2):25-32.
Raj et al., (2016). "Effect of incorporation of detoxified karanja (*Pongamia pinnata*) and neem (*Azadirachta indica*) seed cakes in total mixed rations on milk yield, composition and efficiency in crossbred dairy cows," Indian J. Anim. Sci., 86(4):489-492.
Search Report received for Chinese Patent Application No. 2020800114843 issued on Apr. 26, 2022, 4 pages. English translation.
Search Report and Written Opinion received for Singaporean Patent Application No. 11202253630F issued on Jun. 19, 2024, 10 pages.
Search Report and Written Opinion received for Singaporean Patent Application No. 11202253725J issued on Jun. 17, 2024, 11 pages.
Shao et al., (2014). "Dietary high-fat lard intake induces thyroid dysfunction and abnormal morphology in rats," Acta Pharmacol. Sin., 35:1411-1420.
Shapiro et al., (1965). "An analysis of variance test for normality (complete samples)," Biometrika, 52(3-4):591-611.
Shejawal et al., (2014). "Bioavailability of karanjin from *Pongamia pinnata* L. in Sprague Dawley rats using validated RP-HPLC method," J. Appl. Pharmaceut. Sci., 4(3):10-14.
Singh et al., (2021). "Karanjin," Phytochem., 183:112641. Abstract Only.
Speakman, (2019). "Use of high-fat diets to study rodent obesity as a model of human obesity," Int. J. Obes., 43:1491-1492.
Sreedevi et al., (2009). "Participatory research and development to evaluate Pongamia seed cake as a source of plant nutrient in integrated watershed management," J. SAT Agric. Res., 7:1-13.
Suryawanshi et al., (2018). "Formulation and Evaluation of Pongamia Pinnata (Karanj) Seed Oil in Water Nanoemulsion," International Journal of Pharmacy and Biological Sciences, 8(4):488-494.

(56) References Cited

OTHER PUBLICATIONS

Thakur et al., (2021). "Karanj (*Pongamia pinnata*)—an ayurvedic and modern overview," Asian J. Pharmaceut. Clin. Res., 14(6):14-21.
U.S. Food and Drug Administration (FDA), (2000). "Redbook 2000, IV.C.1.a. Bacterial Reverse Mutation Test, Toxicological Principles for the Safety Assessment of Food Ingredients," available online at <https://www.fda.gov/regulatory-information/search-fda-guidance-documents/redbook-2000-ivc1a-bacterial-reverse-mutation-test>, 15 pages.
U.S. Food and Drug Administration (FDA), (2003). "Redbook 2000: IV.C.4.a. Subchronic Toxicity Studies with Rodents, Toxicological Principles for the Safety Assessment of Food Ingredients," available online at <https://www.fda.gov/regulatory-information/search-fda-guidance-documents/redbook-2000-ivc4a-subchronic-toxicity-studies-rodents>, 17 pages.
U.S. Food and Drug Administration (FDA), (2017). "Redbook 2000: IV.C.3.a. Short-Term Toxicity Studies with Rodents, Toxicological Principles for the Safety Assessment of Food Ingredients," available online at <https://www.fda.gov/regulatory-information/search-fda-guidance-documents/redbook-2000-ivc3a-short-term-toxicity-studies-rodents>, 17 pages.
U.S. Food and Drug Administration (FDA), (2024). "21 CFR Part 58, Good Laboratory Practice for Nonclinical Laboratory Studies," available online at <https://www.ecfr.gov/current/title-21/chapter-I/subchapter-A/part-58>, 19 pages.
United States Department of Agriculture (USDA), (2020). "DGA, Dietary Guidelines for Americans. 2020-2025," available online at <https://www.dietaryguidelines.gov/sites/default/files/2020-12/Dietary_Guidelines_for_Americans_2020-2025.pdf>, 164 pages.
Wang et al., (2015). "Chapter 11: Microwave Extraction," Bioactive component separation technology, p. 145. English translation.
Watson, (2021). "New Kid on the Plant-Based Block? TerViva to Commercialize Oils (2022) and Proteins (2023) from Pongamia Trees," available online at <https://www.foodnavigator-usa.com/Article/2021/04/29/New-kid-on-the-plant-based-block-TerViva-to-commercialize-oils-2022-and-proteins-2023-from-Pongamia-trees>, 6 pages.
Wilcoxon, (1945). "Individual comparisons by ranking methods," Biometrics Bull., 1:80-83.
Zhang et al., (2018). "A high-fat diet rich in saturated and mono-unsaturated fatty acids induces disturbance of thyroid lipid profile and hypothyroxinemia in male rats," Mol. Nutr. Food Res., 62(6):1700599, 9 pages.
Habib et al., (2016). "Performance of broiler fed on diet containing deoiled Koroch (*Pongamia Pinnata*) seed cake treated with NaOH and HCl," Res. Agric. Livest. Fish, 3(2):323-329.
Kaul et al., (2011). "Effect of low frequency ultrasonic assisted extraction on the quality of seed oils of Indian origin," Fuel Processing Technology, 92:1813-1820.
Rasheed et al., (2017). "Method validation and simultaneous determination of two bio-active marker compounds in pongania pinnata: seed and karanj oil by UPLC-MS," World journal of pharmaceutical research, 6(17):846-857.
Search Report received for Eurasian Patent Application No. 202491700 issued on Nov. 27, 2024, 6 pages.
Shenoy et al., (2010). "Study of sunscreen activity of aqueous, methanol, and acetone extracts of leaves of *Pongamia pinnata* (L.) Pierre, Fabaceae," International Journal of Green Pharmacy, 4(4):270-274.
Bureau of Indian Standards (2014). "Groundnut Oil—Specification (Third Revision)," Indian Standard, IS 544, 11 pages.
Carrín et al., (2010). "Peanut oil: Compositional data," European Journal of Lipid Science and Technology, 112(7):697-707.
Chakrabarti et al., (2013). Abstract of publication IN20110276311 published Mar. 22, 2013, 3 pages.
Chaudhari et al., (2014). "Effect of certain natural products and organic solvents on quorum sensing in Chromobacterium violaceum," Asian Pac J Trop Med., 7(S1):S204-211.
Dineshkumar et al., (2013). "Effect of detoxified karanja (*Pongamia* spp.) cake on testicular architecture and semen production in ram lambs," Animal, 7(10): 1697-1703.
Dunford, (2016). "Oil and Oilseed Processing II," Available online at <https://extension.okstate.edu/fact-sheets/oil-and-oilseed-processing-ii.html>, 4 pages.
Fresh Fry (2025). "The Perfect Frying Oil Temp for Common Cooking Oils," available online at <https://freshfry.me/blogs/news/the-perfect-frying-oil-temp-for-common-cooking-oils>, accessed Apr. 11, 2025, 7 pages.
Gautam et al., (2014). "Physical characterization and comparison of biodiesel produced from edible and non-edible oils of Madhuca indica (mahua), Pongamia pinnata (karanja), and Sesamum indicum (til) plant oilseeds," Biomass Conv Bioref, 4:193-200.
Gopan et al., (2019). "Karanj protein isolate prepared from karanj seed cake: Effect on growth, body composition and physiometabolic responses in Labeo rohita fingerlings," Aquaculture Nutrition, 26:737-751.
Heuzé et al., (2017). "Feedipedia: Karanja (Millettia pinnata)," available online at <https://www.feedipedia.org/node/636>, Last updated on Jun. 15, 2017, 17:33, 2 pages.
Klonoff (2007). "Replacements for trans fats—will there be an oil shortage?" J Diabetes Sci Technol, 1(3):415-422.
LibreTexts Medicine (2025). "How Lipids Work," available online at <https://med.libretexts.org/Courses/Sacramento_City_College/SCC%3A_Nutri_300_(Coppola)/Text/05%3A_Lipids/5.3%3A_How_Lipids_Work>, accessed Apr. 12, 2025, 5 pages.
Murakami (2015). "Counter-Current Distribution Extraction: From Solvent Extraction to Chromatography (Chemistry of Separation and Analysis)," Chemistry and Education, 63(1):32-37, English abstract.
Prabhu et al., (2013). "Rumen fermentation, immunity and urine characteristics of lambs fed detoxified karanj (Pongamia glabra vent) seed cake as protein supplement," Indian Journal of Animal Nutrition, 30(3):325-329. Abstract only.
Search Report received for Taiwan Patent Application No. 110112422 issued on Mar. 3, 2025, 1 page.
Singh et al., (2017). "Modification of Pongamia pinnata (Linn.) Seed Chemicals and Their Fungicidal Activities," Nature Environment and Pollution Technology, 16(2):523-527.
Sulzer Ltd. (2025). "Kühni Agitated Columns from Sulzer," Available online at <https://www.news-medical.net/kuhni-agitated-columns-from-sulzer>, 3 pages.
The Engineering ToolBox (2025). "Food Products—Viscosities," available online at <https://www.engineeringtoolbox.com/absolute-viscosity-foods-d_1827.html> accessed Apr. 11, 2025, 6 pages.
Tiwari et al., (2024). "Phytopharmacological insights into Pongamia pinnata and Rubia cordifolia: Antibacterial and antioxidant activities with mechanistic perspectives," International Journal of Green Pharmacy, 18(4):208-215.
Yin et al., (2004). "Study on Flavonoids from Stem Bark of Pongamia pinnata," Zhong Yao Cai (Journal of Chinese Medicinal Materials), 27(7):493-495. English abstract.

200

202    Providing a first pongamia composition

204    Combining the first pongamia composition with a solvent comprising an alkyl alkanoate solvent to provide an extraction mixture 206    Separating the extraction mixture into a miscella and a second pongamia composition

Total Karanjin Extracted (ppm)

MTBE (72hr-Soxhlet)

Ethanol (homogenization)

Ethyl acetate (homogenization-50:1 solvent; 10min/cycle)

MTBE (96hr-Soxhlet)

n-Hexane (homogenization)

MTBE (48hr-Soxhlet)

Acetone (homogenization)

MTBE (6hr-Soxhlet)

MTBE (homogenization)

MTBE (24hr-Soxhlet)

Toluene (homogenization)

Ethyl acetate (72hr-Soxhlet)

Ethyl acetate (48hr-Soxhlet)

Diethyl ether (homogenization)

Ethyl acetate (96hr-Soxhlet)

Ethyl acetate (24hr-Soxhlet)

Ethyl acetate (Soxhlet; 6hr)

Ethyl acetate (homogenization)

0    1000 2000 3000 4000 5000 6000 7000 8000 9000

Total Karanjin Extracted (ppm)

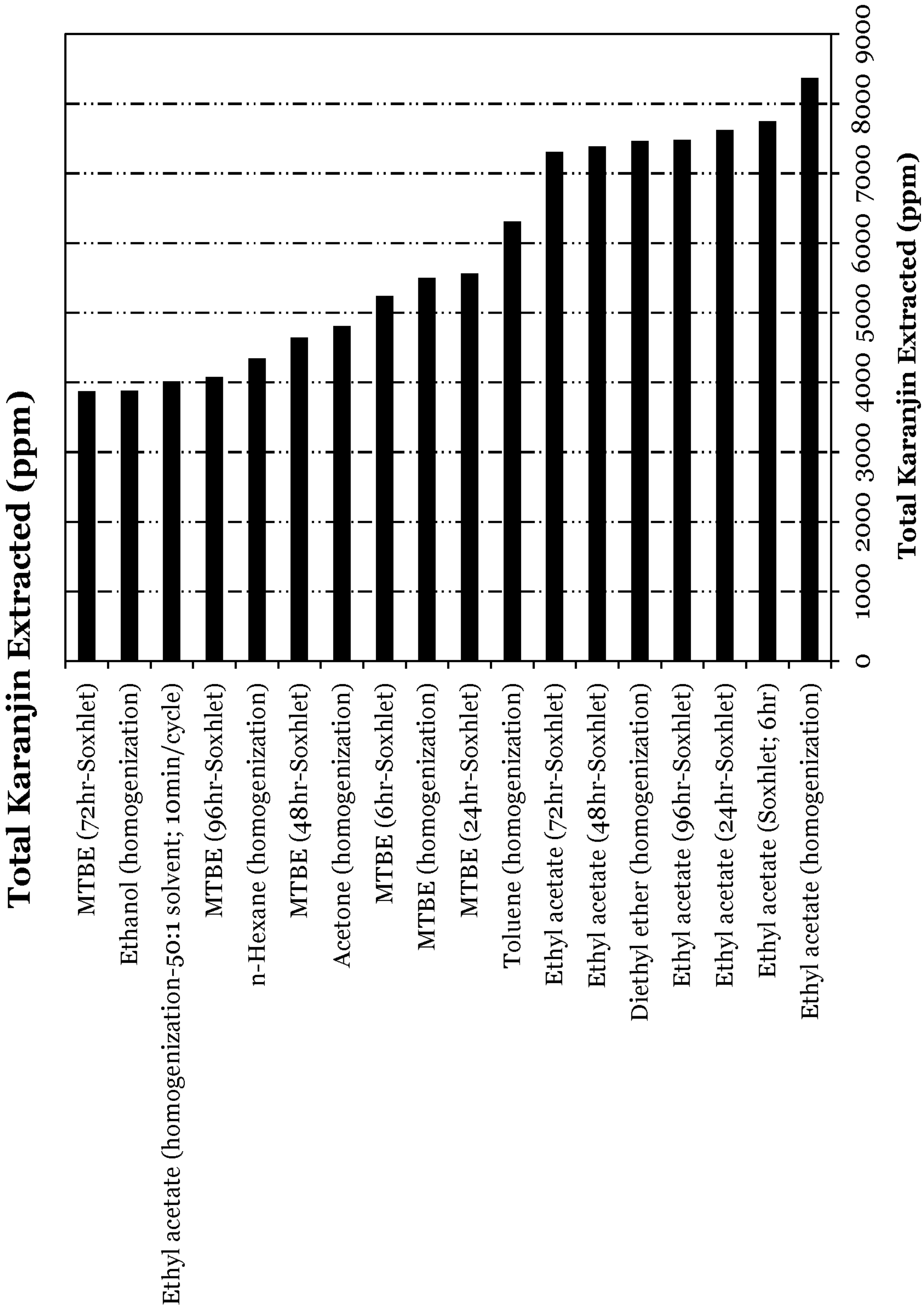

*FIG. 4A*

PONGAMIA COMPOSITIONS, METHODS OF PREPARING AND ANALYZING THEREOF, AND USES THEREOF

CROSS-REFERENCE TO RELATED APPLICATIONS

This application is a national stage application under 35 U.S.C. § 371 of International Application No. PCT/US2019/054579, filed internationally on Oct. 3, 2019, which claims priority to and the benefit of U.S. Provisional Application No. 62/741,351, filed on Oct. 4, 2018, the entire disclosures of which are incorporated herein by reference in their entireties.

FIELD

The present disclosure relates generally to pongamia oilseed products, and more specifically to pongamia compositions having low concentrations of residual pongamia oil, karanjin and pongamol, and methods of preparing and using such pongamia compositions. The present disclosure also relates to methods for analyzing pongamia compositions prepared by the methods described herein as well as by other treatment methods known in the art. The present disclosure also relates to uses of the pongamia compositions as feed for cattle and other ruminants.

BACKGROUND

*Pongamia* seedcake, a byproduct of oil extraction from *pongamia* oilseeds, offers a potential renewable source of protein for use in foodstuffs. However, crude *pongamia* seedcake contains residual oil and intrinsic chemical components, such as karanjin and pongamol. It is desirable to reduce the amount of karanjin and pongamol in the seedcake for use as a suitable food source. Notably, karanjin and pongamol have been identified as economically valuable on their own merits and, as a result, various treatments have been explored for the extraction of karanjin and pongamol in high purity from crude *pongamia* seedcake. However, existing methods often result in the incomplete removal of the residual oil, karanjin and pongamol from the *pongamia* seedcake and, thus, preclude downstream use of the seedcake itself.

Presently, there is a need for *pongamia* compositions having low concentrations of residual oil, karanjin and pongamol, as well as improved methods for extracting the karanjin and pongamol more completely and thoroughly from crude *pongamia* seedcake.

Further, a major impediment to the development of improved extraction methods has been the absence of a standardized method for evaluating levels of karanjin and pongamol remaining in the seedcake after such treatments. Although there currently exist many methods for quantifying residual karanjin and pongamol in *pongamia* seedcake after extraction treatments, these methods are often inaccurate and/or imprecise.

The majority of analytical methods measure karanjin and pongamol concentrations in *pongamia* compositions by determining the concentrations of these chemical components present in the corresponding methanol or hexane solvent extracts, thus providing an estimate of the concentrations in the *pongamia* composition by proxy. However, because such methods rely upon the efficiency of the methanol or hexane extraction, and such efficiency will vary for each method depending upon the nature of the material being analyzed and its prior treatment history, these methods report inaccurate values of karanjin and other chemical compounds in *pongamia* seedcake. Moreover, different analytical methods report varying oil, karanjin and pongamol concentrations for the same *pongamia* seedcake sample, and often do not provide an internally consistent reference scale across different treatments. Consequently, a meaningful comparison of different treatment methods based on existing analytical methods has been difficult in the art.

Thus, there is a need not only for *pongamia* compositions having low concentrations of residual oil, karanjin and pongamol and alternative methods to produce such *pongamia* compositions, but also for more accurate methods for analyzing *pongamia* compositions produced by various treatment methods in general.

BRIEF SUMMARY

In one aspect, provided herein is a method, comprising: combining a *pongamia* composition with an alkyl alkanoate solvent, to provide an extraction mixture; irradiating the extraction mixture with microwave radiation to provide an irradiated mixture; separating the irradiated mixture into an extracted *pongamia* composition and an alkyl alkanoate extract; and measuring a karanjin concentration in the alkyl alkanoate extract.

In another aspect, provided herein is a method, comprising: providing a first *pongamia* composition, wherein the first *pongamia* composition is a deoiled *pongamia* seedcake obtained by mechanical extraction and comprises 8-30% oil by weight; combining the first *pongamia* composition with an alkyl alkanoate solvent to provide an extraction mixture; and separating the extraction mixture into a miscella and a second *pongamia* composition, wherein the second *pongamia* composition has (i) a karanjin concentration that is less than 20% of the karanjin concentration in the first *pongamia* composition or (ii) a karanjin concentration that is less than or equal to 100 ppm.

In still another aspect, provided herein is a *pongamia* composition, comprising: karanjin; and at least one or more components selected from the group consisting of carbohydrates, proteins, fiber, ash, tannins, trypsin inhibitors, other furanoflavonoids, and chalcones. In some variations, the *pongamia* composition has a karanjin concentration of less than or equal to 100 ppm. In certain variations, the karanjin concentration is determined by processing the *pongamia* composition with an alkyl alkanoate solvent under microwave irradiation.

In certain aspects, provided are *pongamia* compositions produced according to the methods herein. In another aspect, provided herein is a feed composition, comprising any of the *pongamia* compositions described herein.

In yet other aspects, provided is a method of feeding a ruminant, comprising providing any of the *pongamia* compositions as described herein or a feed composition as described herein to the ruminant.

DESCRIPTION OF THE FIGURES

The present application can be understood by reference to the following description taken in conjunction with the accompanying figures.

FIGS. 4A and 4B depict bar charts comparing the total concentration of karanjin and pongamol (in ppm, adjusted for starting material amount) extracted from deoiled *pongamia* seedcake using various solvents (methyl tert-butyl ether, ethanol, hexane, toluene, and ethyl acetate) in combination with various extraction methods.

DETAILED DESCRIPTION

Figure 1:
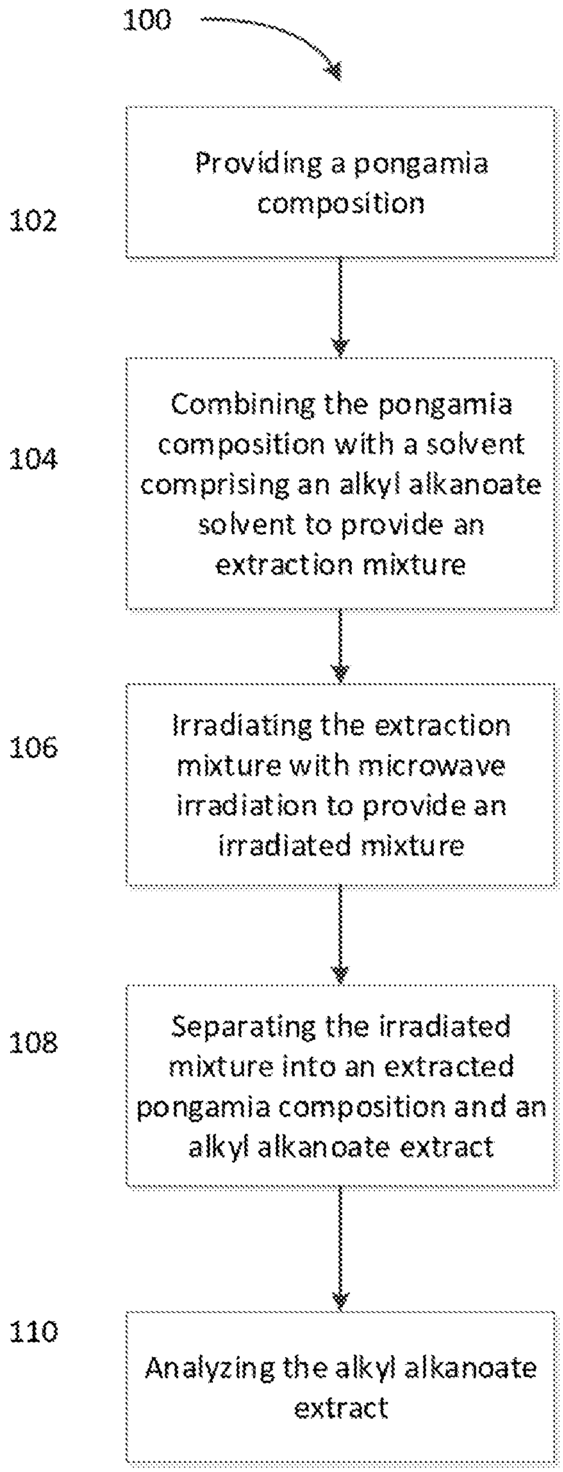
FIG. 1 depicts an exemplary process for analyzing a *pongamia* composition.

The following description sets forth exemplary methods, parameters and the like. It should be recognized, however, that such description is not intended as a limitation on the scope of the present disclosure but is instead provided as a description of exemplary embodiments.

The following description relates *pongamia* compositions having low concentrations of karanjin and pongamol, and methods of preparing and using the *pongamia* compositions having low karanjin concentrations thereof, as well as methods for analyzing *pongamia* compositions.

Methods of Analyzing *Pongamia* Compositions

In some aspects, provided herein are methods of analyzing *pongamia* compositions. In some embodiments, provided herein are methods of determining concentrations of karanjin and pongamol in *pongamia.*

Oilseeds harvested from *pongamia* (also known as "*Cytisus pinnatus", "Dalbergia arborea", "Derris indica", "Galedupa pungum*", "karanj", "*Millettia pinnata*", "pongam", "*pongamia", "Pongamia glabra", "Pterocarpus flavus", "Pongamia pinnata", and "Robinia mitis*", "Indian beech", and "mempari") are highly valued as a renewable source of oil. For example, renewed interest in non-petroleum-based fuel sources has led to the use of *pongamia* oil as a feedstock to generate biodiesel in many parts of the world.

The deoiled *pongamia* seedcake that remains following the extraction of oil from the *pongamia* oilseeds has long been recognized as a potential renewable source of protein that could be used as a nutritional supplement. However, deoiled *pongamia* seedcake contains high concentrations of karanjin and pongamol, which have generally prevented the use of seedcake in food products without any deleterious health effects. These compounds can render the seedcake inedible and potentially harmful to humans and animals. Prior attempts to develop edible *pongamia* compositions have been unsuccessful in part due to the fact that consistent acceptable maximum thresholds for karanjin concentrations and other anti-nutrients for consumption have not yet been established. Moreover, existing methods for analyzing *pongamia* compositions have been inaccurate and unreliable such that assessing karanjin concentrations in *pongamia* compositions, let alone the further determining maximum acceptable karanjin concentrations, is a formidable endeavor. Thus, there remains a need for more accurate methods for determining the levels of karanjin and other anti-nutritional compounds present in *pongamia* compositions.

The present disclosure addresses this need by providing methods of analyzing *pongamia* compositions, namely methods of determining concentrations of karanjin and other chemical compounds intrinsic to *pongamia* oilseeds, with greater accuracy and precision than existing methods. Specifically, in some aspects, the present disclosure provides a microwave-assisted solvent extraction analytical method for determining concentrations of karanjin and pongamol in *pongamia* compositions. The solvents suitable for use in such methods are described herein, and may include solvents comprising alkyl alkanoate(s).

Surprisingly, it has been found not only that the analytical methods of the present disclosure provide a more accurate measure of karanjin and pongamol in *pongamia* compositions than previously existing methods do, but also that the same prior methods using hexane- and methanol-based assays significantly underreport the concentration of residual karanjin in treated *pongamia* compositions. The use of an alkyl alkanoate solvent comprising at least one alkyl alkanoate, including in combination with microwave irradiation, leads to improved extraction efficiency of karanjin and pongamol from *pongamia* compositions and, consequently, improved quantification of residual karanjin and pongamol remaining *pongamia* compositions after treatment. As such, the analytical methods described herein provide a broadly applicable but reliable means of detecting and quantifying the presence of karanjin and pongamol in a variety of *pongamia*-derived compositions, and at concentrations lower than those that can be detected with traditional hexane- and methanol-based methods.

In one aspect, provided herein is a method for analyzing *pongamia* compositions wherein the method comprises combining a *pongamia* composition with an alkyl alkanoate solvent to provide an extraction mixture, irradiating the extraction mixture with microwave radiation to provide an irradiated mixture, separating the irradiated mixture into an extracted *pongamia* composition and an alkyl alkanoate extract, and measuring concentrations of karanjin and pongamol in the alkyl alkanoate extract and, thus, the corresponding concentrations in the *pongamia* composition by proxy. In another aspect, provided herein is a method of determining concentrations of karanjin and pongamol in a *pongamia* composition comprising processing the *pongamia* composition with an alkyl alkanoate solvent under microwave irradiation.

With reference to FIG. 1, process 100 is an exemplary process to analyze a *pongamia* composition. In step 102, a

*pongamia* composition is provided. The *pongamia* composition is combined with an alkyl alkanoate solvent in step 104, thereby providing an extraction mixture. The extraction mixture comprises the *pongamia* composition and alkyl alkanoate solvent. The extraction mixture is irradiated with microwave irradiation in step 106 to provide an irradiated mixture. The irradiated mixture is separated in step 108 to produce an extracted *pongamia* composition and an alkyl alkanoate extract. In step 110, the alkyl alkanoate extract is analyzed.

It should be understood that, in other variations, process 100 may include additional processing steps. In yet other variations, certain steps in process 100 may be omitted.

In one variation, provided is a method for analyzing *pongamia* compositions, the method comprising: combining a *pongamia* composition with an alkyl alkanoate solvent to provide an extraction mixture; irradiating the extraction mixture with microwave radiation to provide an irradiated mixture; separating the irradiated mixture into an extracted *pongamia* composition and an alkyl alkanoate extract; and measuring a karanjin concentration in the alkyl alkanoate extract.

In some embodiments, the *pongamia* composition comprises *pongamia* seed. In other embodiments, the *pongamia* composition comprises deoiled *pongamia* seedcake. In certain embodiments, the *pongamia* composition comprises *pongamia* seed and/or deoiled *pongamia* seedcake.

In variations of the foregoing wherein the *pongamia* composition is a deoiled *pongamia* seedcake, the deoiled *pongamia* seedcake is obtained by mechanical extraction. In certain embodiments, the deoiled *pongamia* seedcake is obtained by mechanical extraction of *pongamia* seed. In other embodiments, the deoiled *pongamia* seedcake is obtained by mechanical extraction of *pongamia* seedcake. In certain embodiments, the deoiled *pongamia* seedcake is obtained by mechanical extraction with an expeller press. In other embodiments wherein the *pongamia* composition comprises deoiled *pongamia* seedcake, the deoiled *pongamia* seedcake is obtained by solvent extraction of *pongamia* seed or *pongamia* seedcake. In certain embodiments, the deoiled *pongamia* seedcake is obtained by solvent extraction of *pongamia* seedcake with an alkyl alkanoate solvent containing at least one alkyl alkanoate, such as ethyl acetate. In still yet other embodiments wherein the *pongamia* composition comprises deoiled *pongamia* seedcake, the deoiled *pongamia* seedcake is obtained by mechanical extraction, solvent extraction, or a combination thereof.

In some embodiments of the foregoing method, the *pongamia* composition is combined with an alkyl alkanoate solvent. In some variations, an alkyl alkanoate solvent is a solvent comprising at least one alkyl alkanoate. In certain variations, the solvent comprises one alkyl alkanoate. In other variations, the solvent comprises a mixture of alkyl alkanoates. The alkyl alkanoate solvent may contain only alkyl alkanoate(s) or, alternatively, may contain one or more further co-solvents which are not alkyl alkanoates. In some embodiments, the *pongamia* composition is combined with an alkyl alkanoate solvent containing at least one alkyl alkanoate. In certain embodiments, the alkyl alkanoate solvent comprises at least one alkyl alkanoate, and one or more co-solvents that are not alkyl alkanoates. In other embodiments, the alkyl alkanoate solvent contains at least one alkyl alkanoate but does not contain any co-solvents that are not alkyl alkanoates. In some variations, "alkyl alkanoate" includes at least one ester group, in which the hydrogen atom of a carboxylic acid group is replaced by an alkyl group. In certain variations, alkyl alkanoate includes one ester group, in which the hydrogen atom of a carboxylic acid group is replaced by an alkyl group.

In some embodiments of the solvent, the alkyl of the alkyl alkanoate is methyl, ethyl, propyl, or butyl. In other embodiments, the solvent comprises a methyl alkanoate, an ethyl alkanoate, a propyl alkanoate, or a butyl alkanoate, or any combinations thereof. In certain embodiments, the solvent comprises an ethyl alkanoate. In some embodiments, the alkanoate is ethanoate, propionate, butanoate, or pentanoate. In certain embodiments, the solvent comprises an alkyl ethanoate, an alkyl propionate, an alkyl butanoate, an alkyl pentanoate, or any combination thereof. In certain embodiments, the solvent comprises an alkyl ethanoate. In certain embodiments, the solvent comprises ethyl acetate. In other embodiments, the solvent is ethyl acetate.

In some embodiments, the alkyl alkanoate solvent comprises an alkyl alkanoate selected from the group consisting of methyl methanoate, methyl ethanoate, methyl propanoate, methyl butanoate, methyl pentanoate, ethyl methanoate, ethyl ethanoate, ethyl propanoate, ethyl butanoate, ethyl pentanoate, propyl methanoate, propyl ethanoate, propyl propanoate, propyl butanoate, propyl pentanoate, butyl methanoate, butyl ethanoate, butyl propanoate, butyl butanoate, and butyl pentanoate, and any combinations thereof. In certain embodiments, the alkyl alkanoate solvent comprises an alkyl alkanoate selected from the group consisting of methyl ethanoate, methyl propanoate, methyl butanoate, ethyl methanoate, ethyl ethanoate, ethyl propanoate, ethyl butanoate, propyl methanoate, propyl ethanoate, propyl propanoate, propyl butanoate, butyl methanoate, butyl ethanoate, butyl propanoate, and butyl butanoate, and any combinations thereof.

It should also be recognized that the chemical names used herein in accordance with the International Union of Pure and Applied Chemistry (IUPAC) nomenclature standards may also be referred to by their corresponding common names, e.g., acetate for ethanoate, propionate for propanoate, butyrate for butanoate, valerate for pentanoate, etc. As such, an alkyl ethanoate may also be referred to as an acetate ester.

In other embodiments, the method comprises combining the *pongamia* composition with a solvent comprising at least one alkyl alkanoate of formula (I):

(I)

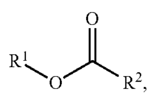

wherein:

$R^1$ is a $C_1$-$C_4$ alkyl; and $R^2$ is hydrogen or a $C_1$-$C_4$ alkyl.

In some embodiments, $R^1$ is a $C_1$-$C_4$ alkyl. In other embodiments, $R^2$ is hydrogen or a $C_1$-$C_4$ alkyl. In certain embodiments, $R^1$ and $R^2$ are independently $C_1$-$C_4$ alkyl. In certain other embodiments, $R^1$ is $C_1$-$C_4$ alkyl and $R^2$ is hydrogen.

In some embodiments wherein $R^1$ is a $C_1$-$C_4$ alkyl, $R^1$ is $CH_3$—, $CH_3CH_2$—, $CH_3CH_2CH_2$—, $(CH_3)_2CH$—, $CH_3CH_2CH_2CH_2$—, $CH_3CH_2(CH_3)CH$—, $(CH_3)_2CHCH_2$— or $(CH_3)_3C$—. In certain embodiments, $R^1$ is $CH_3CH_2$—. In other embodiments, $R^1$ is $CH_3CH_2CH_2CH_2$—. In still other embodiments, $R^1$ is $CH_3CH_2CH_2$—.

In some embodiments, $R^2$ is hydrogen. In other embodiments, $R^2$ is $C_1$-$C_4$ alkyl. In some embodiments wherein $R^2$ is a $C_1$-$C_4$ alkyl, $R^2$ is $CH_3$—, $CH_3CH_2$—, $CH_3CH_2CH_2$—, $(CH_3)_2CH$—, $CH_3CH_2CH_2CH_2$—, $CH_3CH_2(CH_3)CH$—, $(CH_3)_2CHCH_2$— or $(CH_3)_3C$—. In certain embodiments, $R^2$ is hydrogen, $CH_3$—. $CH_3CH_2$—, or $CH_3CH_2CH_2$—.

In still yet other embodiments, $R^1$ is $CH_3CH_2$— and $R^2$ is $CH_3$—. In some embodiments, $R^1$ is $CH_3CH_2$— or $CH_3CH_2CH_2CH_2$—, and $R^2$ is hydrogen. In other embodiments, $R^1$ is $CH_3CH_2CH_2$— and $R^2$ is $CH_3CH_2CH_2$— or $CH_3CH_2CH_2CH_2$—.

In other embodiments, $R^1$ is a $C_1$-$C_3$ alkyl. In yet other embodiments, $R^1$ is methyl, ethyl, n-propyl, or isopropyl. In certain embodiments, $R^1$ is ethyl. In some embodiments, $R^1$ is a $C_2$-$C_4$ alkyl. In certain embodiments, $R^1$ is ethyl, n-propyl, isopropyl, n-butyl, sec-butyl, isobutyl, or t-butyl. In other embodiments, $R^2$ is hydrogen or a $C_1$-$C_3$ alkyl. In certain embodiments, $R^2$ is hydrogen, methyl, ethyl, n-propyl, or isopropyl. In certain embodiments, $R^2$ is methyl. In yet other embodiments, $R^1$ is ethyl and $R^2$ is methyl.

The analytical method of the present disclosure employs the alkyl alkanoate solvents described herein in combination with microwave irradiation to provide a high extraction efficiency of karanjin and pongamol, thereby yielding more accurate measurements of karanjin concentrations than other analytical methods based on, for example, methanol or hexane extraction. In some embodiments, the alkyl alkanoate solvents used in the analytical methods described herein exclude certain co-solvents. In some embodiments of the foregoing method of analyzing, the alkyl alkanoate solvent that is combined with the *pongamia* composition does not contain an alcohol, alkane, ketone, ether, and/or aromatic hydrocarbon. In certain embodiments, the solvent does not contain methanol, ethanol, propanol, hexane, methyl tert-butyl ether, diethyl ether, toluene, benzene, or acetone. In still other embodiments, the alkyl alkanoate solvent does not contain a diketone or diester, e.g., succinates, sebacates, glutarates, or malonates.

It should be recognized, however, that in some variations, the alkyl alkanoate solvent may contain trace quantities or residual levels of the excluded solvents disclosed above. These additional solvent traces may, for example, be introduced into the alkyl alkanoate solvent through standard chemical manufacturing or handling procedures. Residual levels of the solvents, such as methanol or hexane, may be maintained below a certain threshold of total impurities in the alkyl alkanoate solvent that is considered acceptable for standard analytical measurements, such that the efficacy of the analytical method described herein is not significantly impacted. For example, in some embodiments, the alkyl alkanoate solvent comprises one or more further solvents that are not alkyl alkanoate solvents, wherein total concentration of the one or more further solvents is less than 5%, less than 4%, less than 3%, less than 2% or less than 1% of the solvent.

In some embodiments, the method comprises combining the *pongamia* composition and the alkyl alkanoate solvent to provide an extraction mixture. In certain embodiments, combining the *pongamia* composition and the alkyl alkanoate solvent may comprise mixing, agitating or stirring the *pongamia* composition and the alkyl alkanoate solvent together to provide the extraction mixture. In other embodiments, combining the *pongamia* composition and the alkyl alkanoate solvent may comprise heating the *pongamia* composition and alkyl alkanoate solvent to provide the extraction mixture. It should be recognized that the *pongamia* composition and the alkyl alkanoate solvent may also be individually agitated or stirred, or heated, prior to being combined. It should also be recognized that the methods of the present disclosure also provide for variations of other parameters that may be part of the combining step including, for example, the duration of time for which the *pongamia* composition and the alkyl alkanoate solvent are combined, the temperature and/or pressure at which they are combined, the ratio of *pongamia* composition to alkyl alkanoate solvent being combined, and other physical properties of the *pongamia* composition, such as particle size distribution.

In some embodiments, the extraction mixture is irradiated to provide an irradiated mixture. In certain embodiments, the extraction mixture is irradiated with microwave irradiation to provide an irradiated mixture. In some embodiments, the extraction mixture is irradiated using a microwave extractor. In other embodiments, the present disclosure also provides for variations of parameters that may relate to the irradiation step including, for example, the duration of time, temperature, pressure, and frequency of microwave irradiation at which the extraction mixture is irradiated.

It should be noted that the analytical method of the present disclosure, by virtue of the combination of the alkyl alkanoate solvent and microwave irradiation, does not require certain techniques that are commonly used in existing analytical methods, such as Soxhlet extraction, pre-soaking *pongamia* seeds or seedcake with sodium hydroxide or pre-treating *pongamia* seeds or seedcake with sub-critical water/steam. For example, in some embodiments, the present disclosure provides a method of analyzing, wherein the method does not comprise Soxhlet extraction. In other embodiments, the method of analyzing does not comprise soaking *pongamia* seeds or seedcake in a base (e.g., a hydroxide solution).

In some embodiments, the irradiated mixture is separated into a solid component and a liquid component. The solid component is referred to herein as an extracted *pongamia* composition, and the liquid component is referred to as a solvent extract (or alternatively, an alkyl alkanoate extract). The irradiated mixture may be separated into the extracted *pongamia* composition and the solvent extract by any suitable methods known in the art for solid-liquid separation. For example, in certain embodiments, the irradiated mixture is separated by centrifugation. In some embodiments, the irradiated mixture is separated by decanting. In other embodiments, the irradiated mixture is separated by filtration.

In some embodiments, the extracted *pongamia* composition comprises any solid matter and/or intrinsic chemical components that were originally present in the *pongamia* composition combined with the alkyl alkanoate solvent but which were insoluble in the alkyl alkanoate solvent and, thus, were not partitioned into the liquid phase of the extract.

In some variations, the solvent extract comprises the alkyl alkanoate solvent (including alkyl alkanoate and any co-solvents) and certain chemical components that are intrinsic to *pongamia* and which have been extracted from the *pongamia* composition into the alkyl alkanoate solvent. In some embodiments, the extract comprises furanoflavonoids. Furanoflavonoids may be further identified by sub-classes including, for example, flavones, flavonols (e.g., karanjin) and dibenzoylmethanes (e.g., pongamol). In certain embodiments, the extract comprises karanjin. In other embodiments, the extract comprises pongamol. In some embodiments, the extract comprises karanjin and other furanoflavonoids. In some embodiments, the extract comprises at least one or more furanoflavonoids selected from the group consisting of karanjin, pongamol, lanceolatin, kanjone, pongaglabrone, pongaglabol, ovalifolin, sanaganone, pinnatin, gamatin, pongone, glabone, karanjonol, pongapin, pachycarin, pongaglabol methyl ether, isopongaglabol, methoxyisopongaglabol, pongol methyl ether, millettocalyxin, 6-methoxyisopongaglabol, pongamoside A, pongamoside B, ponganone XI, pongamoside C, glabra I, ovalitenone, ponganone IX, and pongarotene.

In some embodiments, following separation of the irradiated mixture into an extracted *pongamia* composition and a solvent extract, the method further comprises analyzing the solvent extract. As described herein, the step of analyzing the solvent extract involves measuring concentrations of certain chemical components in the solvent extract, which serve as proxy measurements for the concentrations of such chemical components originally present in the *pongamia* composition. In some embodiments, the method comprises measuring individual concentrations of one or more furanoflavonoids in the solvent extract. In certain embodiments, the method comprises measuring a karanjin concentration in the solvent extract. In other embodiments, the method comprises measuring a pongamol concentration in the solvent extract.

The measurement of the concentrations of karanjin, pongamol and other furanoflavonoids in the solvent extract may be performed using analytical separation and detection techniques known in the art. In some embodiments, the concentrations of karanjin, pongamol and other furanoflavonoids are determined by high-performance liquid chromatography (HPLC). In other embodiments, the concentrations of karanjin, pongamol and other furanoflavonoids are determined by HPLC-mass spectrometry (HPLC-MS). In certain embodiments, the concentrations of karanjin, pongamol and other furanoflavonoids are determined by HPLC-tandem mass spectrometry (HPLC-MS/MS). In some embodiments, the concentrations of karanjin, pongamol and other furanoflavonoids are determined by HPLC-ultraviolet-visible spectrophotometry (HPLC-UV-vis).

In some variations, the method of analyzing as described herein may be referred to as a "microwave-assisted alkyl alkanoate solvent extraction analytical method". In certain embodiments wherein a particular alkyl alkanoate is employed in the alkyl alkanoate solvent, the extraction may be referred to more specifically by the particular alkyl alkanoate being used. For example, in certain embodiments of the foregoing methods wherein the alkyl alkanoate solvent comprises ethyl acetate, the method of analyzing may be referred to as a "microwave-assisted ethyl acetate extraction analytical method".

It should be recognized that reference to the "microwave-assisted alkyl alkanoate solvent extraction analytical method" includes embodiments in which the alkyl alkanoate solvent contains at least one alkyl alkanoate solvent and optionally one or more co-solvents that are not alkyl alkanoates. For example, "microwave-assisted ethyl acetate extraction analytical method" may refer to the use of an alkyl alkanoate solvent containing ethyl acetate and optionally one or more co-solvents.

Methods of Preparing *Pongamia* Compositions

As described above, prior efforts to develop improved methods for preparing *pongamia* compositions having low concentrations of residual oil, karanjin and pongamol have been previously hampered by the unreliability and inconsistency of existing analytical methods for determining such concentrations. However, the development of improved methods for the preparation of *pongamia* compositions having low concentrations of karanjin is now made possible by virtue of the analytical method as described above, which offers greater accuracy and reliability for karanjin concentration measurements. Thus, the present disclosure provides more efficient methods to remove karanjin and other furanoflavonoids from *pongamia* seed and seedcake, including the methods of preparing *pongamia* compositions as described below, wherein the *pongamia* composition has a low karanjin concentration. More specifically, the present disclosure provides methods of preparing *pongamia* compositions, wherein the *pongamia* composition comprises karanjin and has a karanjin concentration of less than or equal to 100 ppm.

In one aspect, provided herein are methods of preparing *pongamia* compositions having low karanjin concentrations as determined by the microwave-assisted alkyl alkanoate solvent extraction analytical methods described above. In some embodiments, provided herein are methods of preparing *pongamia* compositions, wherein the *pongamia* compositions have karanjin concentrations of less than or equal to 100 ppm as determined by the microwave-assisted alkyl alkanoate solvent extraction analytical methods described above. In other embodiments, provided herein are methods of preparing *pongamia* compositions, wherein the *pongamia* compositions have 20% less karanjin, as determined by the microwave-assisted alkyl alkanoate solvent extraction analytical methods described above, as compared to the initial or first *pongamia* compositions from which they were obtained.

In one aspect, provided herein is a method for preparing *pongamia* compositions wherein the method comprises combining a first *pongamia* composition with an alkyl alkanoate solvent to provide an extraction mixture, and separating the extraction mixture to provide a miscella and a second *pongamia* composition, wherein the second *pongamia* composition has (i) a karanjin concentration that is less than 20% of the karanjin concentration in the first *pongamia* composition, or (ii) a karanjin concentration of less than or equal to 100 ppm.

Figure 2:
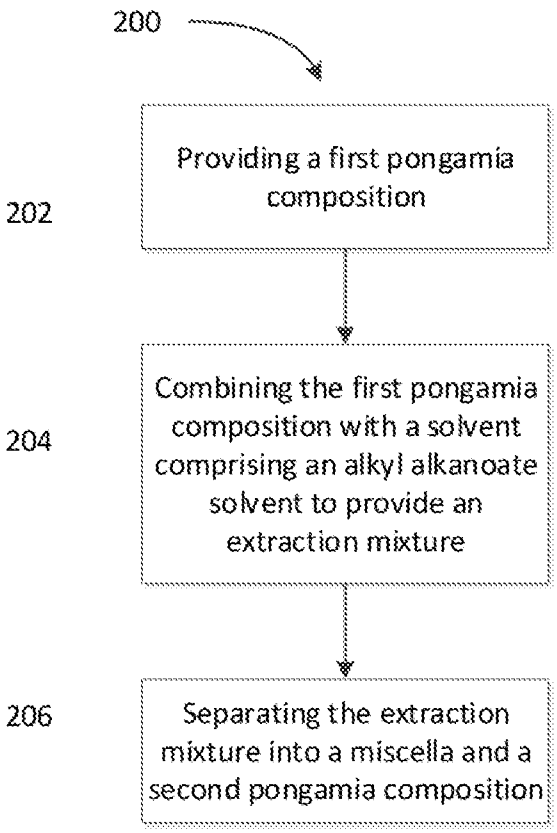
FIG. 2 depicts an exemplary process for preparing a *pongamia* composition having a karanjin concentration less than or equal to 100 ppm.

With reference to FIG. 2, process 200 is an exemplary process to prepare a *pongamia* composition. In step 202, a first *pongamia* composition is provided. The first *pongamia* composition is combined with an alkyl alkanoate solvent in step 204, thereby providing an extraction mixture. The extraction mixture is separated in step 206 to produce a second *pongamia* composition and a miscella.

It should be understood that, in other variations, process 200 may include additional processing steps. In yet other variations, certain steps in process 200 may be omitted.

In one variation, provided is a method for preparing *pongamia* compositions, the method comprising: providing a first *pongamia* composition; combining the first *pongamia* composition with a solvent comprising at least one alkyl alkanoate to provide an extraction mixture; and separating the extraction mixture into a miscella and a second *pongamia* composition. In certain variations, the second *pongamia* composition has (i) a karanjin concentration that is less than 20% of the karanjin concentration in the first *pongamia* composition, or (ii) a karanjin concentration that is less than or equal to 100 ppm.

In some embodiments, the first *pongamia* composition is obtained from plant material derived from a *pongamia* tree or plant (also known as "*Cytisus pinnatus*", "*Dalbergia arborea*", "*Derris indica*", "*Galedupa pungum*", "karanj", "*Millettia pinnata*", "pongam", "*pongamia*", "*Pongamia glabra*", "*Pterocarpus flavus*", "*Pongamia pinnata*", and "*Robinia mitis*", "Indian beech", and "mempari").

In some embodiments, the first *pongamia* composition is a deoiled *pongamia* seedcake. The deoiled *pongamia* seedcake may be described in terms of the preceding treatment through which the deoiled *pongamia* seedcake was obtained. For example, in some embodiments, the first *pongamia* composition is a deoiled *pongamia* seedcake, wherein the deoiled *pongamia* seedcake is obtained by mechanical extraction. In other embodiments, the first *pongamia* composition is a deoiled *pongamia* seedcake obtained by mechanical extraction of *pongamia* seed or *pongamia* seedcake. In certain embodiments, the deoiled *pongamia* seedcake is obtained by mechanical extraction using an expeller press. It should be recognized that one or more iterations of the mechanical extraction may be applied to either the *pongamia* seed and/or seedcake to provide a deoiled *pongamia* seedcake as the first *pongamia* composition. In some embodiments, the first *pongamia* composition is not *pongamia* oilseed or oilseeds. In other embodiments, the first *pongamia* composition is not a deoiled *pongamia* seedcake obtained by solvent extraction.

The first *pongamia* composition may be further defined by other attributes including, for example, its karanjin concentration, oil content, moisture content, and particle size distribution, which may be especially advantageous for the extraction of karanjin and pongamol from the first *pongamia* composition. For example, in some embodiments, the first *pongamia* composition has a karanjin concentration of at least 200 ppm. In other embodiments, the first *pongamia* composition has a karanjin concentration of at least 500 ppm. In some embodiments, the first *pongamia* composition comprises 8-40% oil by weight, 10-35% oil by weight, or 8-30% oil by weight. In certain embodiments, the first *pongamia* composition comprises 8-30% oil by weight.

In some embodiments of the foregoing method, providing the first *pongamia* composition may further comprise any steps to produce the first *pongamia* composition. For example, in some embodiments, the method comprises providing *pongamia* oilseeds and subjecting the *pongamia* oilseeds to mechanical extraction to provide a deoiled *pongamia* seedcake as the first *pongamia* composition. In certain embodiments, the method comprises mechanically pressing *pongamia* oilseeds to provide a deoiled *pongamia* seedcake as the first *pongamia* composition. In other embodiments, the method may comprise providing a deoiled seedcake and subjecting the deoiled *pongamia* seedcake to mechanical extraction to provide a first *pongamia* composition having a desired oil content and/or karanjin concentration. In still other embodiments, the method may comprise providing the first *pongamia* composition as described herein and further minimizing the oil content of the first *pongamia* composition. In yet other embodiments, the method may comprise providing a deoiled *pongamia* seedcake and further cracking the deoiled *pongamia* seedcake to provide a first *pongamia* composition having a desired particle size distribution.

In some embodiments of the foregoing methods, the first *pongamia* composition may be combined with any of the solvents described used in the analytical methods. For example, in some variations, the solvent is an alkyl alkanoate solvent. In certain variations, the alkyl alkanoate solvent may contain only alkyl alkanoates or, alternatively, may contain one or more further co-solvents which are not alkyl alkanoates. In certain embodiments, the solvent comprises at least one alkyl alkanoate and one or more co-solvents that are not alkyl alkanoates. In other embodiments, the solvent contains at least one alkyl alkanoate but does not contain any co-solvents that are not alkyl alkanoates. In certain embodiments, the solvent is an alkyl alkanoate.

In some embodiments, the alkyl of the alkyl alkanoate is methyl, ethyl, propyl, or butyl. In other embodiments, the solvent comprises a methyl alkanoate, an ethyl alkanoate, a propyl alkanoate, or a butyl alkanoate, or any combinations thereof. In certain embodiments, the solvent comprises an ethyl alkanoate. In some embodiments, the alkanoate of the alkyl alkanoate is methanoate, ethanoate, propionate, butanoate, or pentanoate. In other embodiments, the solvent comprises an alkyl methanoate, an alkyl ethanoate, an alkyl propionate, an alkyl butanoate, an alkyl pentanoate, or any combination thereof. In certain embodiments, the solvent comprises an alkyl ethanoate. In certain embodiments, the solvent comprises ethyl acetate. In other embodiments, the solvent is ethyl acetate.

In some embodiments, the solvent comprises an alkyl alkanoate solvent selected from the group consisting of methyl methanoate, methyl ethanoate, methyl propanoate, methyl butanoate, methyl pentanoate, ethyl methanoate, ethyl ethanoate, ethyl propanoate, ethyl butanoate, ethyl pentanoate, propyl methanoate, propyl ethanoate, propyl propanoate, propyl butanoate, propyl pentanoate, butyl methanoate, butyl ethanoate, butyl propanoate, butyl butanoate, and butyl pentanoate, and any combinations thereof. In certain embodiments, the solvent comprises an alkyl alkanoate solvent selected from the group consisting of methyl ethanoate, methyl propanoate, methyl butanoate, ethyl methanoate, ethyl ethanoate, ethyl propanoate, ethyl butanoate, propyl methanoate, propyl ethanoate, propyl propanoate, propyl butanoate, butyl methanoate, butyl ethanoate, butyl propanoate, and butyl butanoate, and any combinations thereof.

In other embodiments, the method comprises combining the first *pongamia* composition with an alkyl alkanoate solvent comprising at least one alkyl alkanoate of formula (I):

(I)

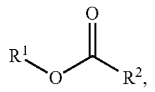

wherein $R^1$ is a $C_1$-$C_4$ alkyl; and $R^2$ is hydrogen or a $C_1$-$C_4$ alkyl.

In some embodiments, $R^1$ is a $C_1$-$C_4$ alkyl. In other embodiments, $R^2$ is hydrogen or a $C_1$-$C_4$ alkyl. In certain embodiments, $R^1$ and $R^2$ are independently $C_1$-$C_4$ alkyl. In certain other embodiments, $R^1$ is $C_1$-$C_4$ alkyl and $R^2$ is hydrogen.

In some embodiments wherein $R^1$ is a $C_1$-$C_4$ alkyl, $R^1$ is $CH_3$—, $CH_3CH_2$—, $CH_3CH_2CH_2$—, $(CH_3)_2CH$—, $CH_3CH_2CH_2CH_2$—, $CH_3CH_2(CH_3)CH$—, $(CH_3)_2CHCH_2$— or $(CH_3)_3C$—. In certain embodiments, $R^1$ is $CH_3CH_2$—. In other embodiments, $R^1$ is $CH_3CH_2CH_2CH_2$—. In still other embodiments, $R^1$ is $CH_3CH_2CH_2$—.

In some embodiments, $R^2$ is hydrogen. In other embodiments, $R^2$ is a $C_1$-$C_4$ alkyl. In certain embodiments wherein $R^2$ is a $C_1$-$C_4$ alkyl, $R^2$ is $CH_3$—, $CH_3CH_2$—, $CH_3CH_2CH_2$—, $(CH_3)_2CH$—, $CH_3CH_2CH_2CH_2$—, $CH_3CH_2(CH_3)CH$—, $(CH_3)_2CHCH_2$— or $(CH_3)_3C$—. In certain embodiments, $R^2$ is hydrogen, $CH_3$—, $CH_3CH_2$—, or $CH_3CH_2CH_2$—.

In still yet other embodiments, $R^1$ is $CH_3CH_2$— and $R^2$ is $CH_3$—. In some embodiments, $R^1$ is $CH_3CH_2$— or $CH_3CH_2CH_2CH_2$—, and $R^2$ is hydrogen. In other embodiments, $R^1$ is $CH_3CH_2CH_2$— and $R^2$ is $CH_3CH_2CH_2$— or $CH_3CH_2CH_2CH_2$—.

In other embodiments, $R^1$ is a $C_1$-$C_3$ alkyl. In yet other embodiments, $R^1$ is methyl, ethyl, n-propyl, or isopropyl. In certain embodiments, $R^1$ is ethyl. In some embodiments, $R^1$ is a $C_2$-$C_4$ alkyl. In certain embodiments, $R^1$ is ethyl, n-propyl, isopropyl, n-butyl, sec-butyl, isobutyl, or t-butyl. In other embodiments, $R^2$ is hydrogen or a $C_1$-$C_3$ alkyl. In certain embodiments, $R^2$ is methyl, ethyl, n-propyl, or isopropyl. In certain embodiments, $R^2$ is methyl. In yet other embodiments, $R^1$ is ethyl and $R^2$ is methyl. In still other embodiments, $R^2$ is hydrogen, ethyl or n-propyl. In yet further embodiments $R^1$ is ethyl, n-propyl, or n-butyl, and $R^2$ is hydrogen, methyl, ethyl, or n-propyl. In certain embodiments, $R^2$ is methyl. In yet other embodiments, $R^1$ is ethyl and $R^2$ is methyl.

In some embodiments, the alkyl alkanoate solvent is prepared in situ. For example, an alkyl alkanoate may be prepared by mixing the corresponding alcohol with the corresponding carboxylic acid. In some embodiments, the alkyl alkanoate of formula (I) is prepared in situ by mixing an alcohol $R^1$—OH with a carboxylic acid $R^2$—COOH, wherein $R^1$ and $R^2$ are as defined above. In certain embodiments wherein the alkyl alkanoate is ethyl acetate, the ethyl acetate is prepared in situ by mixing ethanol with acetic acid. In some embodiments, the alkyl alkanoate is prepared in situ prior to the alkyl alkanoate solvent being combined with the first *pongamia* composition. In other embodiments, the alkyl alkanoate is prepared in situ with the first *pongamia* composition. For example, in some embodiments, wherein the method comprises combining the first *pongamia* composition with a solvent comprising ethyl acetate and the ethyl acetate is prepared in situ, the method comprises mixing the first *pongamia* composition with ethanol and acetic acid.

In some variations, the solvent may contain one or more co-solvents that are not alkyl alkanoates. However, in some embodiments, the solvent excludes certain co-solvents. For example, in some variations, the alkyl alkanoate solvent does not contain an alkane, ketone, ether, and/or aromatic hydrocarbon. In certain embodiments, the alkyl alkanoate solvent does not contain hexane, methyl tert-butyl ether, diethyl ether, toluene, benzene, and/or acetone. In still other embodiments, the alkyl alkanoate solvent does not contain a diketone and/or diester, e.g., succinates, sebacates, glutarates, or malonates.

In some embodiments, the first *pongamia* composition and the solvent are combined to provide an extraction mixture. In certain embodiments, combining the first *pongamia* composition and the solvent comprises combining the first *pongamia* composition and the solvent in an extractor to provide an extraction mixture. In certain embodiments, the step of combining comprises mixing, agitating, or stirring the extraction mixture in an extractor. In some embodiments, combining the first *pongamia* composition and the solvent to provide an extraction mixture comprises heating the first *pongamia* composition and the solvent to provide an extraction mixture. In still other embodiments, the method further comprises heating the extraction mixture. It should be noted that the foregoing methods may include variations of other parameters that may be part of the combining step including, for example, the residence time of the extraction mixture in the extractor, extractor temperature and pressure, extractor chain speed, particle size distribution of the first *pongamia* composition, the ratio of first *pongamia* composition to the alkyl alkanoate solvent, and feed rates of the *pongamia* composition and alkyl alkanoate solvent into the extractor.

In some embodiments, the method may further comprise irradiating the extraction mixture with microwave irradiation. In certain embodiments, the extraction mixture is irradiated with microwave irradiation after the combining step and prior to the separating step. The present disclosure also provides for variations of parameters that may relate to the irradiation step including, for example, the duration of time, temperature, pressure, and frequency of microwave irradiation at which the extraction mixture is irradiated.

In some embodiments, the extraction mixture is separated into a miscella and a second *pongamia* composition. The miscella primarily contains the liquid fraction of the extraction mixture (oil, alkyl alkanoates solvent and any soluble compounds), whereas the second *pongamia* composition largely is composed of the residual insoluble solid material, or meal, that remains from the first *pongamia* composition. The step of separating the extraction mixture into a miscella and a second *pongamia* composition may include any suitable methods known in the art for the solid-liquid separations. In certain embodiments, the extraction mixture is separated by filtration. In other embodiments, the extraction mixture is separated by decanting.

In some embodiments, the miscella comprises a mixture of extracted oil, karanjin, other furanoflavonoids, and the alkyl alkanoate solvent (including alkyl alkanoate and any co-solvents). In other embodiments, the miscella has a karanjin concentration of equal to or greater than 4000 ppm. In certain embodiments, the miscella has a karanjin concentration of equal to or greater than 4000 ppm as measured by the method described above. In certain embodiments, the miscella may be characterized by oil content, water content, moisture content, solids content, or other characteristics known in the art.

In some embodiments, the second *pongamia* composition has a karanjin concentration of less than or equal to 100 ppm. In other embodiments, the second *pongamia* composition has a karanjin concentration that is less than 20% of the karanjin concentration in the first *pongamia* composition. In yet other embodiments, the second *pongamia* composition has a karanjin concentration of less than or equal to 100 ppm as determined by the microwave-assisted alkyl alkanoate solvent extraction analytical method described herein. In still yet other embodiments, the second *pongamia* composition has a karanjin concentration that is less than 20% of the karanjin concentration in the first *pongamia* composition as determined by the microwave-assisted alkyl alkanoate solvent extraction analytical method described herein.

By virtue of the efficacy of the methods of preparing as described herein, it should be recognized that the second *pongamia* composition has karanjin concentrations of less than or equal to 100 ppm. In some embodiments, the second *pongamia* composition may have concentrations of karanjin and/or pongamol on the order of single digit parts-per-million, or fractional amounts thereof. In some embodiments, the second *pongamia* compositions may have concentrations of karanjin and/or pongamol of less than 100 ppm that are non-detectable by traditional hexane- and methanol-based analytical methods. In still further embodiments, the second *pongamia* composition may have trace concentrations of karanjin and/or pongamol on the order of parts-per-billion (ppb) or parts-per-trillion (ppt). In the circumstances in which trace concentrations are present, the detection of the karanjin and pongamol by the microwave-assisted alkyl alkanoate solvent extraction analytical methods described herein may be limited by the detection limits of the liquid chromatographic techniques and materials used. In some embodiments, the trace amounts of karanjin and/or pongamol may be non-detectable by the alkyl alkanoate-based microwave-assisted solvent extraction analytical methods described herein.

As described above, the first *pongamia* composition may be obtained from plant material derived from a *pongamia* tree or plant. Accordingly, in some embodiments, the second *pongamia* composition that is obtained from the first *pongamia* composition by way of the methods described herein may also be characterized as having been obtained from plant material derived from a *pongamia* tree or plant (also known as "*Cytisus pinnatus", "Dalbergia arborea", "Derris indica", "Galedupa pungum*", "karanj", "*Millettia pinnata*", "pongam", *"pongamia", "Pongamia glabra", "Pterocarpus flavus", "Pongamia pinnata*", and "*Robinia mitis*", "Indian beech", and "mempari").

As further described above, the second *pongamia* composition largely is composed of the residual insoluble solid material, or meal, that remains from the first *pongamia* composition following extraction with alkyl alkanoate solvent and solid-liquid separation to remove the miscella. In some embodiments, the second *pongamia* composition is a meal. The resulting second *pongamia* compositions having a karanjin concentration less than or equal to 100 ppm as described herein may further comprise any of number of components, such as carbohydrates, proteins, fiber, ash, tannins, trypsin inhibitors, other furanoflavonoids, and chalcones, that are originally present in the first *pongamia* composition. For example, in some embodiments wherein the second *pongamia* composition comprises protein, the second *pongamia* composition comprises at least 30% protein by dry weight. In certain embodiments, the second *pongamia* composition comprises 30-50% protein, or 30-40% protein by dry weight. In other embodiments wherein the second *pongamia* composition comprises carbohydrates, the second *pongamia* composition comprises at least 40% carbohydrates by dry weight. In certain embodiments, the second *pongamia* composition comprises 40-70% carbohydrates, 50-70% carbohydrates, or 50-60% carbohydrates by dry weight.

The further components may be present in the second *pongamia* composition at weight percentages of the total composition, reflective of the non-destructive methods applied to the first *pongamia* compositions. That is to say, the methods of the present disclosure may be especially suited for removing karanjin and pongamol while maintaining or preserving levels of nutritive components, such as carbohydrates, proteins, fiber, ash, or any combinations thereof, as compared to the levels present in first *pongamia* composition from which the *pongamia* composition having a karanjin concentration less than or equal to 100 ppm is obtained. In still further embodiments, the methods described herein may result in an apparent increase in the concentration of these further components by virtue of the removal of residual oil during the extraction with the alkyl alkanoate solvent and the consequent reduction of the total weight of the second *pongamia* composition.

In some embodiments, the second *pongamia* composition having a karanjin concentration of less than or equal to 100 ppm comprises at least one component selected from the group consisting of carbohydrates, proteins, fiber, ash, and any combinations thereof at a mass percentage of the second *pongamia* composition that is at least 90% of the mass percentage of the corresponding component present in the first *pongamia* composition. In certain embodiments, the second *pongamia* composition having a karanjin concentration of less than or equal to 100 ppm comprises at least one component selected from the group consisting of carbohydrates, proteins, fiber, ash and any combinations thereof at a mass percentage of the second *pongamia* composition that is 90-125% of the mass percentage of the corresponding component present in the first *pongamia* composition.

In some embodiments, the second *pongamia* composition comprises carbohydrates at a mass percentage of the second *pongamia* composition that is 90-125% of the mass percentage of the carbohydrates present in the first *pongamia* composition. In other embodiments, the second *pongamia* composition comprises proteins at a mass percentage of the second *pongamia* composition that is 90-125% of the mass percentage of the proteins present in the first *pongamia* composition. In yet other embodiments, the second *pongamia* composition comprises fiber at a mass percentage of the second *pongamia* composition that is 90-150% of the mass percentage of the fiber present in the first *pongamia* composition. In still other embodiments, the second *pongamia* composition comprises ash at a mass percentage of the second *pongamia* composition that is 90-125% of the mass percentage of the ash present in the first *pongamia* composition.

In certain embodiments, other components in the second *pongamia* composition may be slightly reduced in concentration relative to the first *pongamia* composition. In some embodiments, the second *pongamia* composition comprises trypsin inhibitors at a mass percentage of the second *pongamia* composition that is 60-90% of the mass percentage of the trypsin inhibitors present in the first *pongamia* composition. In other embodiments, the second *pongamia* composition comprises chalcones and/or other furanoflavonoids at a mass percentage of the second *pongamia* composition that is less than 100% of the mass percentage of the chalcones and/or other furanoflavonoids present in the first *pongamia* composition.

In still further embodiments, the total protein content of the *pongamia* compositions may be further characterized by the amino acid profile. The amino acid profile may include characterization of the *pongamia* compositions based on amounts of individual amino acids present, amounts of various combinations of different amino acids present or the sum total of amino acids present. In some embodiments, the second *pongamia* composition has a total amino acid content of at least 20% by weight of the composition. In other embodiments, the second *pongamia* composition has a total amino acid content of 20-30% by weight of the composition. In still other embodiments, the second *pongamia* composition has a total amino acid content that is at least 90% of the total amino acid content present in the first *pongamia* composition. In certain embodiments, the second *pongamia* composition has a total amino acid content at a mass percentage of the second *pongamia* composition that is 90-125% of the mass percentage of total amino acid content present in the first *pongamia* composition.

It should be recognized that, due to the nature of the extraction method described herein comprising combining a first *pongamia* composition with a solvent, the second *pongamia* composition may contain residual levels of the solvent. For example, the second *pongamia* composition may contain residual levels of particular alkyl alkanoate(s) and any co-solvents in the alkyl alkanoate solvent used, even after separation of the miscella from the second *pongamia* composition. Thus, in some embodiments, the second *pongamia* composition comprises alkyl alkanoate solvent. In certain embodiments, the second *pongamia* composition has an alkyl alkanoate solvent concentration of less than 100,000 ppm. In other embodiments wherein the alkyl alkanoate solvent combined with the first *pongamia* composition comprises ethyl acetate, the second *pongamia* composition comprises ethyl acetate. In certain embodiments wherein the *pongamia* composition comprises ethyl acetate, the *pongamia* composition has an ethyl acetate concentration of less than 100,000 ppm.

The method of the present disclosure may further include a dry heating or toasting step to de-solventize, that is, to reduce the level of residual alkyl alkanoate solvent in, the second *pongamia* composition. Therefore, in some embodiments, the method further comprises toasting the second *pongamia* composition to provide a toasted *pongamia* composition. In some embodiments, following toasting of the second *pongamia* composition, the toasted *pongamia* composition comprises an alkyl alkanoate solvent and has an alkyl alkanoate solvent concentration of less than or equal to 5,000 ppm. In certain embodiments, the toasted *pongamia* composition has an alkyl alkanoate solvent concentration between 0 ppm and 5,000 ppm, between 0 ppm and 1,000 ppm, between 1,000 ppm and 3,000 ppm, or between 3,000 ppm and 5,000 ppm. In still yet other embodiments wherein the alkyl alkanoate solvent combined with the first *pongamia* composition contains ethyl acetate and the second *pongamia* composition is toasted, the toasted *pongamia* composition comprises ethyl acetate and has an ethyl acetate concentration of less than or equal to 5,000 ppm. In certain embodiments wherein the toasted *pongamia* composition comprises ethyl acetate, the toasted *pongamia* composition has an ethyl acetate concentration between 0 ppm and 5,000 ppm, between 0 ppm and 1,000 ppm, between 1.000 ppm and 3,000 ppm, or between 3,000 ppm and 5,000 ppm.

*Pongamia* Compositions

As previously mentioned, *pongamia* compositions having low concentrations of karanjin and other anti-nutrients are desirable for downstream use. However, prior to the development of the above methods for analyzing *pongamia* compositions, residual karanjin concentrations in treated *pongamia* compositions have been challenging to assess accurately and consistently, thus making the preparation of *pongamia* compositions having low karanjin concentrations equally as difficult to achieve. The microwave-assisted alkyl alkanoate solvent extraction analytical methods of the present disclosure have enabled the preparation and verification of *pongamia* compositions having low karanjin concentrations. Provided herein are *pongamia* compositions wherein the concentration of karanjin is less than or equal to 100 ppm. Also provided herein are *pongamia* compositions wherein the karanjin concentration is less than or equal to 100 ppm as prepared by the methods described herein and/or as determined by the microwave-assisted alkyl alkanoate solvent extraction analytical methods described herein.

In one aspect, provided herein is a *pongamia* composition comprising karanjin, wherein the *pongamia* composition has a karanjin concentration of less than or equal to 100 ppm, less than or equal to 90 ppm, less than or equal to 80 ppm, less than or equal to 70 ppm, less than or equal to 60 ppm, less than or equal to 50 ppm, less than or equal to 40 ppm, less than or equal to 30 ppm, less than or equal to 20 ppm, or less than or equal to 10 ppm. In certain embodiments, the *pongamia* composition has a karanjin concentration of less than or equal to 100 ppm.

In another aspect, provided herein is a *pongamia* composition comprising pongamol, wherein the *pongamia* composition has a pongamol concentration of less than or equal to 100 ppm, less than or equal to 90 ppm, less than or equal to 80 ppm, less than or equal to 70 ppm, less than or equal to 60 ppm, less than or equal to 50 ppm, less than or equal to 40 ppm, less than or equal to 30 ppm, less than or equal to 20 ppm, or less than or equal to 10 ppm. In certain embodiments, the *pongamia* composition has a pongamol concentration of less than or equal to 100 ppm.

In some embodiments, the *pongamia* composition is obtained from plant material derived from a *pongamia* tree or plant (also known as "*Cytisus pinnatus", "Dalbergia arborea", "Derris indica", "Galedupa pungum*", "karanj", "*Millettia pinnata*", "pongam", "*pongamia", "Pongamia glabra", "Pterocarpus flavus", "Pongamia pinnata* ", and "*Robinia mitis*", "Indian beech", and "mempari").

In some embodiments, provided herein is a *pongamia* composition, wherein the composition is obtained or obtainable by solvent extraction of a deoiled *pongamia* seedcake with an alkyl alkanoate solvent. In some embodiments, provided herein is a *pongamia* composition prepared by microwave-assisted alkyl alkanoate solvent extraction. In certain embodiments, the *pongamia* composition is prepared by microwave-assisted alkyl alkanoate solvent extraction of a deoiled *pongamia* seedcake.

In another aspect, provided is a *pongamia* composition, the composition comprising: karanjin; and at least one or more components selected from the group consisting of carbohydrates, proteins, fiber, ash, tannins, trypsin inhibitors, other furanoflavonoids, and chalcones.

In some embodiments, the *pongamia* composition has a karanjin concentration of less than or equal to 100 ppm. In other embodiments, the *pongamia* composition has a karanjin concentration of less than or equal to 100 ppm as determined by the microwave-assisted alkyl alkanoate solvent extraction analytical method described above. In still other embodiments, provided herein is a *pongamia* composition comprising karanjin, wherein the *pongamia* composition has a karanjin concentration of less than or equal to 100 ppm, and wherein the karanjin concentration is determined by processing the *pongamia* composition with an alkyl alkanoate solvent under microwave irradiation.

In some embodiments, the *pongamia* composition comprises karanjin and at least one or more components selected from the group consisting of carbohydrates, proteins, fiber, ash, tannins, trypsin inhibitors, other furanoflavonoids, and chalcones. In other embodiments, the *pongamia* composition comprises carbohydrates and proteins. In certain embodiments, the *pongamia* composition comprises tannins and trypsin inhibitors. In some embodiments, the *pongamia* composition comprises fiber and ash. In other embodiments, the *pongamia* composition comprises other furanoflavonoids and chalcones. In certain embodiments, the *pongamia* composition comprises carbohydrates and fiber. In some embodiments, the *pongamia* composition comprises carbohydrates and ash.

In some embodiments, the *pongamia* composition having a low karanjin concentration may be prepared or obtained by the methods of preparing described herein. In still yet other embodiments, the *pongamia* composition having a karanjin concentration of less than or equal to 100 ppm is the second *pongamia* composition obtained by the method of preparing *pongamia* compositions as described herein. In some embodiments, the *pongamia* composition is obtained from a first *pongamia* composition having a karanjin concentration of at least 200 ppm. In other embodiments, the *pongamia* composition is obtained from a first *pongamia* composition having a karanjin concentration of at least 500 ppm.

As noted above, it should be recognized that the *pongamia* compositions having karanjin and/or pongamol concentrations less than or equal to 100 ppm as described herein may comprise further components (carbohydrates, proteins, fiber, ash, tannins, trypsin inhibitors, other furanoflavonoids, and chalcones), if present, at weight percentages of the total composition, reflective of the non-destructive method of preparing *pongamia* compositions as described herein. For example, in some embodiments wherein the *pongamia* composition comprises protein, the *pongamia* composition comprises at least 30% protein by dry weight. In certain embodiments, the *pongamia* composition comprises 30-50% protein or 30-40% protein by dry weight. In other embodiments wherein the *pongamia* composition comprises carbohydrates, the *pongamia* composition comprises at least 40% carbohydrates by dry weight. In certain embodiments, the *pongamia* composition comprises between 40-70% carbohydrates, 50-70% carbohydrates, or between 50-60% carbohydrates by dry weight.

In still further embodiments, the total protein content of the *pongamia* compositions may be further characterized by the amino acid profile. The amino acid profile may include characterization of the *pongamia* compositions based on amounts of individual amino acids present, amounts of various combinations of different amino acids present or the sum total of amino acids present. In some embodiments, the *pongamia* composition has a total amino acid content of at least 20% by weight of the composition. In other embodiments, the *pongamia* composition has a total amino acid content of 20-30% by weight of the composition.

It should further be recognized that the *pongamia* compositions having low karanjin concentrations as described herein and prepared by the alkyl alkanoate-based extraction methods described herein may still contain residual *pongamia* oil and alkyl alkanoate solvent.

In some embodiments, the *pongamia* composition comprises oil. In certain embodiments, the *pongamia* composition comprises less than 5% oil by dry weight. In certain embodiments, the *pongamia* composition comprises between 1% and 5% oil by dry weight.

In some embodiments, the *pongamia* composition further comprises an alkyl alkanoate solvent. In other embodiments, the *pongamia* composition has an alkyl alkanoate solvent concentration of less than or equal to 100,000 ppm. In still other embodiments, the *pongamia* composition has an alkyl alkanoate solvent concentration of less than or equal to 5,000 ppm. In certain embodiments, the *pongamia* composition has an alkyl alkanoate solvent concentration between 0 ppm and 5,000 ppm, between 0 ppm and 1,000 ppm, between 1,000 ppm and 3,000 ppm, or between 3,000 ppm and 5,000 ppm.

In some embodiments, wherein the *pongamia* composition comprises an alkyl alkanoate solvent and the alkyl alkanoate solvent comprises ethyl acetate, the *pongamia* composition comprises ethyl acetate. In certain embodiments wherein the *pongamia* composition comprises ethyl acetate, the *pongamia* composition has an ethyl acetate concentration of less than or equal to 100,000 ppm. In yet other embodiments, the *pongamia* composition has an ethyl acetate concentration of less than or equal to 5,000 ppm. In certain embodiments wherein the *pongamia* composition comprises ethyl acetate, the *pongamia* composition has an ethyl acetate concentration between 0 ppm and 5,000 ppm, between 0 ppm and 1,000 ppm, between 1,000 ppm and 3,000 ppm, or between 3,000 ppm, and 5,000 ppm.

As described herein, the methods of preparing the *pongamia* compositions may result in *pongamia* compositions having extremely low karanjin and/or pongamol concentrations. In some embodiments, the *pongamia* composition has a karanjin concentration and/or a pongamol concentration on the order of single digit parts-per-million, or fractional amounts thereof. In some embodiments, the *pongamia* compositions may have concentrations of karanjin and/or pongamol of less than 100 ppm, which are non-detectable by traditional hexane- and methanol-based analytical methods. In still further embodiments, the *pongamia* composition may have trace concentrations of karanjin and/or pongamol, on the order of parts-per-billion (ppb) or parts-per-trillion (ppt). In some embodiments, the *pongamia* compositions described herein may comprise trace amounts of karanjin and/or pongamol that are non-detectable by the alkyl alkanoate-based microwave-assisted solvent extraction analytical methods described herein.

Accordingly, in some embodiments wherein the *pongamia* composition has a karanjin concentration that is non-detectable by the alkyl alkanoate-based microwave-assisted solvent extraction analytical methods described herein, the *pongamia* composition may be characterized by other components present in the composition including carbohydrates, proteins, fiber, ash, tannins, trypsin inhibitors, other furanoflavonoids, chalcones, alkyl alkanoate solvent(s), or amino acid content, or any combinations thereof.

In some embodiments, provided herein is a *pongamia* composition, comprising at least one or more components selected from the group consisting of carbohydrates, proteins, fiber, ash, tannins, trypsin inhibitors, other furanoflavonoids, and chalcones, wherein the *pongamia* composition has a karanjin concentration of less than or equal to 100 ppm. In certain embodiments of the foregoing, the *pongamia* composition has a non-detectable karanjin concentration as determined by the microwave-assisted alkyl alkanoate solvent extraction analytical method described herein. In some embodiments, the *pongamia* composition comprises (i) 30-50% protein by dry weight; (ii) 40-70% carbohydrates; (iii) a total amino acid content of 20-30% by weight; or any combination thereof.

Uses of the *Pongamia* Compositions

The *pongamia* compositions having low concentrations of karanjin and pongamol as described above and prepared by the methods described above may be especially useful as a nutritional supplement or principal feed in feed compositions for ruminants, such as cattle feed compositions. The non-destructive methods of preparing *pongamia* compositions described herein result in the successful removal of anti-nutritional components karanjin and pongamol without reducing the amounts of other components, including macronutrients (such as protein and carbohydrates) that are highly important for achieving acceptable feed conversion efficiency. The *pongamia* compositions may be used alone in a ruminant feed composition or in combination with a non-*pongamia*-derived base feed to provide a compound ruminant feed composition.

As described herein, the term 'ruminant' should be understood to include any wild or domesticated hoofed mammals possessing a multi-chambered stomach (including a rumen) adapted for digestion of plant matter. Suitable ruminants may include but are not limited to cattle, yaks, buffalo, goats, sheep, deer, gazelles, and antelopes. In certain embodiments, the cattle are beef cattle.

In one aspect, provided herein are ruminant feed compositions comprising *pongamia* compositions having low karanjin concentrations as described above. In some embodiments, the ruminant feed compositions comprise a *pongamia* composition having a karanjin concentration of less than or equal to 100 ppm. In other embodiments, the ruminant feed compositions comprise a base feed and a

*pongamia* composition, wherein the *pongamia* composition has a karanjin concentration of less than 100 ppm as described herein.

In some embodiments, provided herein are cattle feed compositions comprising *pongamia* compositions having low karanjin concentrations as described above. In some embodiments, the cattle feed compositions comprise a *pongamia* composition having a karanjin concentration of less than or equal to 100 ppm. In other embodiments, the cattle feed compositions comprise a base feed and a *pongamia* composition, wherein the *pongamia* composition has a karanjin concentration of less than 100 ppm as described herein.

In some embodiments, provided herein is a ruminant feed composition (including, for example, a cattle feed composition), comprising any of the *pongamia* compositions described herein. In one embodiment, provided herein is a ruminant feed composition (including, for example, a cattle feed composition), comprising: a base feed, and any of the *pongamia* compositions described herein.

In some variations of the foregoing, the *pongamia* composition comprises: karanjin; and at least one or more components selected from the group consisting of carbohydrates, proteins, fiber, ash, tannins, trypsin inhibitors, other furanoflavonoids, and chalcones, and the *pongamia* composition has a karanjin concentration of less than or equal to 100 ppm. In other variations, the *pongamia* composition comprises: at least one or more components selected from the group consisting of carbohydrates, proteins, fiber, ash, tannins, trypsin inhibitors, other furanoflavonoids, and chalcones, and the *pongamia* composition has a karanjin concentration of less than or equal to 100 ppm.

By virtue of their low concentrations of karanjin, the *pongamia* compositions described herein can be utilized in ruminant feed compositions, such as cattle feed compositions, in greater quantities than used heretofore and with lesser anti-nutritive or long-term pathological effect than has previously been observed. As such, in some embodiments, the ruminant feed composition or cattle feed composition comprises at least 30% by weight or at least 40% by weight of a *pongamia* composition, wherein the *pongamia* composition has a karanjin concentration of less than or equal 100 ppm. In some embodiments, the *pongamia* composition has a karanjin concentration of less than or equal to 100 ppm, wherein the karanjin concentration is determined by processing the *pongamia* composition with an alkyl alkanoate solvent under microwave irradiation. In other embodiments, the *pongamia* composition has a karanjin concentration of less than or equal to 100 ppm, wherein the karanjin concentration is determined by a microwave-assisted alkyl alkanoate solvent extraction analytical method.

In some embodiments, the ruminant feed composition (including, for example, cattle feed composition) comprises a base feed. A suitable base feed for the ruminant feed compositions as described herein may be any non-*pongamia*-derived feedstock known in the art as forage or fodder, including, for example, hay, straw, silage, grains, legumes, food scraps and byproducts of food processing. In certain embodiments, the base feed may comprise one or more feeds selected from the group consisting of wheat feed, corn feed, barley feed, oat feed, soymeal, cottonseed meal, safflower seed meal, sunflower seed meal, peanut meal, groundnut meal, and hay. In certain embodiments, the base feed comprises wheat feed, corn feed, soymeal or any combination thereof. Due to the low concentrations of karanjin in the *pongamia* compositions described herein, the *pongamia* compositions may be combined with base feeds to produce ruminant feed compositions containing large proportions of

*pongamia*-derived feed. As such, the amount of base feed in the animal compositions of the present disclosure may be reduced. In other embodiments, the ruminant feed composition (including, for example, cattle feed composition) comprises less than 60% or less than 70% by weight of the base feed.

It should be recognized that the ruminant feed compositions (including, for example, cattle feed compositions) described herein may comprise further feed additives known in the art, including, for example, antibiotics and other veterinary drugs, growth hormones, vitamins, minerals or nutritional supplements, palatability enhancers, processing additives, etc.

In yet another aspect, the present disclosure provides methods of feeding a ruminant, such as a cow, comprising providing the *pongamia* compositions or ruminant feed compositions as described herein to the ruminant. In certain embodiments, the present disclosure provides a method of feeding a ruminant, comprising providing a *pongamia* composition having a karanjin concentration of less than or equal to 100 ppm, as determined by a microwave-assisted alkyl alkanoate solvent extraction analytical method, to the ruminant. In other embodiments, provided herein is a method of feeding a ruminant, comprising providing a cattle feed composition to the ruminant, wherein the ruminant feed composition comprises a *pongamia* composition having a karanjin concentration of less than or equal to 100 ppm and wherein the karanjin concentration is determined by processing the *pongamia* composition with any of the alkyl alkanoate solvents described herein under microwave irradiation.

In some embodiments, the ruminant is a cow. In certain embodiments, the cow is a beef cow. In certain variations, the present disclosure provides methods of feeding a cow, comprising providing the *pongamia* compositions or ruminant feed compositions as described herein to the cow. In certain embodiments, the present disclosure provides a method of feeding a cow, comprising providing a *pongamia* composition having a karanjin concentration of less than or equal to 100 ppm, as determined by a microwave-assisted alkyl alkanoate solvent extraction analytical method, to the cow. In other embodiments, provided herein is a method of feeding a cow, comprising providing a cattle feed composition to the cow, wherein the cattle feed composition comprises a *pongamia* composition having a karanjin concentration of less than or equal to 100 ppm and wherein the karanjin concentration is determined by processing the *pongamia* composition with any of the alkyl alkanoate solvents described herein under microwave irradiation.

For the methods of feeding ruminants or cattle described herein, the ruminant feed compositions (including, for example, cattle feed compositions) may be provided in various forms suitable for the ruminants or cattle. In some embodiments, the ruminant feed composition is provided as a ground meal, a pelleted feed, a liquid feed, or a mash feed. For example, in some embodiments, the ruminant feed composition may be provided as a ground meal or a pelleted feed.

Notably, the non-destructive processing methods as described herein provide *pongamia* compositions having not only low levels of anti-nutritionals such as karanjin and pongamol, but also may preserve or maintain comparable levels of nutrients and proximates present in the initial *pongamia* compositions from which the *pongamia* compositions having reduced karanjin concentrations are obtained. As such, it should be also recognized that the *pongamia* compositions prepared by the methods described herein may also possess particular levels of nutrients or proximates (ash, moisture, proteins, fat, carbohydrates, minerals, vitamins) that are especially suited to the nutritive requirements of the ruminants (such as cattle) to be fed, particularly with respect to feed conversion efficiency.

In other aspects, provided is an article of manufacture, such as a container comprising the *pongamia* compositions as described herein, or the feed comprising the *pongamia* compositions as described herein; and a label containing instructions for use of such *pongamia* compositions or feed.

In yet other aspects, provided is a kit comprising the *pongamia* compositions as described herein, or the feed comprising the *pongamia* compositions as described herein; and a package insert containing instructions for use of such *pongamia* compositions or feed.

Enumerated Embodiments

The following enumerated embodiments are representative of some aspects of the invention.

1. A method, comprising:
   combining a *pongamia* composition with an alkyl alkanoate solvent to provide an extraction mixture;
   irradiating the extraction mixture with microwave radiation to provide an irradiated mixture;
   separating the irradiated mixture into an extracted *pongamia* composition and an alkyl alkanoate extract; and
   measuring a karanjin concentration in the alkyl alkanoate extract.
2. The method of embodiment 1, wherein the alkyl alkanoate solvent comprises comprises an alkyl alkanoate selected from the group consisting of methyl methanoate, methyl ethanoate, methyl propanoate, methyl butanoate, methyl pentanoate, ethyl methanoate, ethyl ethanoate, ethyl propanoate, ethyl butanoate, ethyl pentanoate, propyl methanoate, propyl ethanoate, propyl propanoate, propyl butanoate, propyl pentanoate, butyl methanoate, butyl ethanoate, butyl propanoate, butyl butanoate, and butyl pentanoate, and any combinations thereof.
3. The method of embodiment 1 or 2, wherein the alkyl alkanoate solvent comprises ethyl acetate.
4. The method of any one of embodiments 1 to 3, wherein the *pongamia* composition is a deoiled *pongamia* seedcake.
5. The method of any one of embodiments 1 to 4, wherein the *pongamia* composition is obtained by mechanical extraction, solvent extraction, or a combination thereof.
6. The method of any one of embodiments 1 to 5, wherein measuring the karanjin concentration in the alkyl alkanoate extract comprises determining the karanjin concentration by high performance liquid chromatography (HPLC).
7. A method, comprising:
   providing a first *pongamia* composition;
   combining the first *pongamia* composition with an alkyl alkanoate solvent to provide an extraction mixture; and
   separating the extraction mixture into a miscella and a second *pongamia* composition, wherein the second *pongamia* composition has (i) a karanjin concentration that is less than 20% of the karanjin concentration in the first *pongamia* composition or (ii) a karanjin concentration that is less than or equal to 100 ppm.
8. The method of embodiment 7, wherein the second *pongamia* composition has a karanjin concentration less than or equal to 100 ppm, as determined by the method of any one of embodiments 1 to 5.
9. The method of embodiment 7 or 8, wherein the first *pongamia* composition is a deoiled *pongamia* seedcake.
10. The method of embodiment 9, wherein the first *pongamia* composition is a deoiled *pongamia* seedcake obtained by mechanical extraction.
11. The method of embodiment 9 or 10, wherein the first *pongamia* composition is not deoiled *pongamia* seedcake obtained by solvent extraction.
12. The method of any one of embodiments 7 to 11, wherein the first *pongamia* composition has a karanjin concentration of at least 200 ppm.
13. The method of any one of embodiments 7 to 12, wherein the first *pongamia* composition comprises 8-30% oil by weight.
14. The method of any one of embodiments 7 to 13, wherein the miscella has a karanjin concentration of greater than or equal to about 4,000 ppm.
15. The method of any one of embodiments 7 to 14, wherein the second *pongamia* composition has a pongamol concentration less than or equal to 100 ppm.
16. The method of any one of embodiments 7 to 15, wherein the alkyl alkanoate solvent comprises ethyl acetate.
17. The method of any one of embodiments 7 to 16, wherein the method further comprises irradiating the extraction mixture with microwave irradiation.
18. A *pongamia* composition, comprising:
   karanjin; and
   at least one or more components selected from the group consisting of carbohydrates, proteins, fiber, ash, tannins, trypsin inhibitors, other furanoflavonoids, and chalcones,
   wherein the *pongamia* composition has a karanjin concentration of less than or equal to 100 ppm.
19. The *pongamia* composition of embodiment 18, wherein the *pongamia* composition has a karanjin concentration less than or equal to 100 ppm, as determined by the method of any one of embodiments 1 to 6.
20. The *pongamia* composition of embodiment 18 or 19, wherein the *pongamia* composition further comprises pongamol.
21. The *pongamia* composition of any one of embodiments 18 to 20, wherein the *pongamia* composition has a pongamol concentration less than or equal to 100 ppm.
22. The *pongamia* composition of any one of embodiments 18 to 21, further comprising an alkyl alkanoate solvent.
23. The *pongamia* composition of embodiment 22, wherein the *pongamia* composition has an alkyl alkanoate solvent concentration of less than 100,000 ppm.
24. The *pongamia* composition of embodiment 22 or 23, wherein the *pongamia* seed meal has an alkyl alkanoate solvent concentration less than 5,000 ppm.
25. The *pongamia* composition of any one of embodiments 22 to 24, wherein the alkyl alkanoate solvent comprises ethyl acetate.
26. The *pongamia* composition of any one of embodiments 18 to 25, wherein the *pongamia* composition comprises less than 5% oil by dry weight.

27. The *pongamia* compositions of any one of embodiments 18 to 26, wherein the *pongamia* composition comprises between 1% and 5% oil by dry weight.
28. The *pongamia* composition of any one of embodiments 18 to 27, wherein the *pongamia* composition comprises at least 30% protein by dry weight.
29. The *pongamia* composition of any one of embodiments 18 to 28, wherein the *pongamia* composition comprises 30-40% protein by dry weight.
30. The *pongamia* composition of any one of embodiments 18 to 29, wherein the *pongamia* composition has a total amino acid content of at least 20% by weight.
31. The *pongamia* composition of any one of embodiments 18 to 30, wherein the *pongamia* composition has a total amino acid content of 20-30% by weight.
32. The *pongamia* composition of any one of embodiments 18 to 31, wherein the *pongamia* composition comprises at least 40% carbohydrates by weight.
33. The *pongamia* composition of any one of embodiments 18 to 32, wherein the *pongamia* composition has a total amino acid content of 50-70% carbohydrates by weight.
34. The *pongamia* composition of any one of embodiments 18 to 33, wherein the *pongamia* composition is obtained from an initial *pongamia* composition having a karanjin concentration of at least 200 ppm.
35. The *pongamia* composition of any one of embodiments 18 to 34, wherein the wherein the *pongamia* composition is obtained from solvent extraction of a deoiled *pongamia* seedcake with an alkyl alkanoate solvent.
36. The *pongamia* composition of any one of embodiments 18 to 35, wherein the *pongamia* composition is obtained from solvent extraction of a deoiled *pongamia* seedcake with an alkyl alkanoate solvent and microwave irradiation.
37. A *pongamia* composition obtained or obtainable by the method of any one of embodiments 1 to 17.
38. A *pongamia* composition, comprising:
    at least one or more components selected from the group consisting of carbohydrates,
    proteins, fiber, ash, tannins, trypsin inhibitors, other furanoflavonoids, and chalcones, wherein the *pongamia* composition has a karanjin concentration of less than or equal to 100 ppm.
39. A *pongamia* composition, comprising:
    at least one or more components selected from the group consisting of carbohydrates,
    proteins, fiber, ash, tannins, trypsin inhibitors, other furanoflavonoids, and chalcones, wherein the *pongamia* composition has a karanjin concentration of less than or equal to 100 ppm, and wherein the *pongamia* composition has a pongamol concentration of less than or equal to 100 ppm.
40. A *pongamia* composition, comprising:
    karanjin, or pongamol, or a combination of karanjin and pongamol;
    at least one or more components selected from the group consisting of carbohydrates,
    proteins, fiber, ash, tannins, trypsin inhibitors, other furanoflavonoids, and chalcones, wherein if karanjin is present, the *pongamia* composition has a karanjin concentration of less than or equal to 100 ppm, wherein if pongamol is present, the *pongamia* composition has a pongamol concentration of less than or equal to 100 ppm.
41. A *pongamia* composition, comprising:
    karanjin; and
    at least one or more components selected from the group consisting of carbohydrates, proteins, fiber, ash, tannins, trypsin inhibitors, other furanoflavonoids, and chalcones, wherein the *pongamia* composition has a karanjin concentration of less than or equal to 100 ppm, and wherein the karanjin concentration is determined by processing the *pongamia* composition with an alkyl alkanoate solvent under microwave irradiation.

42. The *pongamia* composition of any one of embodiments 18 to 41, wherein the *pongamia* composition is obtained from plant material derived from a *pongamia* tree or plant.
43. The *pongamia* composition of any one of embodiments 18 to 42, wherein the *pongamia* composition is a meal.
44. A feed composition, comprising:
    a *pongamia* composition of any one of embodiments 18 to 43; and
    a base cattle feed.
45. A feed composition, comprising:
    a *pongamia* composition of any one of embodiments 18 to 43; and
    a base feed.
46. The feed composition of embodiment 44 or 45, wherein the feed composition comprises at least 30% by weight or at least 40% by weight of the *pongamia* composition.
47. The feed composition of any one of embodiments 44 to 46, wherein the feed composition comprises less than 60% by weight or less than 70% by weight of the base feed.
48. The feed composition of any one of embodiments 44 to 47, wherein the feed composition is a pelleted feed.
49. A method of feeding a ruminant, comprising providing the *pongamia* compositions according to any one of embodiments 18 to 43 or feed composition according to any one of embodiment 44 to 48 to the ruminant.
50. The method of embodiment 49, wherein the ruminant is selected from the group consisting of a cow, yak, buffalo, goat, sheep, deer, gazelle, and antelope.
51. The method of embodiment 50, wherein the ruminant is a cow.

EXAMPLES

The presently disclosed subject matter will be better understood by reference to the following Examples, which are provided as exemplary of the invention, and not by way of limitation.

Example A: Analytical Methods

Example A1: Comparative Methods of Methanol-Based Extractions

The following example describes experiments comparing karanjin and pongamol extraction from *pongamia* seedcake using methanol as a solvent.

Homogenization extraction of karanjin and pongamol. 0.5 g of *pongamia* seedcake was placed in a 50 mL polypropylene centrifuge tube with 5 mL methanol for a final ratio of 10:1 (solvent:solid). Then, the samples were placed in a plant/tissue homogenizer to shake for 2 minutes at 1500 rpm. Next, the samples were centrifuged for 5 minutes at 3000 rpm to separate the solvent from the solids and the supernatant was decanted into a clean 50 mL polypropylene tube. The extraction process was repeated 5 times to improve karanjin and pongamol extraction.

Homogenization extraction with a NaOH soak. Prior to homogenization extraction, 0.5 g of *pongamia* seedcake was placed into a 50 mL polypropylene centrifuge tube with 1 mL 2% NaOH. Then, the mixture was incubated for 24 hours. After incubation, 10 mL water was added and the tubes were placed on a mechanical shaker to shake on high for 10 minutes. Next, the tubes were centrifuged at 3000 rpm to pellet the solid material. The water was saved for analysis and the wash process was repeated once more to ensure removal of NaOH. Following the NaOH incubation, the samples were extracted with methanol as described above.

Homogenization extraction with a methanol soak. Prior to homogenization extraction, 0.5 g of *pongamia* seedcake was placed into a 50 mL polypropylene centrifuge tube with 25 mL methanol for a final ratio of 50:1 (solvent:solid). Then, the mixture was incubated for 24, 48, 72, or 96 hours at room temperature. Following the incubation, the samples were placed in a plant/tissue homogenizer to shake for 2 minutes at 1500 rpm. After homogenization, the samples were centrifuged for 5 minutes at 3000 rpm to separate the solvent from the solids and the supernatant was decanted into a clean 50 mL polypropylene tube. The homogenization was repeated 5 times to improve karanjin and pongamol extraction.

Homogenization extraction with filtration. 0.5 g of *pongamia* seedcake was placed in a 50 mL polypropylene centrifuge tube with 25 mL of methanol for a final ratio of 50:1 (solvent:solid). Then, the samples were placed in a plant/tissue homogenizer to shake for 2 minutes at 1500 rpm. Next, the samples were filtered to separate the solids from the methanol. The extraction process was repeated 5 times to improve karanjin and pongamol extraction.

Soxhlet extraction of karanjin and pongamol. 0.5 g of *Pongamia* Seedcake was placed into an extraction thimble with 125 mL methanol. The extraction was allowed to proceed for 24 or 48 hours at which point, the Soxhlet extract was transferred to a clean polypropylene tube.

Standard solutions for HPLC. Commercially available karanjin and pongamol were mixed with methanol to produce the following HPLC standards: 0.05, 0.1, 0.2, 0.5, 1.0, 5.0, and 20.0 μg/mL.

HPLC instrumentation. HPLC analysis was conducted with a mobile phase consisting of: Solvent A (0.1% Formic acid in HPLC water) and Solvent B (0.1% Formic acid in acetonitrile). The injection volume was 2 μL and the flow rate was 0.75 mL/minute. The column was a C18 5 μm, 50×2 mm HPLC column. All HPLC analyses were conducted in negative ion mode. The MS parameters were: curtain gas, 30 psi; collision gas, 4 psi; nebulizer gas (GS1), 50 psi; drying gas (GS2), 50 psi; ion spray voltage, 5000; temperature, 500° C.; declustering potential (DP), 51V; entrance potential, 10V; collision energy (CE), 60 eV for karanjin and 30 eV for pongamol.

MS/MS quantification of karanjin and pongamol in extract. Multiple reaction monitoring (MRM) ion transitions were monitored for both karanjin and pongamol. The level of karanjin and pongamol present in the extracted samples was calculated using Analyst version 1.6.3. Briefly, the peak area of karanjin and pongamol in the extraction samples was compared with the peak area of the calibration standards to determine the parts per million of karanjin and pongamol.

Methanol-extraction of karanjin and pongamol extraction from *pongamia* seedcake. Table 1 shows levels of karanjin and pongamol that can be extracted from *pongamia* seedcake (FIGS. 3A and 3B) under a homogenization extraction method employing methanol as an extraction solvent (with a 10:1 solvent:solid ratio). The quantities of karanjin and pongamol obtained from each of the five serial extractions were added together to provide a measure of the total karanjin extracted and the total pongamol extracted, respectively, as shown in Table 1.

TABLE 1

| Sample Number | Starting Material | Total Karanjin Extracted (ppm) | Total Pongamol Extracted (ppm) |
|---|---|---|---|
| 1.1 | Seedcake | 4154 | 318 |

Figure 3A:
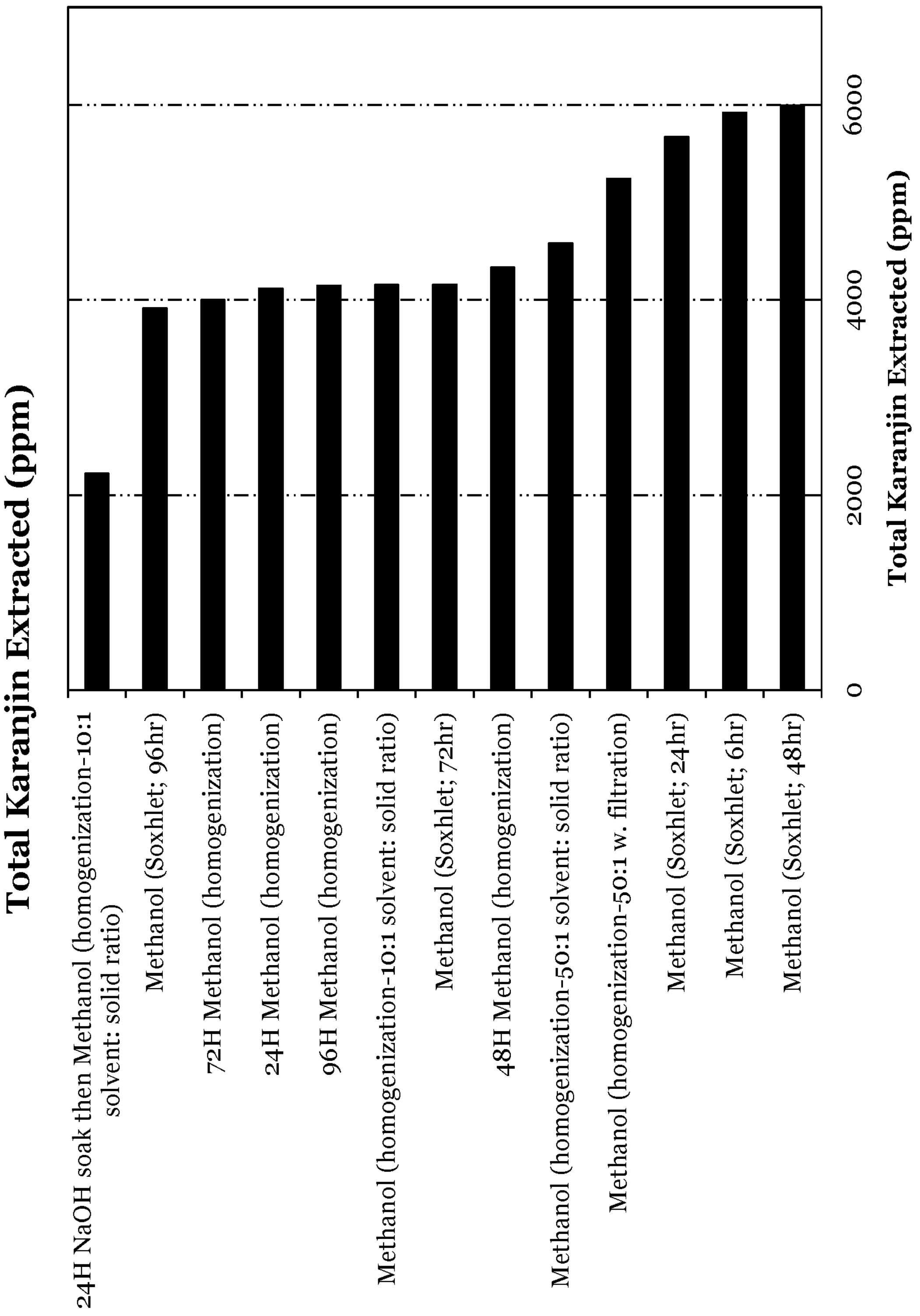
FIGS. 3A and 3B depict bar charts comparing the total concentration of karanjin and pongamol (in ppm, adjusted for starting material amount) extracted from deoiled *pongamia* seedcake using various methanol-based extraction methods.
Figure 3B:
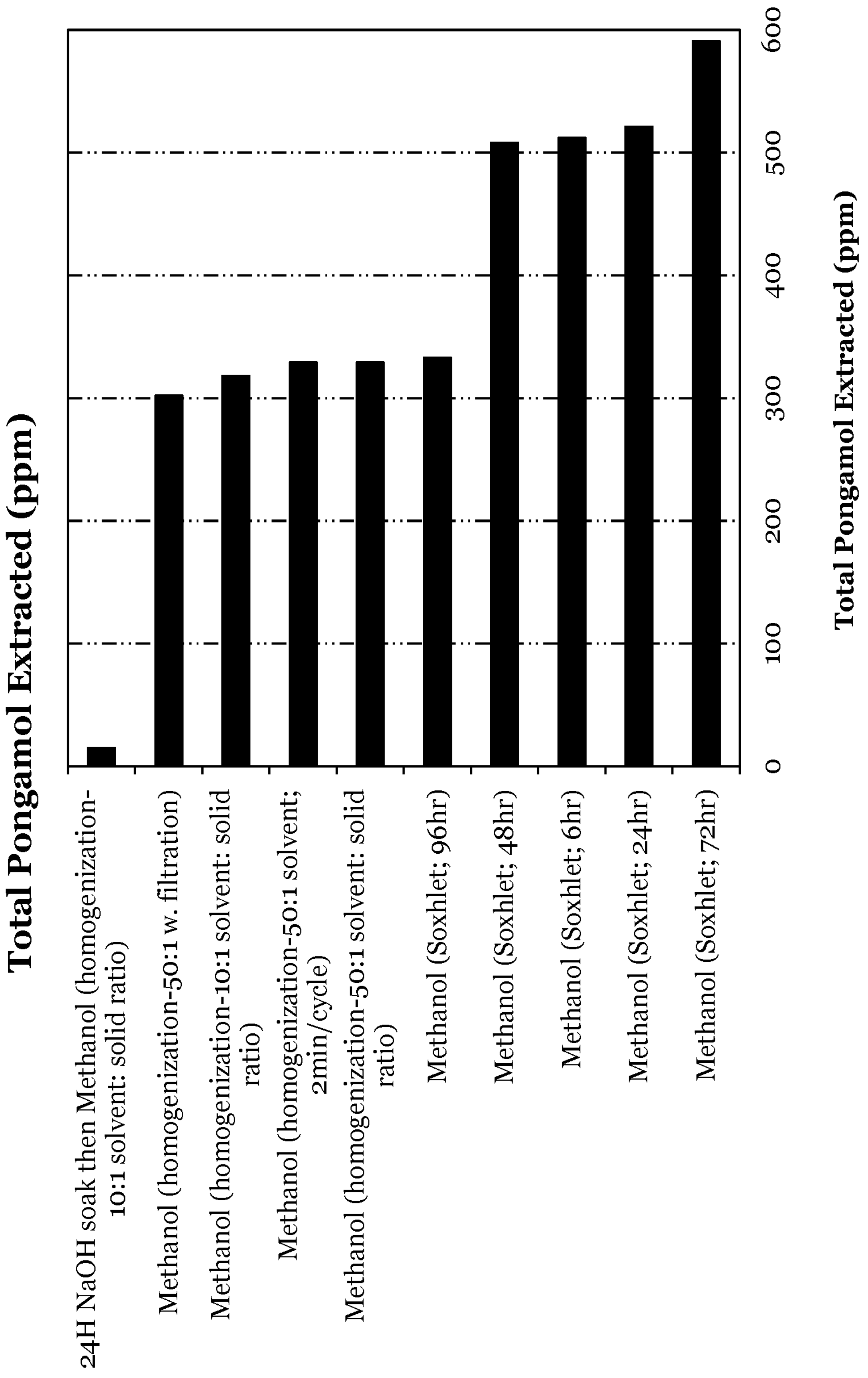

Assessing the impact of a 24-hour NaOH soak on extraction of karanjin and pongamol. The quantities of karanjin and pongamol obtained from each of the five serial extractions were added together to provide a measure of the total karanjin extracted and the total pongamol extracted, respectively, as shown in Table 2. Table 2 shows that treating *pongamia* seedcake with NaOH prior to methanol homogenization extraction (at 10:1 solvent:solid ratio) decreased the total level of extracted and residual karanjin and pongamol relative to an untreated extraction (FIGS. 3A and 3B).

TABLE 2

| Sample Number | Treatment | Total Karanjin Extracted (ppm) | Total Pongamol Extracted (ppm) |
|---|---|---|---|
| 1.1 | Extraction without NaOH (seedcake) | 4154 | 318 |
| 2.1 | Extraction with NaOH (seedcake) | 2219 | 15 |

Determining the concentration of karanjin and pongamol in NaOH wash water. Table 3 demonstrates that karanjin and pongamol leached into the water wash following the NaOH soak. However, the level of karanjin and pongamol in the wash water is not enough to account for the decrease in the level of karanjin and pongamol isolated following NaOH treatment.

TABLE 3

| Sample Number | Treatment | Karanjin recovered from water wash (ppm) | Pongamol recovered from water wash (ppm) |
|---|---|---|---|
| 3.1 | NaOH Water Wash | 463 | 112 |

Assessing the impact of a methanol soak on karanjin extraction. The quantities of karanjin and pongamol obtained from each of the five serial extractions were added together to provide a measure of the total karanjin extracted and the total pongamol extracted, respectively, as shown in Table 4. Table 4 shows that soaking *pongamia* seedcake in methanol prior to extraction for any period of time reduced karanjin recovery relative to extraction without a methanol soak (at a 50:1 solvent:solid ratio) (FIGS. 3A and 3B).

TABLE 4

| Sample Number | Treatment | Total Karanjin Extracted (ppm) | Total Pongamol Extracted (ppm) |
|---|---|---|---|
| 4.1 | No Soak | 4580 | 329 |
| 4.2 | 24-hour Methanol Soak | 4117 | 263 |
| 4.3 | 48-hour Methanol Soak | 4331 | 284 |
| 4.4 | 72-hour Methanol Soak | 3999 | 439 |

TABLE 4-continued

| Sample Number | Treatment | Total Karanjin Extracted (ppm) | Total Pongamol Extracted (ppm) |
|---|---|---|---|
| 4.5 | 96-hour Methanol Soak | 4145 | 223 |

Assessing karanjin and pongamol recovery using filtration rather than centrifugation following methanol homogenization extraction. The quantities of karanjin and pongamol obtained from each of the five serial extractions (at 50:1 solvent:solid ratio) were added together to provide a measure of the total karanjin extracted and the total pongamol extracted, respectively, as shown in Table 5. Table 5 demonstrates that methanol homogenization extraction with filtration can recover similar levels of karanjin and pongamol from *pongamia* seed cake as compared to methanol homogenization extraction with centrifugation (FIGS. 3A and 3B).

TABLE 5

| Sample Number | Treatment | Total Karanjin Extracted (ppm) | Total Pongamol Extracted (ppm) |
|---|---|---|---|
| 4.1 | Centrifugation | 4580 | 329 |
| 5.1 | Filtration | 5240 | 302 |

Soxhlet extraction of karanjin and pongamol. Table 6 shows a comparison of methanol homogenization extraction (50:1 solvent:solid ratio) and methanol Soxhlet extraction. The total karanjin extracted and pongamol extracted for the methanol homogenization treatment is the sum of karanjin and pongamol obtained from each of the five serial extractions; the total karanjin and pongamol extracted for the Soxhlet treatments are the amounts of karanjin and pongamol obtained from a single Soxhlet run for the indicated time duration. The values determined for the 24-hour and 48-hour methanol Soxhlet extractions were taken as the average of two separate runs, respectively. Table 6 demonstrates that 24 and 48 hour methanol Soxhlet extractions isolated more karanjin and pongamol than the methanol homogenization extraction technique (FIGS. 3A and 3B).

TABLE 6

| Sample Number | Treatment | Total Karanjin Extracted (ppm) | Total Pongamol Extracted (ppm) |
|---|---|---|---|
| 4.1 | Methanol Homogenization | 4580 | 329 |
| 6.1 | Methanol Soxhlet (24 hrs) | 5670 | 521 |
| 6.2 | Methanol Soxhlet (48 hrs) | 5933 | 508 |

Example A2: Solvent-Dependence of Extraction Methods

The following example describes experimental efforts to assess the ability of various solvents to extract karanjin and pongamol from *pongamia* seedcake.

Homogenization extraction of karanjin and pongamol. In the present example, homogenization extractions were carried out as in Example A1. However, the solvents tested included ethanol, hexane, methyl tert-butyl ether (MTBE), toluene, diethyl ether, ethyl acetate, and acetone, all with a solvent:solid ratio of 50:1. Last, experiments were conducted to assess the impact of homogenization time on ethyl acetate solvent extraction wherein 10-minute (2 min/cycle, 5 cycles) and 50-minute (10 min/cycle, 5 cycles) homogenizations were compared.

Soxhlet extraction of karanjin and pongamol. In the present example, Soxhlet extractions were carried out as in Example A1. However, the solvents tested were methanol, MTBE, and ethyl acetate. Further, the reaction times examined for ethyl acetate included 6, 24, 48, 72, and 96 hours.

Assessing karanjin and pongamol extraction efficiency with different solvents using homogenization extraction. The quantities of karanjin and pongamol obtained from each of the five serial extractions were added together to provide a measure of the total karanjin extracted and the total pongamol extracted, respectively, as shown in Table 7. Table 7 shows that ethyl acetate extracted more karanjin and pongamol than any other solvent tested using the homogenization technique (FIGS. 3A, 3B, 4A and 4B).

TABLE 7

| Sample Number | Treatment | Total Karanjin Extracted (ppm) | Total Pongamol Extracted (ppm) |
|---|---|---|---|
| 4.1 | Methanol | 4580 | 329 |
| 7.1 | Ethanol | 3879 | 268 |
| 7.2 | Hexane | 4341 | 323 |
| 7.3 | MTBE | 5503 | 329 |
| 7.4 | Toluene | 6307 | 325 |
| 7.5 | Diethyl Ether | 7465 | 379 |
| 7.6 | Ethyl Acetate | 8373 | 471 |
| 7.7 | Acetone | 4812 | 292 |

Figure 4B:
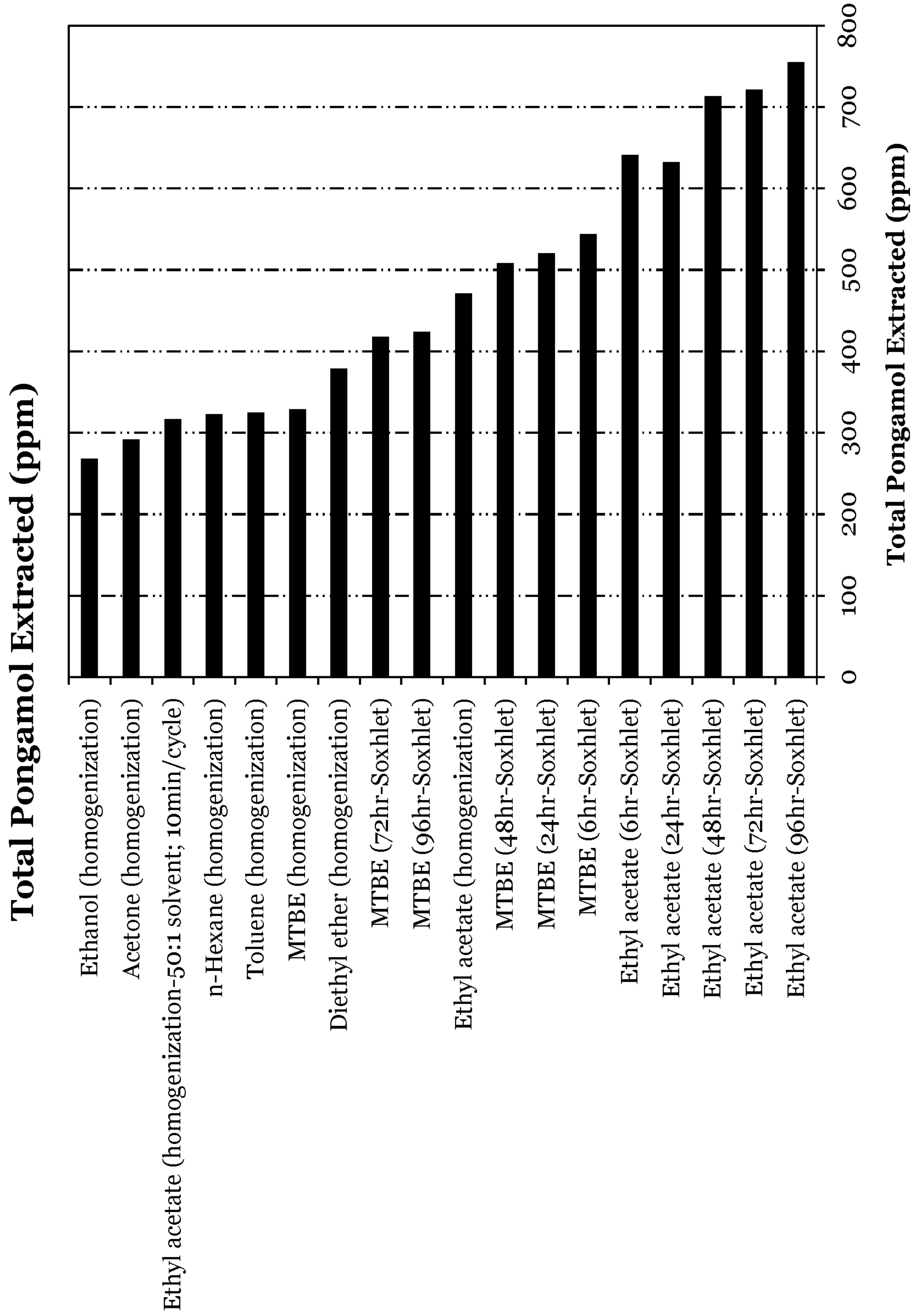

Assessing the impact of extended homogenization time on karanjin and pongamol extraction with ethyl acetate. Table 8 shows a comparison of homogenization extraction using ethyl acetate as a solvent with a total 10-minute extraction period and a total 50-minute extraction period. Table 8 demonstrates that increasing the total homogenization time from 10 to 50 minutes decreases ethyl acetate extraction efficiency of karanjin and pongamol (FIGS. 4A and 4B).

TABLE 8

| Sample Number | Treatment | Total Karanjin Extracted (ppm) | Total Pongamol Extracted (ppm) |
|---|---|---|---|
| 7.6 | 10 Minute | 8373 | 471 |
| 7.6(b) | 50 Minute | 4011 | 317 |

Assessing karanjin and pongamol extraction efficiency with different solvents using soxhlet extraction. Table 9 shows the total karanjin and total pongamol extracted from single Soxhlet runs using various solvents for different time durations. Table 9 shows that ethyl acetate extracted more karanjin and pongamol than any other solvent tested using the Soxhlet extraction technique (FIGS. 3A, 3B, 4A and 4B). Further, Table 9 shows that shorter Soxhlet extraction times were more efficient than longer times for isolating karanjin. However, longer Soxhlet extraction times were generally more efficient than shorter times for isolating pongamol.

TABLE 9

| Sample Number | Treatment | Total Karanjin Extracted (ppm) | Total Pongamol Extracted (ppm) |
|---|---|---|---|
| 6.1 | Methanol/Soxhlet 24 hr | 5670 | 521 |

TABLE 9-continued

| Sample Number | Treatment | Total Karanjin Extracted (ppm) | Total Pongamol Extracted (ppm) |
|---|---|---|---|
| 6.2 | Methanol/Soxhlet 48 hr | 5993 | 508 |
| 8.1 | Methanol/Soxhlet 6 hr | 5920 | 512 |
| 8.2 | Methanol/Soxhlet 72 hr | 4158 | 591 |
| 8.3 | Methanol/Soxhlet 96 hr | 3912 | 333 |
| 8.4 | MTBE/Soxhlet 6 hr | 5240 | 544 |
| 8.5 | MTBE/Soxhlet 24 hr | 5560 | 520 |
| 8.6 | MTBE/Soxhlet 48 hr | 4640 | 508 |
| 8.7 | MTBE/Soxhlet 72 hr | 3876 | 418 |
| 8.8 | MTBE/Soxhlet 96 hr | 4080 | 424 |
| 8.9 | Ethyl Acetate/Soxhlet 6 hr | 7747 | 641 |
| 8.10 | Ethyl Acetate/Soxhlet 24 hr | 7626 | 632 |
| 8.11 | Ethyl Acetate/Soxhlet 48 hr | 7386 | 713 |
| 8.12 | Ethyl Acetate/Soxhlet 72 hr | 7306 | 721 |
| 8.13 | Ethyl Acetate/Soxhlet 96 hr | 7480 | 755 |

Example A3: Microwave-Assisted Extraction Method (MAE)

The following example describes experimental efforts to develop an ethyl acetate MAE method for karanjin and pongamol.

Preparation of ionic liquid. Ionic liquid was prepared by adding 40.1 g 1-butyl-3-methylimidazolium bromide and 75 mL 0.8 N HCL to a glass bottle. Then, the mixture was vortexed to dissolve solids.

Microwave-assisted extraction of karanjin and pongamol. 0.5 g *pongamia* seedcake was added to a microwave extraction tube. Then, 15 mL of either ethyl acetate or ionic liquid was added to the sample tubes and vortexed to mix. Next, the samples were extracted using a microwave extractor under the following conditions: 1) ramp for 15 minutes to 70° C., 2) hold at 70° C. for 10 minutes. Once cooled, the supernatant was filtered using filter paper in a Buchner funnel under a vacuum.

Figure 5A:
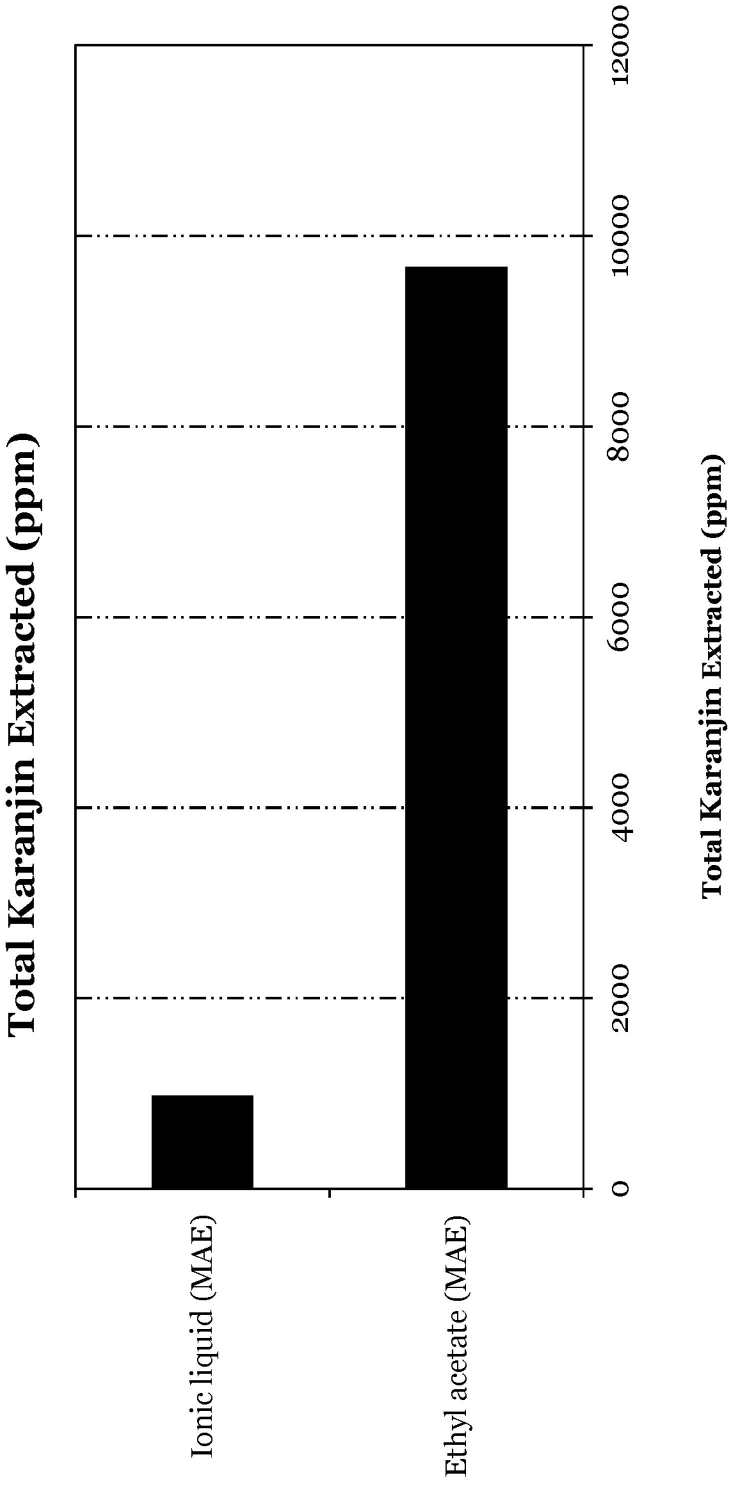
FIGS. 5A and 5B depict bar charts comparing the total concentration of karanjin and pongamol (in ppm, adjusted for starting material amount) extracted from deoiled *pongamia* seedcake using microwave-assisted extraction with either ethyl acetate or ionic liquid as solvent.
Figure 5B:
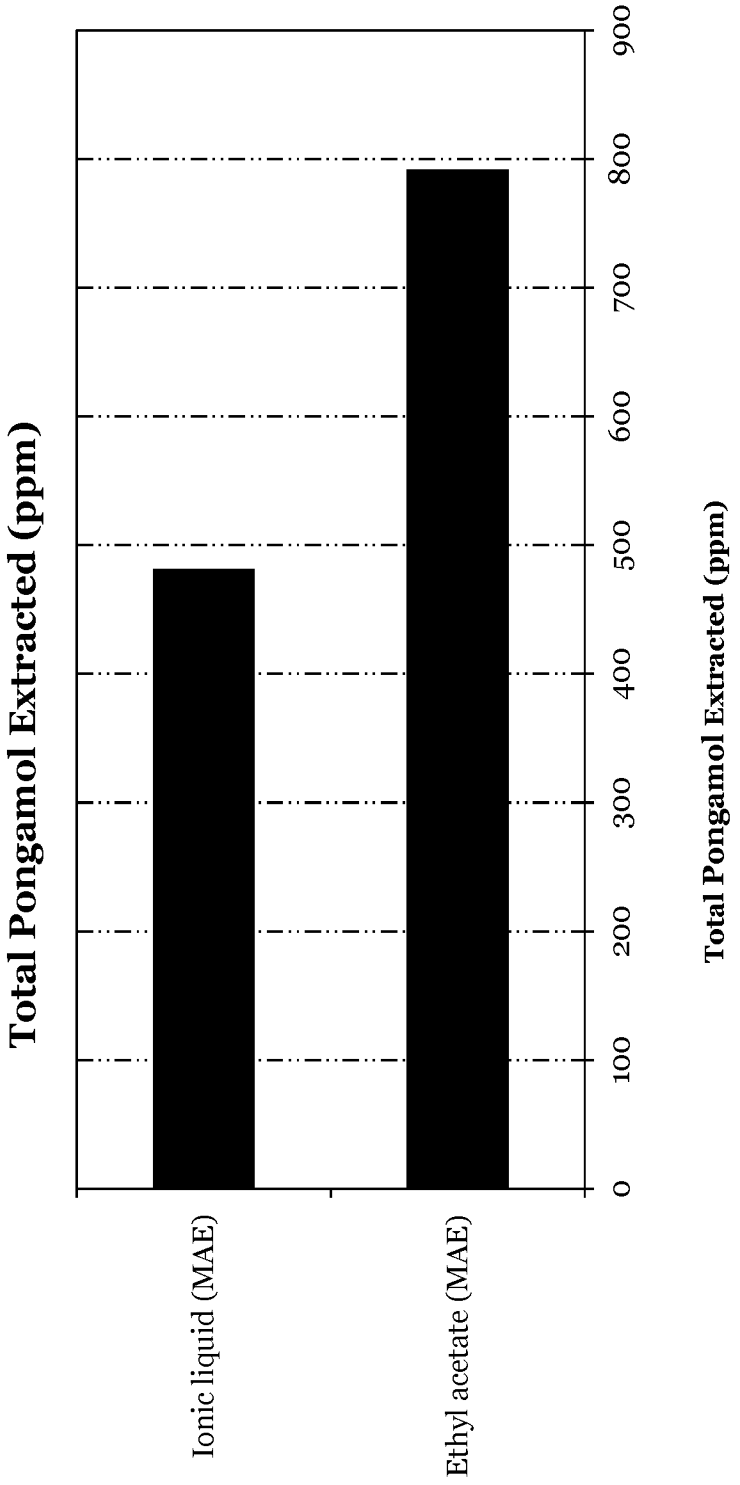

Assessing efficiency of ethyl acetate microwave assisted extraction of karanjin and pongamol. Table 10 shows that ethyl acetate MAE extracted greater than 9600 ppm karanjin and 790 ppm pongamol from *pongamia* seedcake (also, FIGS. 5A and 5B).

TABLE 10

| Sample Number | Treatment | Total Karanjin Extracted (ppm) | Total Pongamol Extracted (ppm) |
|---|---|---|---|
| 9.1 | MAE/Ethyl Acetate | 9675 | 792 |
| 9.2 | MAE/Ionic Liquid | 979.5 | 481.5 |

Figure 6A:
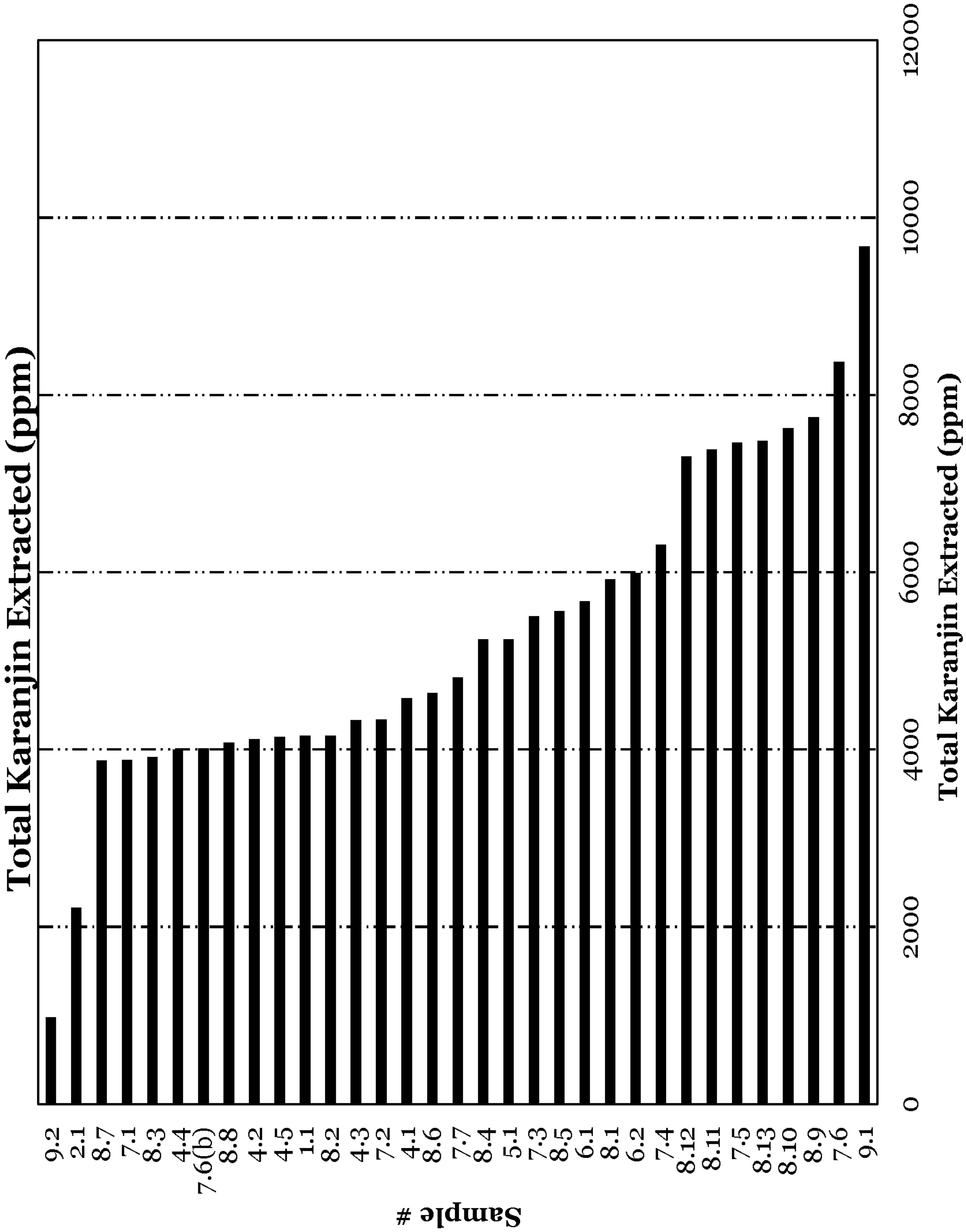
FIGS. 6A and 6B show comparisons of the total concentrations of karanjin and pongamol (in ppm, adjusted for starting material amount) extracted from deoiled *pongamia* seedcake for the various methods and solvents shown in FIGS. 3A-5B.
Figure 6B:
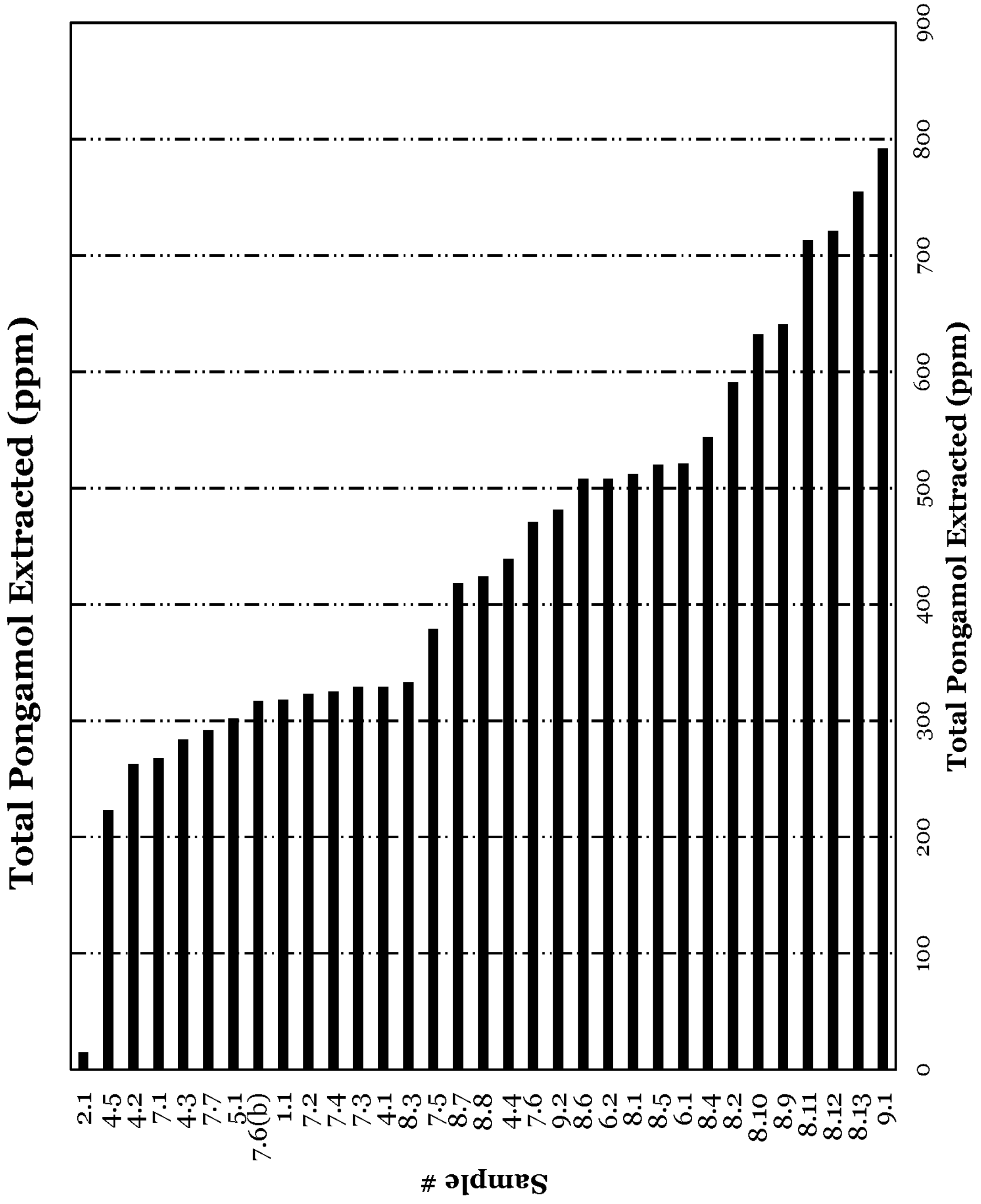

Seedcake extraction summary. Table 11 shows a summary of the karanjin and pongamol extraction data detailed in Examples A1-A3. FIGS. 6A and 6B shows bar charts of the relative efficiencies of each extraction treatment as measured by the total karanjin and total pongamol extracted in ppm.

TABLE 11

| Sample Number | Treatment | Total Karanjin Extracted (ppm) | Total Pongamol Extracted (ppm) |
|---|---|---|---|
| 1.1 | Methanol (homogenization-10:1) | 4154 | 318 |
| 2.1 | Methanol (homogenization-10:1 w. NaOH soak) | 2219 | 15 |
| 4.1 | Methanol (homogenization-50:1) | 4580 | 329 |
| 4.2 | Methanol (homogenization-50:1 w. Methanol 24 hr soak) | 4117 | 263 |
| 4.3 | Methanol (homogenization-50:1 w. Methanol 48 hr soak) | 4331 | 284 |
| 4.4 | Methanol (homogenization-50:1 w. Methanol 72 hr soak) | 3999 | 439 |
| 4.5 | Methanol (homogenization-50:1 w. Methanol 96 hr soak) | 4145 | 223 |
| 5.1 | Methanol (homogenization-10:1 w. filtration) | 5240 | 302 |
| 6.1 | Methanol (Soxhlet 24 hr) | 5670 | 521 |
| 6.2 | Methanol (Soxhlet 48 hr) | 5933 | 508 |
| 7.1 | Ethanol (homogenization-50:1) | 3879 | 268 |
| 7.2 | n-Hexane (homogenization-50:1) | 4341 | 323 |
| 7.3 | MTBE (homogenization-50:1) | 5503 | 329 |
| 7.4 | Toluene (homogenization-50:1) | 6307 | 325 |
| 7.5 | Diethyl Ether (homogenization-50:1) | 7465 | 379 |
| 7.6 | Ethyl Acetate (homogenization-50:1) | 8373 | 471 |
| 7.6(b) | Ethyl Acetate (homogenization-50:1, 50 minute) | 4011 | 317 |
| 7.7 | Acetone (homogenization-50:1) | 4812 | 292 |
| 8.1 | Methanol (Soxhlet 6 hr) | 5920 | 512 |
| 8.2 | Methanol (Soxhlet 72 hr) | 4158 | 591 |
| 8.3 | Methanol (Soxhlet 96 hr) | 3912 | 333 |
| 8.4 | MTBE (Soxhlet 6 hr) | 5240 | 544 |
| 8.5 | MTBE (Soxhlet 24 hr) | 5560 | 520 |
| 8.6 | MTBE (Soxhlet 48 hr) | 4640 | 508 |
| 8.7 | MTBE (Soxhlet 72 hr) | 3876 | 418 |
| 8.8 | MTBE (Soxhlet 96 hr) | 4080 | 424 |
| 8.9 | Ethyl Acetate (Soxhlet 6 hr) | 7747 | 641 |
| 8.10 | Ethyl Acetate (Soxhlet 24 hr) | 7626 | 632 |
| 8.11 | Ethyl Acetate (Soxhlet 48 hr) | 7386 | 713 |
| 8.12 | Ethyl Acetate (Soxhlet 72 hr) | 7306 | 721 |

TABLE 11-continued

| Sample Number | Treatment | Total Karanjin Extracted (ppm) | Total Pongamol Extracted (ppm) |
|---|---|---|---|
| 8.13 | Ethyl Acetate (Soxhlet 96 hr) | 7480 | 755 |
| 9.1 | Ethyl Acetate (MAE) | 9675 | 792 |
| 9.2 | Ionic Liquid (MAE) | 979.5 | 481.5 |

Example A4: Microwave-Assisted Extraction Method (MAE) with Alkyl Alkanoates

The following examples describe experimental efforts to assess the ability of various alkyl alkanoate solvents to extract karanjin and pongamol from *pongamia* seedcake under microwave-assisted extraction.

The *pongamia* seedcake samples used in Parts I-V below were of the same origin and preparation date as seedcake employed in Examples A1-A3 above. The *pongamia* seedcake had been stored for 18 months (at −20 degrees Celsius) at the start of Example A4.

Various alkyl alkanoate solvents were evaluated for their ability to extract karanjin and pongamol under microwave-assisted extraction conditions.

Partially defatted *pongamia* meal was homogenized using dry ice. The samples were stored frozen and the dry ice allowed to sublimate. 0.5 g+/−0.02 g of *pongamia* meal was placed into separate microwave extraction tubes and 15.0 mL of each solvent (30:1 solvent: solid (v/w) ratio) was added to the corresponding microwave tube, which were then capped and vortexed. Extraction was performed using the MARS 6 microwave extractor under the following conditions: 1) Ramp for 15 min to 70° C.; 2) Hold at 70° C. for 10 minutes. After the supernatant was cooled to room temperature, the extract was filtered through a Whatman GF/F filter paper in a Buchner funnel under vacuum and the extract poured into pre-labeled 50 mL centrifuge tubes.

Analysis. All sample extracts were diluted 10× and 100× for LCMS/MS analysis either directly using a LCMS/MS vial or volumetric flask. (10× Dilution: 100 μL of sample extract was added to 900 μL of appropriate solvent and vortexed; 100× Dilution: 10 μL of sample extract was added to 990 μL of appropriate solvent and vortexed.) The parameters for the LCMS/MS analysis were identical to the parameters described in Example A1 above.

Figure 7A:
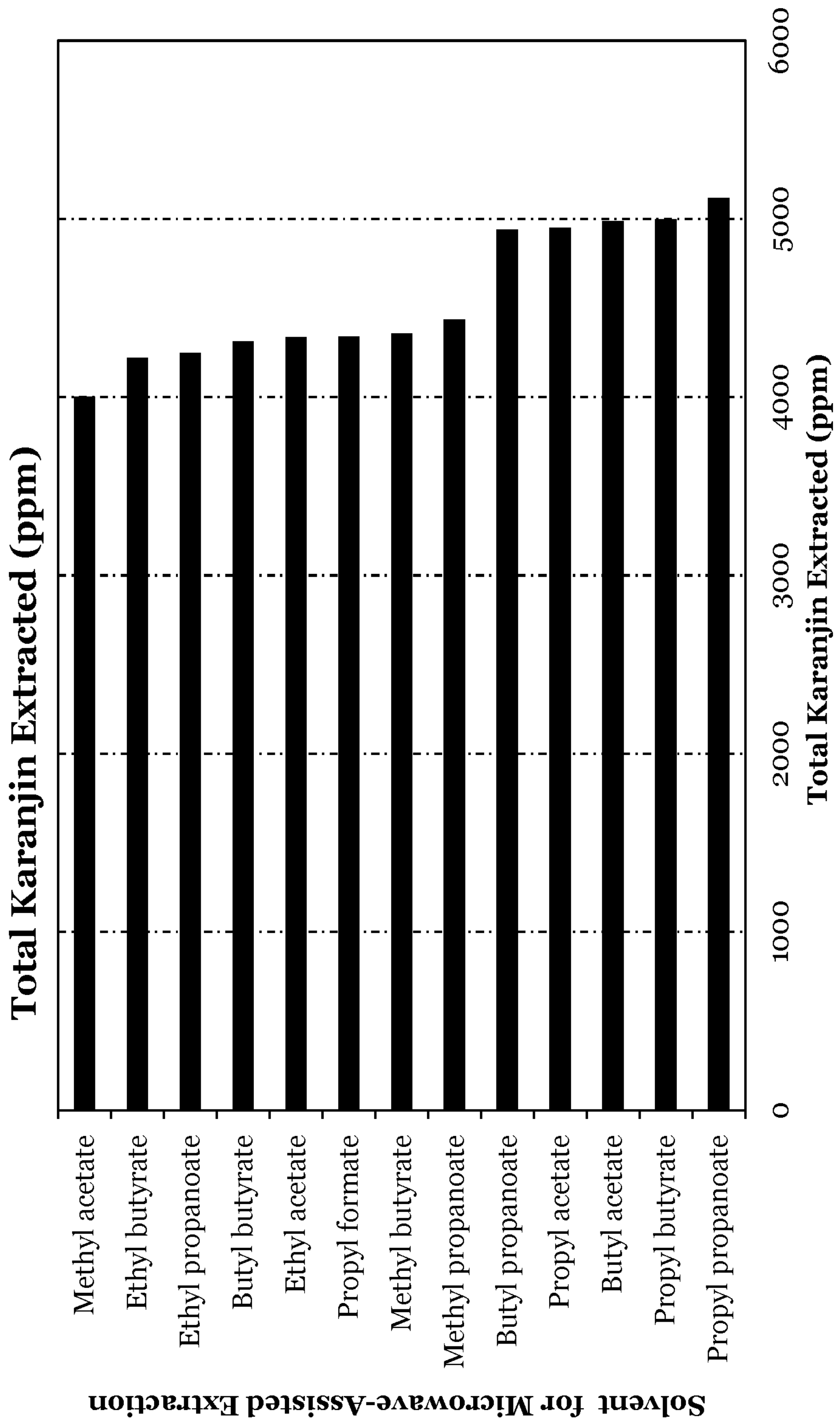
FIGS. 7A-7B depict bar for the observed total concentrations of karanjin and pongamol (in ppm, adjusted for starting material amount) extracted from the deoiled *pongamia* seedcake using various alkyl alkanoate solvents combined with microwave-assisted solvent extraction.
Figure 7B:
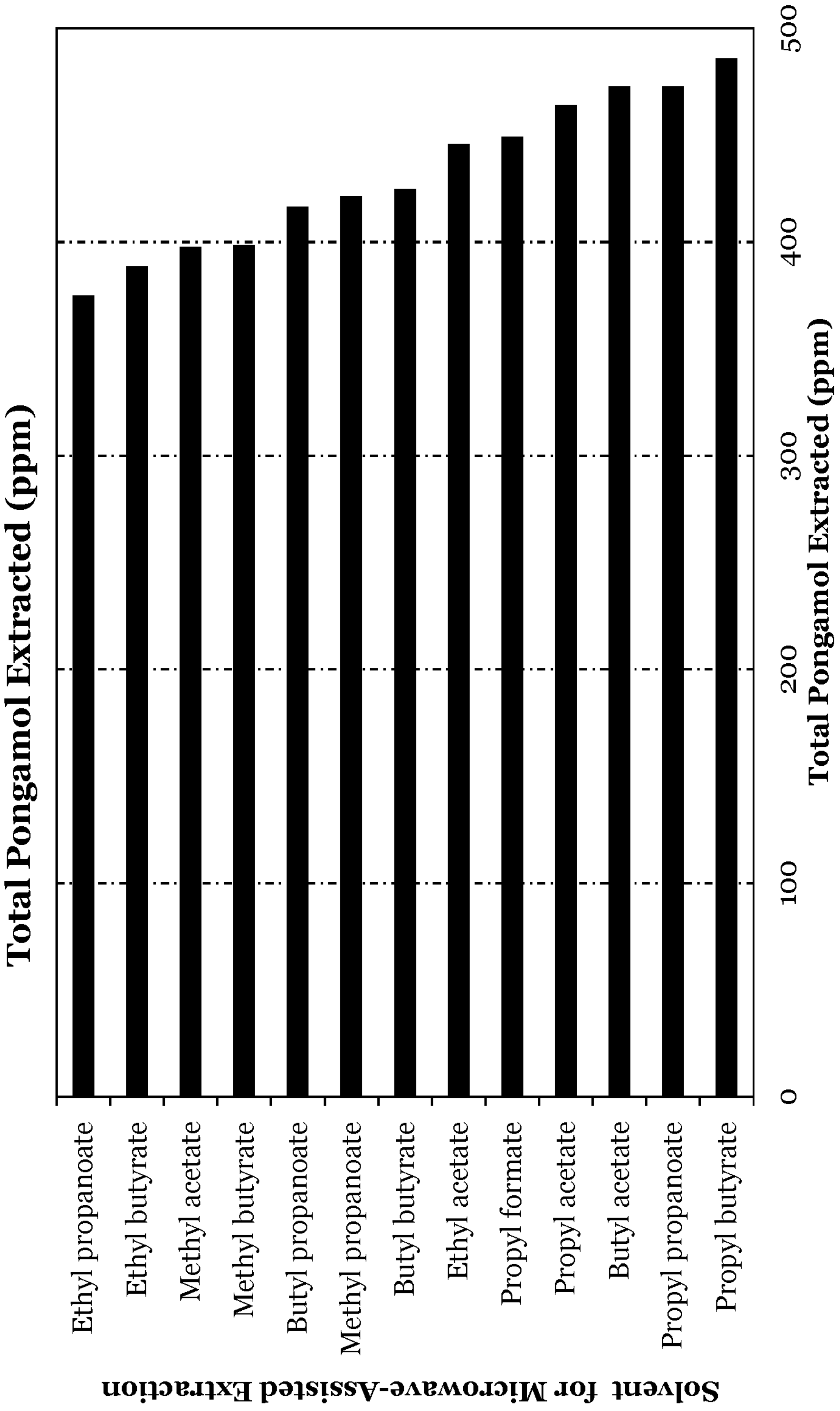

Assessing efficiency of microwave assisted extraction of karanjin and pongamol using various alkyl alkanoate solvents. Table 12 shows the total karanjin and total pongamol extracted from the *pongamia* seedcake samples using the solvents listed under microwave-assisted extraction conditions (see also FIGS. 7A and 7B).

TABLE 12

| Solvent | Total Karanjin Extracted (ppm) | Total Pongamol Extracted (ppm) |
|---|---|---|
| Butyl acetate | 4989 | 473 |
| Butyl butyrate | 4315 | 425 |
| Butyl propanoate | 4939 | 417 |
| Ethyl acetate | 4338 | 446 |
| Ethyl butyrate | 4222 | 389 |
| Ethyl propanoate | 4248 | 375 |
| Methyl acetate | 4003 | 398 |
| Methyl butyrate | 4359 | 399 |
| Methyl propanoate | 4435 | 421 |
| Propyl acetate | 4952 | 464 |

TABLE 12-continued

| Solvent | Total Karanjin Extracted (ppm) | Total Pongamol Extracted (ppm) |
|---|---|---|
| Propyl butyrate | 4997 | 486 |
| Propyl formate | 4342 | 449 |
| Propyl propanoate | 5119 | 473 |

Example B: Large-Scale Extraction Methods

The present example details experimental efforts to scale-up extraction of karanjin and pongamol to a commercially viable level.

Part I—Mechanical Processing

Heat extrusion method and expeller press method. *Pongamia* seedcake samples were separately subjected to a heat extrusion method ("Seed Conditioning") and an expeller press method ("Expeller Press", one ($1^{st}$) or two ($2^{nd}$) rounds of pressing) to remove oil, karanjin, and pongamol from the *pongamia* seedcake.

Figure 8A:
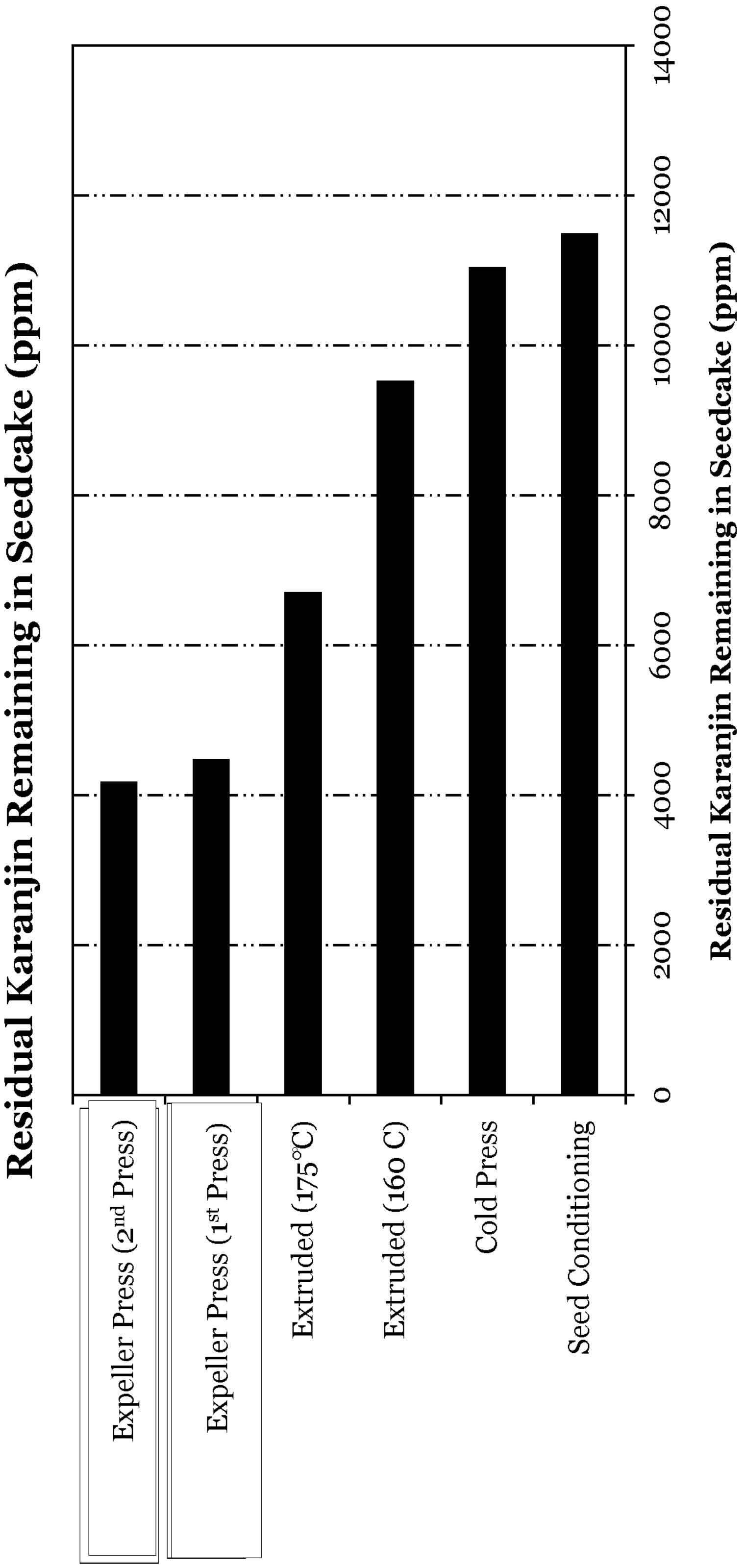
FIGS. 8A and 8B depict bar charts comparing the residual concentration of karanjin and pongamol (in ppm, adjusted for starting material amount) in *pongamia* seedcake subjected to various mechanical treatments as determined by microwave-assisted ethyl acetate extraction analysis.
Figure 8B:
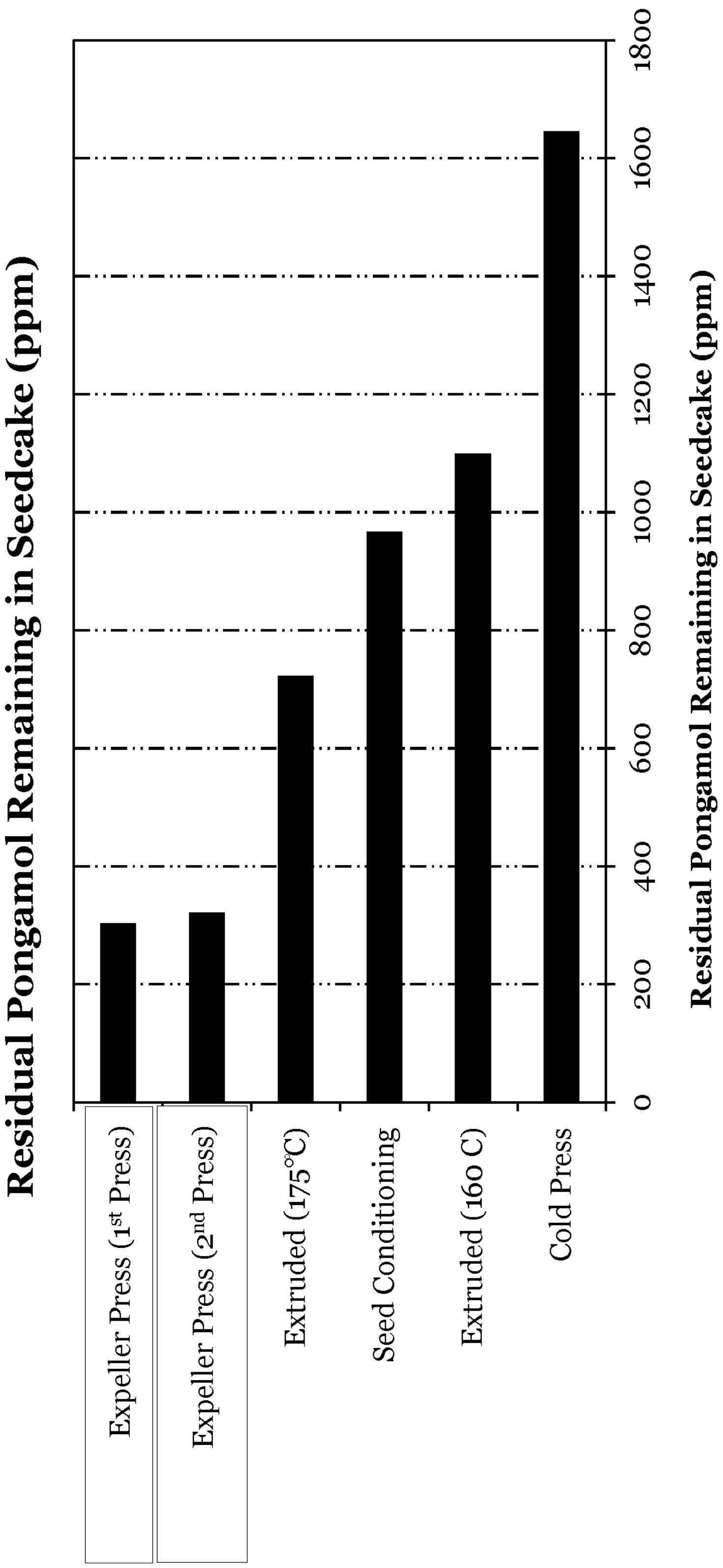

Assessing karanjin and pongamol extraction efficiency by mechanical processing. The *pongamia* seedcake samples were analyzed by microwave-assisted ethyl acetate solvent extraction (according to the protocol of Example A3 above) to determine the amounts of karanjin and pongamol remaining in the treated *pongamia* seedcake following treatment by the Seed Conditioning and Expeller Press processing methods. Tables 13 and 14 demonstrate that both the Seed Conditioning and Expeller Press mechanical processing methods can be used to extract karanjin and pongamol from *pongamia* seedcake at a commercial scale (FIGS. 8A and 8B).

TABLE 13

| Extraction Process | Residual Karanjin Remaining in Seedcake (ppm) | Residual Pongamol Remaining in Seedcake (ppm) |
|---|---|---|
| Cold Press | 11040 | 1645.5 |
| Extruded (160° C.) | 9525 | 1099.5 |
| Extruded (175° C.) | 6705 | 723 |

TABLE 14

| Extraction Process | Residual Karanjin Remaining in Seedcake (ppm) | Residual Pongamol Remaining in Seedcake (ppm) |
|---|---|---|
| Seed Conditioning | 11490 | 967.5 |
| Expeller Press, $1^{st}$ Press | 4485 | 303 |
| Expeller Press, $2^{nd}$ Press | 4185 | 322.05 |

Part II—Solvent Extraction

Single solvent extraction of karanjin and pongamol. *Pongamia* seedcake was introduced into an immersion extractor using a volumetric feeder. The feed rate was adjusted such that each extractor paddle section was about 50% full. Table 15 shows the specific extraction settings for each solvent.

TABLE 15

| Extraction Solvent (Prior Mechanical Processing) | Res. Time (min.) | Chain Speed (in./min) | Solvent:Feed | Feed Rate (kg/min) | Solvent Rate (mL/min) |
|---|---|---|---|---|---|
| Hexane (Cold Press) | 60 | 2.65 | 5:1 | 0.06 | 455 |
| Methanol (Cold Press) | 180 | 0.88 | 7:1 | 0.02 | 179 |
| Ethyl Acetate (Cold Press) | 180 | 0.88 | 7:1 | 0.013 | 101 |
| Ethyl Acetate (Expeller Press, 2$^{nd}$ Press) | 180 | 1.79 | 5:1 | 0.11 | 580 |

Dual solvent extraction of karanjin and pongamol. Following primary extraction with hexane, detailed above, *pongamia* seedcake was collected and introduced into an immersion extractor using a volumetric feeder. The feed rate was adjusted such that each extractor paddle section was about 50% full. Table 16 shows the specific extraction settings for each solvent.

TABLE 16

| Extraction Solvent Combination | Time (min.) | Chain Speed (in./min) | Solvent:Feed | Feed Rate (Kg/min) | Solvent Rate (mL/min) |
|---|---|---|---|---|---|
| 1°: Hexane; 2°: Methanol (Cold Press) | 120 | 1.32 | 5:1 | 0.014 | 88 |
| 1°: Hexane; 2°: Ethyl Acetate (Cold Press) | 120 | 1.32 | 5:1 | 0.014 | 78 |

Figure 9A:
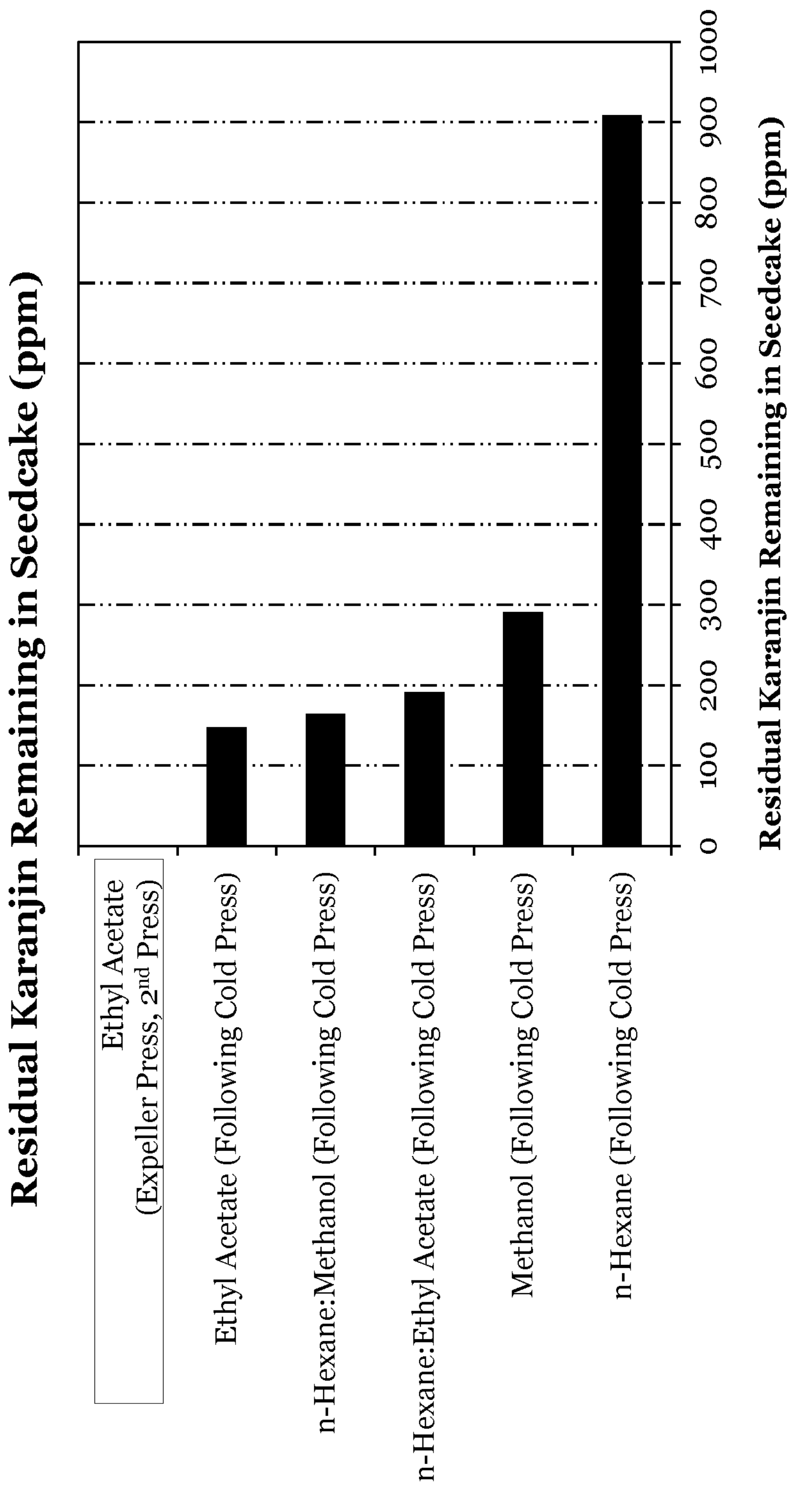
FIGS. 9A and 9B depict bar charts comparing the residual concentration of karanjin and pongamol (in ppm, adjusted for starting material amount) in *pongamia* seedcake subjected to various mechanical treatments in combination with solvent extraction treatments as determined by microwave-assisted ethyl acetate extraction analysis.
Figure 9B:
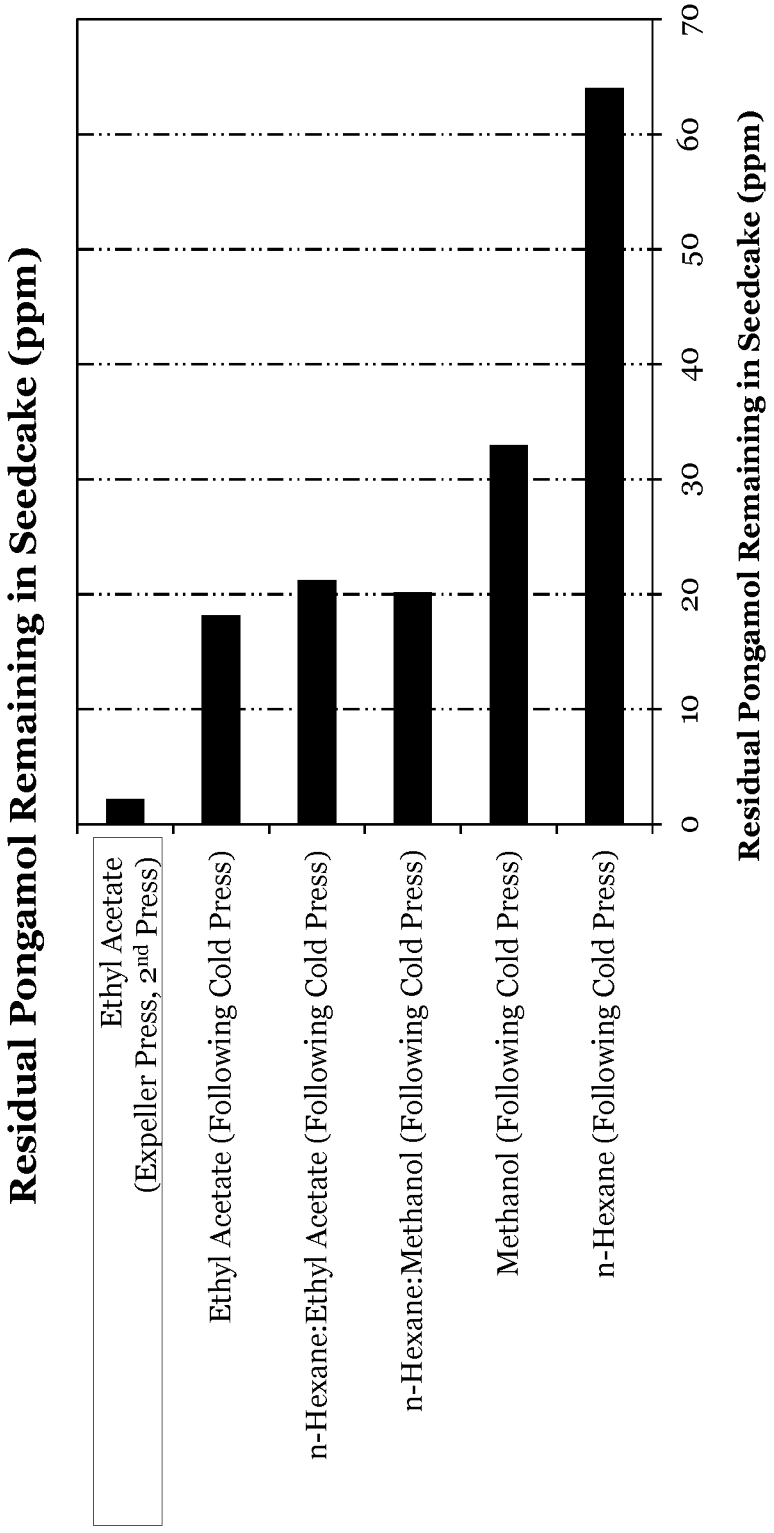

Assessing large-scale solvent extraction of karanjin and pongamol. Each of the samples produced from the combinations of mechanical and solvent extraction methods outlined in Tables 15 and 16 were analyzed by microwave-assisted ethyl acetate extraction (according to the protocol in Example A3 above) to determine the amounts of residual karanjin and residual pongamol remaining in the *pongamia* seedcake following extraction treatment. Table 17A shows that single extraction with ethyl acetate, regardless of prior mechanical extraction method, was the most efficient solvent for removing karanjin and pongamol from *pongamia* seedcake (FIGS. 9A and 9B).

TABLE 17A

| Extraction Solvent(s) | Residual karanjin remaining in seedcake (ppm) | Residual pongamol remaining in seedcake (ppm) |
|---|---|---|
| Hexane (Cold Press) | 909 | 64.05 |
| Methanol (Cold Press) | 290.7 | 32.97 |
| Ethyl Acetate (Cold Press) | 148.05 | 18.15 |
| Hexane; Methanol (Cold Press) | 164.55 | 20.205 |
| Hexane; Ethyl Acetate (Cold Press) | 191.7 | 21.21 |
| Ethyl Acetate (Expeller Press, 2$^{nd}$ Press) | 1.5 | 2.8 |

The Expeller Pressed (2$^{nd}$ press), ethyl acetate-extracted seedcake was analyzed a second time at a later date for karanjin and pongamol concentrations under the same protocol and conditions of Example A3 as used previously, to confirm the initial measurement in Table 17A. The results of the second run were observed to be slightly higher than the initial measurement. The first measurement (Run #1, same as Table 17A above), the second measurement (Run #2), and the average of the two measurements ("Average") are shown in Table 17B below.

TABLE 17B

| Extraction Solvent(s) | Run# | Residual karanjin remaining in seedcake (ppm) | Residual pongamol remaining in seedcake (ppm) |
|---|---|---|---|
| Ethyl Acetate | 1 | 1.5 | 2.8 |
| (Expeller Press, 2$^{nd}$ Press) | 2 | 7.5 | 8.2 |
| | Average | 4.5 | 5.5 |

Part III—Compositional Profile of Extracted Seedcake

Following extraction of the *pongamia* seedcake in Part II above, the starting *pongamia* seedcake samples in Part I and the solvent-extracted *pongamia* seedcake samples in Part II were assayed in order to determine the effect, if any, of the mechanical pressing and solvent extraction on the compositional profile of the seedcake. The total protein, total carbohydrates, and amino acid profiles of the mechanically pressed *pongamia* seedcake and the mechanically pressed, ethyl acetate-extracted seedcake were determined.

Amino acid content in the *pongamia* seedcake was determined by various methods depending upon the identity of the amino acid to by quantified. For example, measurement of alanine, arginine aspartic acid, glutamic acid, glycine, histidine, isoleucine, leucine, lysine, proline, serine, threonine, tyrosine, and valine were carried out by subjecting the *pongamia* seedcake samples to acid hydrolysis in 6 N HCl at 110° C. for 24 hours, followed by quantification with ion exchange chromatography with post-column ninhydrin reaction and UV/vis detection (AOAC 982.30 reference method, modified). Measurement of tryptophan in the seedcake samples was carried out via alkaline digestion of the seedcake with lithium hydroxide at 110° C. for 22 hours, with subsequent quantification by reverse-phase chromatography with fluorescence detection (AOAC 998.15 reference method). The quantities of cysteine and methionine were measured by treatment of the seedcake samples with performic acid oxidation to convert cysteine to cysteic acid and methionine to methionine sulfone. The oxidized sample was then hydrolyzed to release cysteic acid and methionine sulfone from the protein, followed by quantification of the released cysteic acid and methionine sulfone by ion exchange chromatography (AOAC 994.12 reference method, modified).

The average amino acid profile of the *pongamia* meal from two separate runs are shown below as the amino acid content following mechanical pressing but before solvent extraction (Expeller Press, 2$^{nd}$ Press, "Before Treatment") and after both mechanically pressing and solvent extraction with ethyl acetate (Ethyl Acetate-extracted after Expeller Press, 2$^{nd}$ Press, "After Treatment") is shown in Table 18 below. The amino acid profile is expressed as the percentage by weight (% w/w) absolute amino acid content of the meal and as a percentage of the total amino acid content.

TABLE 18

| | Before Treatment | | After Treatment | |
|---|---|---|---|---|
| | Absolute amino acid (%) | % of Total amino acids | Absolute amino acid (%) | % of Total amino acids |
| Alanine | 0.93 | 4.28 | 1.11 | 4.57 |
| Arginine | 1.27 | 5.85 | 1.30 | 5.36 |
| Aspartic Acid | 2.54 | 11.69 | 3.03 | 12.44 |
| Cysteine | 0.44 | 2.03 | 0.45 | 1.85 |
| Glutamic Acid | 3.35 | 15.42 | 3.93 | 16.16 |
| Glycine | 0.99 | 4.56 | 1.17 | 4.82 |
| Histidine | 0.59 | 2.72 | 0.63 | 2.58 |
| Isoleucine | 0.85 | 3.91 | 1.02 | 4.18 |
| Leucine | 1.94 | 8.93 | 2.28 | 9.37 |
| Lysine | 1.79 | 8.24 | 1.35 | 5.57 |
| Methionine | 0.24 | 1.10 | 0.25 | 1.02 |
| Phenylalanine | 1.31 | 6.03 | 1.50 | 6.15 |
| Proline | 1.14 | 5.25 | 1.29 | 5.32 |
| Serine | 1.23 | 5.66 | 1.45 | 5.94 |
| Threonine | 0.81 | 3.73 | 0.97 | 3.97 |
| Tryptophan | 0.39 | 1.80 | 0.44 | 1.81 |
| Tyrosine | 0.78 | 3.59 | 0.87 | 3.57 |
| Valine | 1.13 | 5.20 | 1.30 | 5.34 |
| Total | 21.72 | 100 | 24.33 | 100 |

As shown in Table 18 above, the relative amino acid content and profiles of the seedcake samples were largely preserved following ethyl acetate solvent extraction to remove karanjin and pongamol. The solvent extracted seedcake generally exhibited a slightly higher concentration of the amino acids than in the starting seedcake with the exception of the lysine content, which was reduced. The higher concentration of the amino acids in the solvent extracted meal may be attributable in part to the removal of *pongamia* oil during solvent extraction, and thus the reduction in the overall weight of the seedcake.

Total proteins and carbohydrates were also measured for the seedcake samples before and after ethyl acetate solvent extraction. Total protein content was determined by placing the *pongamia* seedcake samples in the combustion chamber of a protein analyzer, measuring the total nitrogen content of the gas produced by combustion, and calculating the protein from the observed nitrogen content (protein content=6.25× nitrogen content).

Total carbohydrate content was calculated as the remaining percentage of the *pongamia* seedcake (100%) less the sum of the total ash content (%), total protein content (%), total moisture content (%), and total fat (%). The total ash content was determined by placing the seedcake samples (2 g) into a crucible, dying the samples in an oven, ashing the samples in a muffle furnace at 600° C., and measuring the weight of the ash (AOAC 942.05 reference method). The total moisture content was determined by heating a weighed sample at 130° C. for 2 hours in a forced draft oven, and determining the difference in sample weight, with the % difference calculated as moisture content (AOCS BA 2A-38 reference method). The total fat content was determined by solvent extraction under reflux with petroleum ether (AOCS BA3-38 reference method, modified).

Table 19 shows the average total protein and average total carbohydrates content (as weight percentage of the total weight of the sample) for two runs following mechanical pressing (Expeller Press, $2^{nd}$ Press, "Before Treatment") but before solvent extraction and after both mechanically pressing and solvent extraction with ethyl acetate (Ethyl Acetate-extracted after Expeller Press, $2^{nd}$ Press, "After Treatment").

TABLE 19

| | Before Treatment | After Treatment |
|---|---|---|
| Total Protein % | 30.64 | 35.71 |
| Total Carbohydrates % | 48.35 | 58.24 |

The solvent extraction process did not result in loss of protein or carbohydrate content in the *pongamia* seedcake. Similar to the amino acid profiles above, the solvent extracted seedcake samples exhibited slightly higher concentrations of total protein and total carbohydrates than the starting expeller-pressed seedcake.

Example C: Ruminant Feed Compositions

The examples below detail experimental efforts to evaluate the viability of incorporating ethyl acetate-extracted *pongamia* meal to cattle.

Example C1: *Pongamia* Supplementation Study

The example below describes a study comparing the use of ethyl-acetate extracted *pongamia* seedcake and soybean meal as separate supplemental protein sources as to low-quality forage diets in cattle.

Thirteen steers were utilized in a completely randomized study and fed one of three diets including, low-quality hay (5.0% crude protein) as a control (CON (n=4), a com- and distillers' dry grain-based diet supplemented with soybean meal (SBM) (n=4), and a distillers' dry grain-based diet supplemented with ethyl acetate-extracted *pongamia* seedcake (PSC) (n=5). The *pongamia* seedcake used in this study was the Expeller Press, $2^{nd}$ Press, ethyl acetate-extracted *pongamia* meal prepared in Example B, Part II.

Table 20 shows the composition of the three test diet groups-hay (control), soybean meal (SBM), and solvent-extracted *pongamia* seed cake (PSC) utilized in the study.

TABLE 20

| | Hay (Control, CON) | Soybean Meal (SBM) | Pongamia Seedcake (PSC) |
|---|---|---|---|
| | Supplement Composition, g/kg | | |
| SBM | — | 420 | 0 |
| Corn | — | 380 | 0 |
| Dried distillers' grains (DDG) | — | 200 | 600 |
| PSC | — | 0 | 400 |

Table 21 shows the chemical composition of the hay, soybean meal and *pongamia* seedcake.

Hay, SBM, and PSC were dried in a forced-air oven for 96 h at 55° C. and allowed to air-equilibrate for determination of partial dry matter (DM). Hay and supplements were pooled across day on an equal weight basis, then ground through a 1-mm screen using a Wiley mill and dried at 105° C. for determination of DM. Organic matter (OM) was determined as the loss in dry weight upon combustion in a muffle furnace for 8 h at 450° C. Nitrogen was measured using the Elementar rapid N cube (Elementar, Hanua, Germany) and crude protein (CP) was calculated as N×6.25. Neutral detergent fiber (NDF) and acid detergent fiber (ADF) analysis was performed sequentially using an Ankom Fiber Analyzer with amylase.

Karanjin and pongamol content in the *pongamia* seedcake were determined by the microwave-assisted solvent extraction method using ethyl acetate described in Example A3 and Example A4.

TABLE 21

| Item | Hay (Control, CON) | Soybean Meal (SBM) | Pongamia Seedcake (PSC) |
|---|---|---|---|
| | Chemical Composition, g/kg of Dry Matter | | |
| Organic Matter (OM) | 927 | 950 | 947 |
| Neutral Detergent Fiber (NDF) | 734 | 175 | 372 |
| Acid Detergent Fiber (ADF) | 436 | 54 | 137 |
| Crude Protein (CP) | 50 | 297 | 312 |
| Karanjin, ppm | — | — | 4.5 |
| Pongamol, ppm | — | — | 5.5 |

The test steer were fed the designated diet for a duration of 21 days in total, including 13 days for adaptation and 8 days for sample collection. Dry matter intake and digestibility determinations were facilitated by total fecal collection with fecal bags for six days.

Statistical Analysis.

Dry matter intake and digestibility were analyzed using the MIXED procedure in SAS 9.2 (SAS Inst. Inc., Cary, NC). Terms in the model included treatment and period, with steer as a random effect. Terms in the model were treatment, period, hour, and hour×treatment, with steer and treatment×period×steer included as random terms. The repeated term was hour, with treatment×steer as the subject. Treatment means were calculated using the LSMEANS option. Table 22 shows the results of the statistical analysis across the three treatment groups.

TABLE 22

| Item | Treatments CON | SBM | PSC | SEM | P-value | CON vs. SBM | CON vs. PSC | SBM vs PSC |
|---|---|---|---|---|---|---|---|---|
| No. of Obs. | 4 | 4 | 5 | | | | | |
| | Dry Matter Intake, % of BW | | | | | | | |
| Forage | 1.48 | 1.95 | 1.83 | 0.092 | 0.01 | <0.01 | 0.02 | 0.36 |
| Supplement | 0.00 | 0.15 | 0.16 | 0.002 | <0.01 | <0.01 | <0.01 | 0.26 |
| Total | 1.48 | 2.10 | 1.99 | 0.093 | <0.01 | <0.01 | <0.01 | 0.37 |
| Digestible | 0.76 | 1.06 | 1.16 | 0.049 | <0.01 | <0.01 | <0.01 | 0.14 |
| Digestibility, % | 51.4 | 55.2 | 53.6 | 1.99 | 0.43 | 0.21 | 0.45 | 0.55 |

CON = control;
SBM = soybean meal;
PSC = pongamia seedcake

As shown in Table 22, the forage dry matter intake for both the soybean meal and *pongamia* seedcake-inclusive diets were greater than that of the hay control diet. The digestible dry matter intake for the soybean meal and *pongamia* seedcake-inclusive diets were also greater than that of the hay control diet. No differences were observed in diet digestibility. No significant differences were observed between the soybean meal test group and the *pongamia* seedcake test group.

Example C2: Comparative Cattle Feedout Forage-Based Diet with *Pongamia*-Based Protein Supplement or Commercial Protein Supplement The present example details a comparative study in which test cattle were fed one of three diets as shown in Table 23, including forage with *pongamia* protein supplement (Group A), forage only (Group B), and forage with commercial protein supplement (Group C).

The *pongamia* seedcake used in this study was the Expeller Press, $2^{nd}$ Press, ethyl acetate-extracted *pongamia* meal prepared in Example B, Part II above. The *pongamia* seedcake was blended with distillers' dry grains (DDGS) at a ratio of 30:70 by weight to formulate a *pongamia* protein supplement. Table 24 shows the karanjin and pongamol concentrations of the *pongamia* composition used for this study, as determined by the microwave-assisted solvent extraction analytical method with ethyl acetate described in Example A4 above. The Sweet Pro CattleKandi protein supplement was employed as the commercial supplement for cattle in Group C for the first 30 days of the study, and replaced with SweetPro 16 supplement for the remainder of the study.

TABLE 23

| Group Designation | Experimental Group | Description |
|---|---|---|
| Group A | Test treatment group | Forage + pongamia protein supplement |
| Group B | Negative control group | Forage only |
| Group C | Positive control group | Forage + commercial protein supplement |

TABLE 24

| Meal Type | Karanjin (ppm) | Pongamol (ppm) |
|---|---|---|
| Ethyl Acetate-Extracted Meal | 4.5 | 5.5 |

Three Black Angus×Wagyu beef cows (castrated males, age 22-24 months) were employed for each test group (nine steers in total), and were contained in pens of 3-5 acres in size designated for each test group. Within each pen, potable water and access to forage within the pen were provided ad libitum throughout the duration of the study. The test treatment group (Group A) received 1 kg each of *pongamia*-based protein supplement in a communal feed tub accessible to all three cattle in the test treatment pen. Cattle in the positive control group (Group C) received the standard ration of SweetPro tub-based protein supplement. No protein supplement was provided to the cattle in Group B.

Test cattle were monitored and subjected to qualitative evaluation on a daily basis to ensure consumption of at least an entire daily ration of *pongamia*-based protein supplement and ensure no negative health impacts were occurring throughout the study. The test cattle from all three groups were weighed approximately every thirty days to monitor weight gain. The recorded weight gain for each of the test cattle and for the treatment groups are shown in Table 25.

TABLE 25

| | | WEIGHT (LBS) | | | | AVERAGE DAILY GAIN |
|---|---|---|---|---|---|---|
| GROUP | TAG # | Day 1 | Day 33 | Day 62 | Day 93 | BY GROUP |
| A | 1 | 901 | 975 | 1070 | 1155 | |
| | 2 | 901 | 1125 | 1155 | 1240 | |
| | 3 | 901 | 1030 | 1115 | 1180 | |
| | Average | 901 | 1043 | 1113 | 1192 | |
| | Delta | | 142 | 70 | 78 | 3.2 |
| B | 4 | 911 | 910 | 965 | 1085 | |
| | 5 | 911 | 895 | 975 | 1100 | |
| | 6 | 911 | 1085 | 1175 | 1230 | |
| | Average | 911 | 963 | 1038 | 1138 | |
| | Delta | | 52 | 75 | 100 | 2.5 |
| C | 7 | 878 | 1040 | 1120 | 1190 | |
| | 8 | 878 | 1005 | 1055 | 1135 | |
| | 9 | 878 | 995 | 1040 | 1145 | |
| | Average | 878 | 1013 | 1072 | 1157 | |
| | Delta | | 135 | 58 | 85 | 3.1 |

As shown in Table 25, cattle diet including *pongamia* meal-derived protein supplement resulted in improved weight gain compared to forage only diet and demonstrated comparable average weight gain for test steers as compared to a diet including a commercially available protein supplement.

What is claimed is:

1. A *pongamia* composition, comprising:

karanjin;

between 30% and 50% protein by dry weight;

a total amino acid content of 20-30% by weight;

between 50% and 70% carbohydrates by weight; and between 1% and 5% oil by dry weight, wherein the *pongamia* composition is a meal that is made up of residual insoluble solid material obtained from separating an extraction mixture comprising a deoiled *pongamia* seedcake and ethyl acetate, wherein the *pongamia* composition has a karanjin concentration of less than or equal to 80 ppm, and the karanjin concentration of the *pongamia* composition is reduced as compared to the deoiled *pongamia* seedcake from which the *pongamia* composition is obtained, wherein the *pongamia* composition has an apparent increase in the concentration of carbohydrates and proteins as compared to the deoiled *pongamia* seedcake from which the *pongamia* composition is obtained, wherein the *pongamia* composition has a relative amino acid profile that is largely preserved as compared to the deoiled *pongamia* seedcake from which the *pongamia* composition is obtained, wherein the amino acids present in the *pongamia* composition comprise alanine, arginine, aspartic acid, cysteine, glutamic acid, glycine, histidine, isoleucine, leucine, methionine, phenylalanine, proline, serine, threonine, tryptophan, tyrosine, and valine, and each of the foregoing amino acids are present in the *pongamia* composition at an amount higher than in the deoiled *pongamia* seedcake prior to extraction.

2. The *pongamia* composition of claim 1, wherein the *pongamia* composition is obtained from a deoiled *pongamia* seedcake having a karanjin concentration of at least 200 ppm.

3. The *pongamia* composition of claim 1, wherein the karanjin concentration is determined by processing the *pongamia* composition with an alkyl alkanoate solvent under microwave irradiation.

4. The *pongamia* composition of claim 1, wherein the *pongamia* composition comprises:

karanjin;

pongamol;

carbohydrates;

proteins;

fiber;

amino acids;

ash; and chalcones.

5. The *pongamia* composition of claim 1, wherein the *pongamia* composition further comprises furanoflavonoid selected from the group consisting of lanceolatin, kanjone, pongaglabrone, pongaglabol, ovalifolin, sanaganone, pinnatin, gamatin, pongone, glabone, karanjonol, pongapin, pachycarin, pongaglabol methyl ether, isopongaglabol, methoxyisopongaglabol, pongol methyl ether, millettocalyxin, 6-methoxyisopongaglabol, pongamoside A, pongamoside B, ponganone XI, pongamoside C, glabra I, ovalitenone, ponganone IX, and pongarotene, or any combination thereof.

6. The *pongamia* composition of claim 1, wherein the *pongamia* composition has a karanjin concentration less than or equal to 50 ppm.

* * * * *